(12) United States Patent
Hormis et al.

(10) Patent No.: US 11,564,064 B2
(45) Date of Patent: Jan. 24, 2023

(54) BEAMFORMING MULTICAST REPEATER

(71) Applicant: QUALCOMM Incorporated, San Diego, CA (US)

(72) Inventors: Raju Hormis, New York, NY (US); Junyi Li, Chester, NJ (US); Navid Abedini, Somerset, NJ (US); Juergen Cezanne, Ocean Township, NJ (US); Ozge Koymen, Princeton, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 107 days.

(21) Appl. No.: 16/830,159

(22) Filed: Mar. 25, 2020

(65) Prior Publication Data

US 2020/0314601 A1 Oct. 1, 2020

Related U.S. Application Data

(60) Provisional application No. 62/824,935, filed on Mar. 27, 2019.

(51) Int. Cl.
*H04W 4/06* (2009.01)
*H04B 7/06* (2006.01)
(Continued)

(52) U.S. Cl.
CPC ............ *H04W 4/06* (2013.01); *H04B 7/0617* (2013.01); *H04B 7/155* (2013.01); *H04W 16/28* (2013.01); *H04L 12/189* (2013.01)

(58) Field of Classification Search
CPC ......... H04W 4/06; H04W 16/28; H04W 4/80; H04W 4/70; H04B 7/0617; H04B 7/155; H04B 7/15542; H04L 12/189
See application file for complete search history.

(56) References Cited

U.S. PATENT DOCUMENTS 8,244,175 B2 8/2012 Rofougaran
8,638,835 B2 1/2014 Wang et al.
(Continued)

OTHER PUBLICATIONS

International Search Report and Written Opinion—PCT/US2020/024967—ISA/EPO—dated Jun. 25, 2020.
(Continued)

*Primary Examiner* — Peter P Chau
(74) *Attorney, Agent, or Firm* — Qualcomm Incorporated

(57) ABSTRACT

Methods, systems, and devices for wireless communications are described. A wireless repeater may receive a unicast transmission and may relay the unicast transmission as a multicast transmission to a set of user equipments (UEs). Transmitting the multicast transmission may involve retransmitting the unicast transmission or a signal derived from the unicast transmission in each of a set of beamforming directions. The multicast transmission may be transmitted over multiple antenna arrays or a single antenna array associated with a Butler matrix. Additionally or alternatively, the wireless repeater may receive transmissions from multiple UEs; may form an aggregated signal associated with the received transmissions; and may transmit a unicast transmission associated with the aggregated signal, such as to a base station. The multiple UE transmissions may be received over multiple antenna arrays or over a single antenna array associated with a Butler matrix.

27 Claims, 21 Drawing Sheets

(51) Int. Cl.
*H04B 7/155* (2006.01)
*H04W 16/28* (2009.01)
*H04L 12/18* (2006.01)

(56) References Cited

U.S. PATENT DOCUMENTS

| | | |
|---|---|---|
| 9,692,126 B2 | 6/2017 | Sharawi |
| 9,692,489 B1 | 6/2017 | Rofougaran et al. |
| 2006/0040615 A1 | 2/2006 | Mohamadi |
| 2017/0062948 A1 | 3/2017 | Artemenko et al. |
| 2017/0331528 A1 | 11/2017 | Gamand et al. |
| 2018/0352444 A1 | 12/2018 | Sridharan et al. |
| 2019/0020401 A1* | 1/2019 | Gharavi ............. H04B 7/15514 |
| 2019/0020402 A1 | 1/2019 | Gharavi et al. |
| 2019/0020407 A1* | 1/2019 | Gharavi ................... H04B 7/15 |
| 2019/0181943 A1* | 6/2019 | Liang ................. H04B 7/15507 |

OTHER PUBLICATIONS

Chu H M., et al., "An Extended 4 x 4 Butler Matrix with Enhanced Beam Controllability and Widened Spatial Coverage", IEEE Transactions on Microwave Theory and Techniques, vol. 66, No. 3, Mar. 2018, 11 pages.

Lian J-W., et al., "Planar Millimeter-Wave 2-D Beam-Scanning Multibeam Array Antenna Fed by Compact SIW Beam-Forming Network", IEEE Transactions on Antennas and Propagation, vol. 66, No. 3, Mar. 2018, 12 pages.

* cited by examiner

BEAMFORMING MULTICAST REPEATER

CROSS REFERENCE

The present application for patent claims the benefit of U.S. Provisional Patent Application No. 62/824,935 by HORMIS et al., entitled "BEAMFORMING MULTICAST REPEATER," filed Mar. 27, 2019, which is assigned to the assignee hereof and expressly incorporated by reference herein.

BACKGROUND

The following relates generally to wireless communications, and more specifically to a beamforming multicast repeater.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include a number of base stations or network access nodes, each simultaneously supporting communication for multiple communication devices, which may be otherwise known as user equipment (UE).

A wireless repeater may receive a transmission from a base station and may retransmit the transmission to a user equipment (UE). The transmission may be received at a first wireless array of the wireless repeater and may be transmitted at a second wireless array of the transmitter. In some cases, the retransmitted transmission may be transmitted at a higher power than the power with which the received transmission was received.

SUMMARY

The described techniques relate to improved methods, systems, devices, and apparatuses that support a beamforming multicast repeater. Generally, the described techniques provide for a wireless repeater to receive a unicast transmission and to transmit a corresponding multicast transmission to a set of user equipments (UEs) along a set of beamforming directions. Transmitting the multicast transmission may involve retransmitting the unicast transmission or a signal derived from the unicast transmission in each of the beamforming directions. The multicast transmission may be transmitted over multiple antenna arrays or a single antenna array associated with a Butler matrix. Additionally or alternatively, the wireless repeater may receive transmissions from multiple UEs; may form an aggregated signal associated with the received transmissions; and may transmit a unicast transmission associated with the aggregated signal (e.g., to a base station). The multiple UE transmissions may be received over multiple antenna arrays or over a single antenna array associated with a Butler matrix.

In some examples, the wireless repeater may switch between a downlink configuration (e.g., a configuration for receiving a unicast transmission and transmitting a multicast transmission, such as to multiple UEs) and an uplink configuration (e.g., a configuration for receiving transmissions from multiple sources, such as multiple UEs, and transmitting a unicast transmission). In other examples, the wireless repeater may be configured to assist in downlink and uplink operations simultaneously. For instance, the wireless repeater may be configured to receive unicast transmissions and transmissions from multiple UEs simultaneously or to transmit unicast transmissions and multicast transmissions simultaneously. Alternatively, the wireless repeater may be configured to receive unicast transmissions and to transmit unicast transmissions simultaneously.

A method of wireless communication is described. The method may include receiving, at a first antenna array of a wireless repeater, a unicast transmission via directional beamforming, mapping the unicast transmission to a set of beamforming directions for transmission by the wireless repeater, and transmitting, using at least a second antenna array of the wireless repeater, a multicast transmission to a set of UEs in the set of beamforming directions, the multicast transmission based on the unicast transmission.

An apparatus for wireless communication is described. The apparatus may include a processor of a wireless repeater, memory in electronic communication with the processor, and instructions stored in the memory. The instructions may be executable by the processor to cause the apparatus to receive, at a first antenna array of the wireless repeater, a unicast transmission via directional beamforming, map the unicast transmission to a set of beamforming directions for transmission by the wireless repeater, and transmit, using at least a second antenna array of the wireless repeater, a multicast transmission to a set of UEs in the set of beamforming directions, the multicast transmission based on the unicast transmission.

Another apparatus for wireless communication is described. The apparatus may include means for receiving, at a first antenna array of a wireless repeater, a unicast transmission via directional beamforming, mapping the unicast transmission to a set of beamforming directions for transmission by the wireless repeater, and transmitting, using at least a second antenna array of the wireless repeater, a multicast transmission to a set of UEs in the set of beamforming directions, the multicast transmission based on the unicast transmission.

A non-transitory computer-readable medium storing code for wireless communication is described. The code may include instructions executable by a processor to receive, at a first antenna array of a wireless repeater, a unicast transmission via directional beamforming, map the unicast transmission to a set of beamforming directions for transmission by the wireless repeater, and transmit, using at least a second antenna array of the wireless repeater, a multicast transmission to a set of UEs in the set of beamforming directions, the multicast transmission based on the unicast transmission.

In some examples of the method, apparatuses, and non-transitory computer-readable medium described herein, transmitting the multicast transmission may include operations, features, means, or instructions for retransmitting a signal received via the unicast transmission in each of the set of beamforming directions.

In some examples of the method, apparatuses, and non-transitory computer-readable medium described herein, mapping the unicast transmission to the set of beamforming directions may include operations, features, means, or instructions for routing a signal received via the unicast transmission to at least two signal paths within the wireless repeater, where, a first signal path of the at least two signal paths may be associated with a first beamforming direction of the set of beamforming directions, and a second signal path of the at least two signal paths may be associated with a second beamforming direction of the set of beamforming directions.

Some examples of the method, apparatuses, and non-transitory computer-readable medium described herein may further include operations, features, means, or instructions for feeding the signal into a beamforming network that may be based on a Butler matrix and may be coupled with the at least two signal paths.

Some examples of the method, apparatuses, and non-transitory computer-readable medium described herein may further include operations, features, means, or instructions for routing the signal from the first signal path to a first quadrature coupler, and transmitting the multicast transmission in the set of beamforming directions based on an output of the first quadrature coupler.

Some examples of the method, apparatuses, and non-transitory computer-readable medium described herein may further include operations, features, means, or instructions for routing the signal from the second signal path to the first quadrature coupler, and transmitting the multicast transmission in the set of beamforming directions based on routing the signal from the second signal path to the first quadrature coupler.

Some examples of the method, apparatuses, and non-transitory computer-readable medium described herein may further include operations, features, means, or instructions for transmitting the multicast transmission in the set of beamforming directions based on a second output of the first quadrature coupler.

Some examples of the method, apparatuses, and non-transitory computer-readable medium described herein may further include operations, features, means, or instructions for routing the signal from the second signal path to a second quadrature coupler, and transmitting the multicast transmission in the set of beamforming directions based on an output of the second quadrature coupler.

Some examples of the method, apparatuses, and non-transitory computer-readable medium described herein may further include operations, features, means, or instructions for transmitting the multicast transmission in the set of beamforming directions based on a second output of the first quadrature coupler and a second output of the second quadrature coupler.

Some examples of the method, apparatuses, and non-transitory computer-readable medium described herein may further include operations, features, means, or instructions for transmitting, using the second antenna array of the wireless repeater, a first portion of the multicast transmission in a first beamforming direction of the set of beamforming directions, and transmitting, using a third antenna array of the wireless repeater, a second portion of the multicast transmission in a second beamforming direction of the set of beamforming directions.

Some examples of the method, apparatuses, and non-transitory computer-readable medium described herein may further include operations, features, means, or instructions for receiving, at the second antenna array of the wireless repeater from a first UE of the set of UEs, a first transmission along a first beamforming direction of the set, receiving, at the second antenna array of the wireless repeater from a second UE of the set of UEs, a second transmission along a second beamforming direction of the set, aggregating a first signal received via the first transmission and a second signal received via the second transmission to form an aggregated signal, and transmitting, using the first antenna array of the wireless repeater, a second unicast transmission based on the aggregated signal.

Some examples of the method, apparatuses, and non-transitory computer-readable medium described herein may further include operations, features, means, or instructions for switching a signal path within the wireless repeater from a downlink configuration to an uplink configuration, where switching the signal path occurs after transmitting the multicast transmission and before receiving the transmission from the first UE and the transmission from the second UE.

Some examples of the method, apparatuses, and non-transitory computer-readable medium described herein may further include operations, features, means, or instructions for processing the aggregated signal and a signal received via the unicast transmission using at least one of a same low noise amplifier (LNA), a same PA, or a same PA driver.

Some examples of the method, apparatuses, and non-transitory computer-readable medium described herein may further include operations, features, means, or instructions for processing a signal received via the unicast transmission based on a first set of LNAs, PAs, and PA drivers, and processing the aggregated signal based on a second set of LNAs, PAs, and PA drivers.

In some examples of the method, apparatuses, and non-transitory computer-readable medium described herein, a first time period between receiving the unicast transmission and transmitting the multicast transmission at least partially overlaps with a second time period between receiving the first transmission and transmitting the second unicast transmission.

Some examples of the method, apparatuses, and non-transitory computer-readable medium described herein may further include operations, features, means, or instructions for routing a signal received via the unicast transmission through a first beamforming network within the wireless repeater, and routing the first signal and the second signal through a second beamforming network within the wireless repeater, where both the a first beamforming network and the second beamforming network may be based on a Butler matrix.

Some examples of the method, apparatuses, and non-transitory computer-readable medium described herein may further include operations, features, means, or instructions for routing the first signal through a first duplexer within the wireless repeater, and routing the second signal through a second duplexer within the wireless repeater.

Some examples of the method, apparatuses, and non-transitory computer-readable medium described herein may further include operations, features, means, or instructions for receiving, at the wireless repeater, an additional unicast transmission including control information and at a frequency lower than the unicast transmission, and transmitting the multicast transmission based on the control information.

In some examples of the method, apparatuses, and non-transitory computer-readable medium described herein, the second antenna array may have a same number of antennas as the first antenna array and outputs the multicast transmission in each of the set of beamforming directions.

A method of wireless communication is described. The method may include receiving, using at least a second antenna array of a wireless repeater, a first transmission from a first UE along a first beamforming direction and a second transmission from a second UE along a second beamforming direction, aggregating a first signal received via the first transmission and a second signal received via the second transmission to form an aggregated signal, and transmitting, using a first antenna array of the wireless repeater, a unicast transmission based on the aggregated signal.

An apparatus for wireless communication is described. The apparatus may include a processor of a wireless repeater, memory in electronic communication with the processor, and instructions stored in the memory. The instructions may be executable by the processor to cause the apparatus to receive, using at least a second antenna array of the wireless repeater, a first transmission from a first UE along a first beamforming direction and a second transmission from a second UE along a second beamforming direction, aggregate a first signal received via the first transmission and a second signal received via the second transmission to form an aggregated signal, and transmit, using a first antenna array of the wireless repeater, a unicast transmission based on the aggregated signal.

Another apparatus for wireless communication is described. The apparatus may include means for receiving, using at least a second antenna array of a wireless repeater, a first transmission from a first UE along a first beamforming direction and a second transmission from a second UE along a second beamforming direction, aggregating a first signal received via the first transmission and a second signal received via the second transmission to form an aggregated signal, and transmitting, using a first antenna array of the wireless repeater, a unicast transmission based on the aggregated signal.

A non-transitory computer-readable medium storing code for wireless communication is described. The code may include instructions executable by a processor to receive, using at least a second antenna array of a wireless repeater, a first transmission from a first UE along a first beamforming direction and a second transmission from a second UE along a second beamforming direction, aggregate a first signal received via the first transmission and a second signal received via the second transmission to form an aggregated signal, and transmit, using a first antenna array of the wireless repeater, a unicast transmission based on the aggregated signal.

In some examples of the method, apparatuses, and non-transitory computer-readable medium described herein, the first transmission from the first UE and the first transmission from the second UE may be received at the second antenna array of the wireless repeater.

Some examples of the method, apparatuses, and non-transitory computer-readable medium described herein may further include operations, features, means, or instructions for generating the first signal and the second signal using a beamforming network that may be based on a Butler matrix and coupled with the second antenna array.

Some examples of the method, apparatuses, and non-transitory computer-readable medium described herein may further include operations, features, means, or instructions for routing a signal from a first antenna of the second antenna array to a first quadrature coupler, and obtaining the first signal associated with the first UE based on an output of the first quadrature coupler.

Some examples of the method, apparatuses, and non-transitory computer-readable medium described herein may further include operations, features, means, or instructions for routing a signal from a second antenna of the second antenna array to the first quadrature coupler, and obtaining the first signal associated with the first UE based on routing the signal from the second antenna to the first quadrature coupler.

Some examples of the method, apparatuses, and non-transitory computer-readable medium described herein may further include operations, features, means, or instructions for obtaining the second signal associated with the second UE based on a second output from the first quadrature coupler.

Some examples of the method, apparatuses, and non-transitory computer-readable medium described herein may further include operations, features, means, or instructions for routing a signal from a second antenna of the second antenna array to a second quadrature coupler, and obtaining the second signal associated with the second UE based on an output of the second quadrature coupler.

Some examples of the method, apparatuses, and non-transitory computer-readable medium described herein may further include operations, features, means, or instructions for obtaining the first signal associated with the first UE based on the output from the second quadrature coupler.

In some examples of the method, apparatuses, and non-transitory computer-readable medium described herein, the transmission from the first UE may be received at the second antenna array of the wireless repeater and the transmission from the second UE may be received at a third antenna array of the wireless repeater.

Some examples of the method, apparatuses, and non-transitory computer-readable medium described herein may further include operations, features, means, or instructions for receiving, at the first antenna array of the wireless repeater, a second unicast transmission via directional beamforming, mapping the second unicast transmission to a set of beamforming directions including the first beamforming direction and the second beamforming direction, and transmitting, using at least the second antenna array of the wireless repeater, a multicast transmission to a set of UEs including the first UE and the second UE, the multicast transmission based on the second unicast transmission and in the set of beamforming directions.

Some examples of the method, apparatuses, and non-transitory computer-readable medium described herein may further include operations, features, means, or instructions for transmitting the unicast transmission in a single beamforming direction.

Some examples of the method, apparatuses, and non-transitory computer-readable medium described herein may further include operations, features, means, or instructions for routing the first signal associated with the first UE to a first signal path within the wireless repeater, routing the second signal associated with the second UE to a second signal path within the wireless repeater, and aggregating the first signal and the second signal based on routing the first signal to the first signal path and routing the second signal to the second signal path.

DETAILED DESCRIPTION

Figure 1:
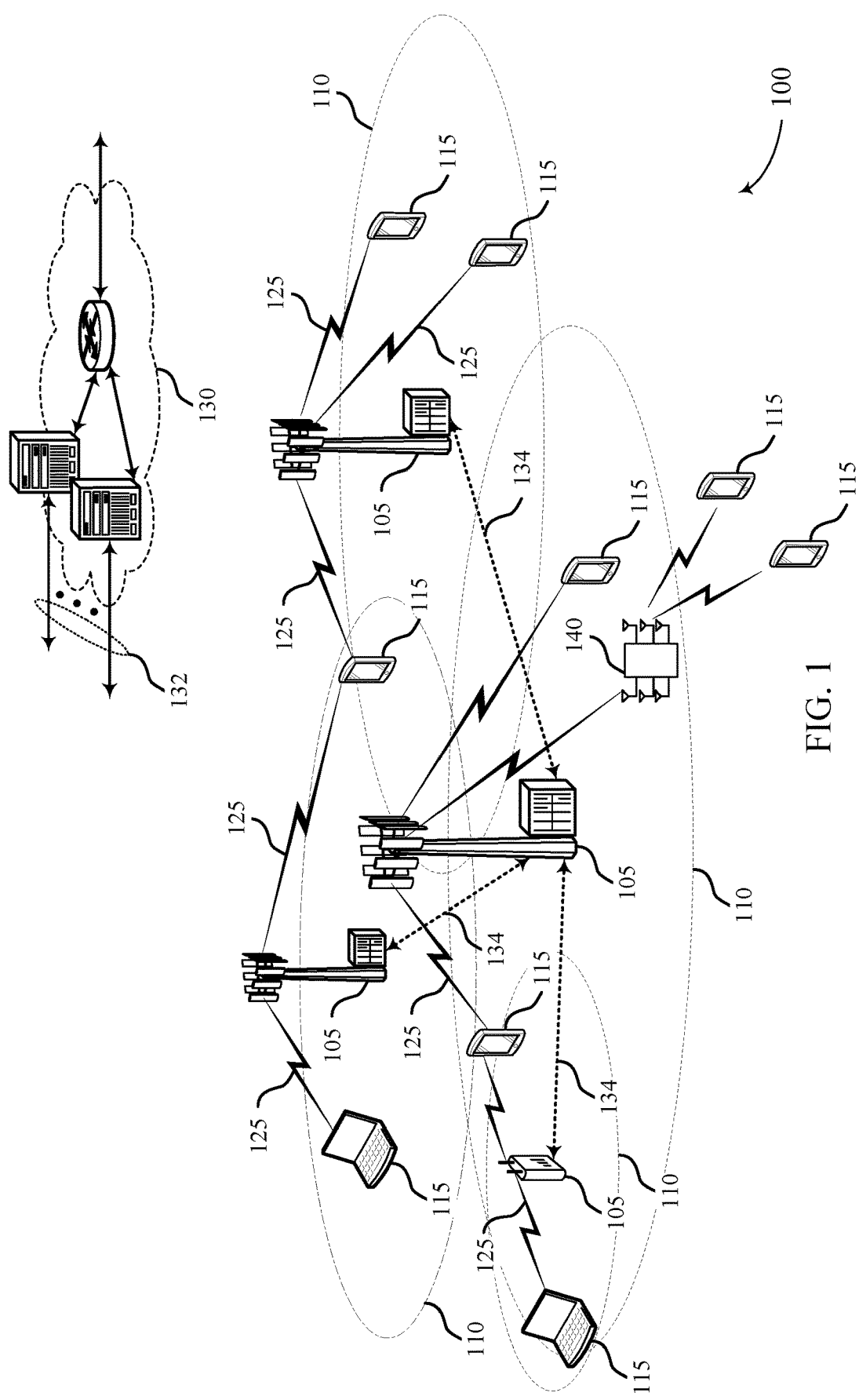
FIG. 1 illustrates an example of a wireless communications system that supports a beamforming multicast repeater in accordance with aspects of the present disclosure.

In some cases, a wireless repeater may receive unicast signals from a base station and may retransmit the unicast signals to a user equipment (UE). The unicast signals may be received at a first antenna array and may be retransmitted at a second antenna array. In some cases, the wireless repeater may amplify the unicast signal or perform other modifications on the unicast signal before retransmitting the unicast signal to the UE. Some wireless repeaters may not have capabilities or be configured to transmit or receive multiple signals from multiple UEs. Additionally or alternatively, some wireless repeaters may not have capabilities or be configured to receive and transmit simultaneously and/or to process uplink and downlink unicast signals simultaneously.

To support such capabilities, a wireless repeater may receive a unicast transmission (e.g., from a base station) and may map the unicast transmission to a set of beamforming directions. For instance, the wireless repeater may select the set of beamforming directions and may route the unicast transmission or a signal derived from the unicast transmission along a corresponding set of signal paths. Each signal path may be associated with one of the set of beamforming directions. Upon performing the mapping, the wireless repeater may transmit a multicast transmission along the set of beamforming directions. Transmitting the multicast transmission may involve retransmitting the unicast transmission or the unicast-derived signal in each of the set of beamforming directions. In one example, each signal path may correspond to a respective antenna array along which the unicast-derived signal may be transmitted. For instance, a unicast-derived signal along a first signal path may be transmitted at a second antenna array of the wireless repeater and the unicast-derived signal along a second signal path may be transmitted at a third antenna array of the wireless repeater. In another example, the unicast-derived signal along the first signal path and the unicast-derived signal along the second signal path may be transmitted at a single antenna array. In such an example, the first signal path and the second signal path may feed into a beamforming network that is associated with a Butler matrix and that is coupled with the single antenna array.

Additionally or alternatively, a wireless repeater may receive multiple transmissions from multiple UEs. For instance, the wireless repeater may receive a transmission from a first UE at a first beamforming direction and may receive a transmission from a second UE at a second beamforming direction. In one case, each transmission may be received by a different antenna array. For instance, the second antenna array may receive the transmission from the first UE and the third antenna array may receive the transmission from the second UE. In another case, all transmissions may be received by a same antenna array. In such cases, the antenna array may feed into a beamforming network that is associated with a Butler matrix. In either case, the transmissions from the first and second UEs or signals derived from the transmissions may be aggregated. The wireless transmitter may transmit a unicast transmission derived from the aggregated signal or the aggregated signal itself to the base station. In some cases, the unicast transmission or the aggregated signal may be transmitted at the first antenna array.

When the wireless repeater is assisting in time division duplexing (TDD) operations, the wireless repeater may switch between a downlink configuration (e.g., a configuration for receiving a unicast transmission and transmitting a multicast transmission) and an uplink configuration (e.g., a configuration for receiving transmissions, such as from multiple UEs, and transmitting a unicast transmission). In some examples, the wireless repeater may perform the switch such that the signals associated with the uplink configuration and signals associated with the downlink configuration pass through a same set of power components (e.g., low noise amplifiers (LNAs), power amplifier (PA) drivers, PAs, or a combination thereof). In other examples, the wireless repeater may perform the switch such that signals associated with the first configuration pass through a first set of power components and signals associated with the second configuration pass through a second set of power components.

When the wireless repeater is assisting in frequency division duplexing (FDD) operations, the wireless repeater may be configured to perform uplink and downlink operations simultaneously. In one embodiment, the wireless repeater may receive a unicast transmission, transmit a corresponding multicast transmission, or perform otherwise performing downlink processing associated with the unicast transmission and/or multicast transmission at a time at least partially overlapping (concurrent) with receiving transmissions from multiple UEs, transmitting a corresponding unicast transmission, or otherwise performing uplink processing associated with the transmissions from the multiple UEs and/or the unicast transmission to be transmitted. In another embodiment (e.g., when the wireless repeater is assisting in single FDD (SFDD) operations), the wireless repeater may receive a unicast transmission from a UE or otherwise perform downlink processing associated with the received unicast transmission at a time at least partially overlapping with transmitting the unicast transmission to the UE or otherwise performing uplink processing associated the unicast transmission to be transmitted.

Aspects of the disclosure are initially described in the context of a wireless communications system. Additional aspects of the disclosure are further described in the context of an additional wireless communications system, a Butler matrix network scheme, signal processing chains, and a process flow. Aspects of the disclosure are further illustrated by and described with reference to apparatus diagrams, system diagrams, and flowcharts that relate to a beamforming multicast repeater.

FIG. 1 illustrates an example of a wireless communications system 100 that supports a beamforming multicast repeater in accordance with aspects of the present disclosure. The wireless communications system 100 includes base stations 105, UEs 115, and a core network 130. In some examples, the wireless communications system 100 may be a Long Term Evolution (LTE) network, an LTE-Advanced (LTE-A) network, an LTE-A Pro network, or a New Radio (NR) network. In some cases, wireless communications system 100 may support enhanced broadband communications, ultra-reliable (e.g., mission critical) communications, low latency communications, or communications with low-cost and low-complexity devices.

Base stations 105 may wirelessly communicate with UEs 115 via one or more base station antennas. Base stations 105 described herein may include or may be referred to by those skilled in the art as a base transceiver station, a radio base station, an access point, a radio transceiver, a NodeB, an eNodeB (eNB), a next-generation NodeB or giga-NodeB (either of which may be referred to as a gNB), a Home NodeB, a Home eNodeB, or some other suitable terminology. Wireless communications system 100 may include base stations 105 of different types (e.g., macro or small cell base stations). The UEs 115 described herein may be able to communicate with various types of base stations 105 and network equipment including macro eNBs, small cell eNBs, gNBs, relay base stations, and the like.

Each base station 105 may be associated with a particular geographic coverage area 110 in which communications with various UEs 115 is supported. Each base station 105 may provide communication coverage for a respective geographic coverage area 110 via communication links 125, and communication links 125 between a base station 105 and a UE 115 may utilize one or more carriers. Communication links 125 shown in wireless communications system 100 may include uplink transmissions from a UE 115 to a base station 105, or downlink transmissions from a base station 105 to a UE 115. Downlink transmissions may also be called forward link transmissions while uplink transmissions may also be called reverse link transmissions.

The geographic coverage area 110 for a base station 105 may be divided into sectors making up a portion of the geographic coverage area 110, and each sector may be associated with a cell. For example, each base station 105 may provide communication coverage for a macro cell, a small cell, a hot spot, or other types of cells, or various combinations thereof. In some examples, a base station 105 may be movable and therefore provide communication coverage for a moving geographic coverage area 110. In some examples, different geographic coverage areas 110 associated with different technologies may overlap, and overlapping geographic coverage areas 110 associated with different technologies may be supported by the same base station 105 or by different base stations 105. The wireless communications system 100 may include, for example, a heterogeneous LTE/LTE-A/LTE-A Pro or NR network in which different types of base stations 105 provide coverage for various geographic coverage areas 110.

The term "cell" refers to a logical communication entity used for communication with a base station 105 (e.g., over a carrier), and may be associated with an identifier for distinguishing neighboring cells (e.g., a physical cell identifier (PCID), a virtual cell identifier (VCID)) operating via the same or a different carrier. In some examples, a carrier may support multiple cells, and different cells may be configured according to different protocol types (e.g., machine-type communication (MTC), narrowband Internet-of-Things (NB-IoT), enhanced mobile broadband (eMBB), or others) that may provide access for different types of devices. In some cases, the term "cell" may refer to a portion of a geographic coverage area 110 (e.g., a sector) over which the logical entity operates.

UEs 115 may be dispersed throughout the wireless communications system 100, and each UE 115 may be stationary or mobile. A UE 115 may also be referred to as a mobile device, a wireless device, a remote device, a handheld device, or a subscriber device, or some other suitable terminology, where the "device" may also be referred to as a unit, a station, a terminal, or a client. A UE 115 may also be a personal electronic device such as a cellular phone, a personal digital assistant (PDA), a tablet computer, a laptop computer, or a personal computer. In some examples, a UE 115 may also refer to a wireless local loop (WLL) station, an Internet of Things (IoT) device, an Internet of Everything (IoE) device, or an MTC device, or the like, which may be implemented in various articles such as appliances, vehicles, meters, or the like.

Some UEs 115, such as MTC or IoT devices, may be low cost or low complexity devices, and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples half-duplex communications may be performed at a reduced peak rate. Other power conservation techniques for UEs 115 include entering a power saving "deep sleep" mode when not engaging in active communications, or operating over a limited bandwidth (e.g., according to narrowband communications). In some cases, UEs 115 may be designed to support critical functions (e.g., mission critical functions), and a wireless communications system 100 may be configured to provide ultra-reliable communications for these functions.

In some cases, a UE 115 may also be able to communicate directly with other UEs 115 (e.g., using a peer-to-peer (P2P) or device-to-device (D2D) protocol). One or more of a group of UEs 115 utilizing D2D communications may be within the geographic coverage area 110 of a base station 105. Other UEs 115 in such a group may be outside the geographic coverage area 110 of a base station 105, or be otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out between UEs 115 without the involvement of a base station 105.

Base stations 105 may communicate with the core network 130 and with one another. For example, base stations 105 may interface with the core network 130 through backhaul links 132 (e.g., via an S1, N2, N3, or other interface). Base stations 105 may communicate with one another over backhaul links 134 (e.g., via an X2, Xn, or other interface) either directly (e.g., directly between base stations 105) or indirectly (e.g., via core network 130).

The core network 130 may provide user authentication, access authorization, tracking, Internet Protocol (IP) connectivity, and other access, routing, or mobility functions. The core network 130 may be an evolved packet core (EPC), which may include at least one mobility management entity (MME), at least one serving gateway (S-GW), and at least one Packet Data Network (PDN) gateway (P-GW). The MME may manage non-access stratum (e.g., control plane) functions such as mobility, authentication, and bearer management for UEs 115 served by base stations 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP Multimedia Subsystem (IMS), or a Packet-Switched (PS) Streaming Service.

At least some of the network devices, such as a base station 105, may include subcomponents such as an access network entity, which may be an example of an access node controller (ANC). Each access network entity may communicate with UEs 115 through a number of other access network transmission entities, which may be referred to as a radio head, a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

Wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band, since the wavelengths range from approximately one decimeter to one meter in length. UHF waves may be blocked or redirected by buildings and environmental features. However, the waves may penetrate structures sufficiently for a macro cell to provide service to UEs 115 located indoors. Transmission of UHF waves may be associated with smaller antennas and shorter range (e.g., less than 100 km) compared to transmission using the smaller frequencies and longer waves of the high frequency (HF) or very high frequency (VHF) portion of the spectrum below 300 MHz.

Wireless communications system 100 may also operate in a super high frequency (SHF) region using frequency bands from 3 GHz to 30 GHz, also known as the centimeter band. The SHF region includes bands such as the 5 GHz industrial, scientific, and medical (ISM) bands, which may be used opportunistically by devices that may be capable of tolerating interference from other users.

Wireless communications system 100 may also operate in an extremely high frequency (EHF) region of the spectrum (e.g., from 30 GHz to 300 GHz), also known as the millimeter band. In some examples, wireless communications system 100 may support millimeter wave (mmW) communications between UEs 115 and base stations 105, and EHF antennas of the respective devices may be even smaller and more closely spaced than UHF antennas. In some cases, this may facilitate use of antenna arrays within a UE 115. However, the propagation of EHF transmissions may be subject to even greater atmospheric attenuation and shorter range than SHF or UHF transmissions. Techniques disclosed herein may be employed across transmissions that use one or more different frequency regions, and designated use of bands across these frequency regions may differ by country or regulating body.

In some cases, wireless communications system 100 may utilize both licensed and unlicensed radio frequency spectrum bands. For example, wireless communications system 100 may employ License Assisted Access (LAA), LTE-Unlicensed (LTE-U) radio access technology, or NR technology in an unlicensed band such as the 5 GHz ISM band. When operating in unlicensed radio frequency spectrum bands, wireless devices such as base stations 105 and UEs 115 may employ listen-before-talk (LBT) procedures to ensure a frequency channel is clear before transmitting data. In some cases, operations in unlicensed bands may be based on a carrier aggregation configuration in conjunction with component carriers operating in a licensed band (e.g., LAA). Operations in unlicensed spectrum may include downlink transmissions, uplink transmissions, peer-to-peer transmissions, or a combination of these. Duplexing in unlicensed spectrum may be based on frequency division duplexing (FDD), time division duplexing (TDD), or a combination of both.

In some examples, base station 105 or UE 115 may be equipped with multiple antennas, which may be used to employ techniques such as transmit diversity, receive diversity, multiple-input multiple-output (MIMO) communications, or beamforming. For example, wireless communications system 100 may use a transmission scheme between a transmitting device (e.g., a base station 105) and a receiving device (e.g., a UE 115), where the transmitting device is equipped with multiple antennas and the receiving device is equipped with one or more antennas. MIMO communications may employ multipath signal propagation to increase the spectral efficiency by transmitting or receiving multiple signals via different spatial layers, which may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream, and may carry bits associated with the same data stream (e.g., the same codeword) or different data streams. Different spatial layers may be associated with different antenna ports used for channel measurement and reporting. MIMO techniques include single-user MIMO (SU-MIMO) where multiple spatial layers are transmitted to the same receiving device, and multi-user MIMO (MU-MIMO) where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105 or a UE 115) to shape or steer an antenna beam (e.g., a transmit beam or receive beam) along a spatial path between the transmitting device and the receiving device. Beamforming may be achieved by combining the signals communicated via antenna elements of an antenna array such that signals propagating at particular orientations with respect to an antenna array experience constructive interference while others experience destructive interference. The adjustment of signals communicated via the antenna elements may include a transmitting device or a receiving device applying certain amplitude and phase offsets to signals carried via each of the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In one example, a base station 105 may use multiple antennas or antenna arrays to conduct beamforming operations for directional communications with a UE 115. For instance, some signals (e.g. synchronization signals, reference signals, beam selection signals, or other control signals) may be transmitted by a base station 105 multiple times in different directions, which may include a signal being transmitted according to different beamforming weight sets associated with different directions of transmission. Transmissions in different beam directions may be used to identify (e.g., by the base station 105 or a receiving device, such as a UE 115) a beam direction for subsequent transmission and/or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based at least in in part on a signal that was transmitted in different beam directions. For example, a UE 115 may receive one or more of the signals transmitted by the base station 105 in different directions, and the UE 115 may report to the base station 105 an indication of the signal the UE 115 received with a highest signal quality, or an otherwise acceptable signal quality. Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115), or transmitting a signal in a single direction (e.g., for transmitting data to a receiving device).

A receiving device (e.g., a UE 115, which may be an example of a mmW receiving device) may try multiple receive beams when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets applied to signals received at a plurality of antenna elements of an antenna array, or by processing received signals according to different receive beamforming weight sets applied to signals received at a plurality of antenna elements of an antenna array, any of which may be referred to as "listening" according to different receive beams or receive directions. In some examples a receiving device may use a single receive beam to receive along a single beam direction (e.g., when receiving a data signal). The single receive beam may be aligned in a beam direction determined based on listening according to different receive beam directions (e.g., a beam direction determined to have a highest signal strength, highest signal-to-noise ratio, or otherwise acceptable signal quality based on listening according to multiple beam directions).

In some cases, the antennas of a base station 105 or UE 115 may be located within one or more antenna arrays, which may support MIMO operations, or transmit or receive beamforming. For example, one or more base station antennas or antenna arrays may be co-located at an antenna assembly, such as an antenna tower. In some cases, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations.

In some cases, wireless communications system 100 may be a packet-based network that operate according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use hybrid automatic repeat request (HARQ) to provide retransmission at the MAC layer to improve link efficiency. In the control plane, the Radio Resource Control (RRC) protocol layer may provide establishment, configuration, and maintenance of an RRC connection between a UE 115 and a base station 105 or core network 130 supporting radio bearers for user plane data. At the Physical layer, transport channels may be mapped to physical channels.

In some cases, UEs 115 and base stations 105 may support retransmissions of data to increase the likelihood that data is received successfully. HARQ feedback is one technique of increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., signal-to-noise conditions). In some cases, a wireless device may support same-slot HARQ feedback, where the device may provide HARQ feedback in a specific slot for data received in a previous symbol in the slot. In other cases, the device may provide HARQ feedback in a subsequent slot, or according to some other time interval.

Time intervals in LTE or NR may be expressed in multiples of a basic time unit, which may, for example, refer to a sampling period of $T_s=1/30,720,000$ seconds. Time intervals of a communications resource may be organized according to radio frames each having a duration of 10 milliseconds (ms), where the frame period may be expressed as $T_f=307,200$ $T_s$. The radio frames may be identified by a system frame number (SFN) ranging from 0 to 1023. Each frame may include 10 subframes numbered from 0 to 9, and each subframe may have a duration of 1 ms. A subframe may be further divided into 2 slots each having a duration of 0.5 ms, and each slot may contain 6 or 7 modulation symbol periods (e.g., depending on the length of the cyclic prefix prepended to each symbol period). Excluding the cyclic prefix, each symbol period may contain 2048 sampling periods. In some cases, a subframe may be the smallest scheduling unit of the wireless communications system 100, and may be referred to as a transmission time interval (TTI). In other cases, a smallest scheduling unit of the wireless communications system 100 may be shorter than a subframe or may be dynamically selected (e.g., in bursts of shortened TTIs (sTTIs) or in selected component carriers using sTTIs).

In some wireless communications systems, a slot may further be divided into multiple mini-slots containing one or more symbols. In some instances, a symbol of a mini-slot or a mini-slot may be the smallest unit of scheduling. Each symbol may vary in duration depending on the subcarrier spacing or frequency band of operation, for example. Further, some wireless communications systems may implement slot aggregation in which multiple slots or mini-slots are aggregated together and used for communication between a UE 115 and a base station 105.

The term "carrier" refers to a set of radio frequency spectrum resources having a defined physical layer structure for supporting communications over a communication link 125. For example, a carrier of a communication link 125 may include a portion of a radio frequency spectrum band that is operated according to physical layer channels for a given radio access technology. Each physical layer channel may carry user data, control information, or other signaling. A carrier may be associated with a pre-defined frequency channel (e.g., an evolved universal mobile telecommunication system terrestrial radio access (E-UTRA) absolute radio frequency channel number (EARFCN)), and may be positioned according to a channel raster for discovery by UEs 115. Carriers may be downlink or uplink (e.g., in an FDD mode), or be configured to carry downlink and uplink communications (e.g., in a TDD mode). In some examples, signal waveforms transmitted over a carrier may be made up of multiple sub-carriers (e.g., using multi-carrier modulation (MCM) techniques such as orthogonal frequency division multiplexing (OFDM) or discrete Fourier transform spread OFDM (DFT-S-OFDM)).

The organizational structure of the carriers may be different for different radio access technologies (e.g., LTE, LTE-A, LTE-A Pro, NR). For example, communications over a carrier may be organized according to TTIs or slots, each of which may include user data as well as control information or signaling to support decoding the user data. A carrier may also include dedicated acquisition signaling (e.g., synchronization signals or system information, etc.) and control signaling that coordinates operation for the carrier. In some examples (e.g., in a carrier aggregation configuration), a carrier may also have acquisition signaling or control signaling that coordinates operations for other carriers.

Physical channels may be multiplexed on a carrier according to various techniques. A physical control channel and a physical data channel may be multiplexed on a downlink carrier, for example, using time division multiplexing (TDM) techniques, frequency division multiplexing (FDM) techniques, or hybrid TDM-FDM techniques. In some examples, control information transmitted in a physical control channel may be distributed between different control regions in a cascaded manner (e.g., between a common control region or common search space and one or more UE-specific control regions or UE-specific search spaces).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of predetermined bandwidths for carriers of a particular radio access technology (e.g., 1.4, 3, 5, 10, 15, 20, 40, or 80 MHz). In some examples, each served UE 115 may be configured for operating over portions or all of the carrier bandwidth. In other examples, some UEs 115 may be configured for operation using a narrowband protocol type that is associated with a predefined portion or range (e.g., set of subcarriers or RBs) within a carrier (e.g., "in-band" deployment of a narrowband protocol type).

In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme). Thus, the more resource elements that a UE 115 receives and the higher the order of the modulation scheme, the higher the data rate may be for the UE 115. In MIMO systems, a wireless communications resource may refer to a combination of a radio frequency spectrum resource, a time resource, and a spatial resource (e.g., spatial layers), and the use of multiple spatial layers may further increase the data rate for communications with a UE 115.

Devices of the wireless communications system 100 (e.g., base stations 105 or UEs 115) may have a hardware configuration that supports communications over a particular carrier bandwidth, or may be configurable to support communications over one of a set of carrier bandwidths. In some examples, the wireless communications system 100 may include base stations 105 and/or UEs 115 that support simultaneous communications via carriers associated with more than one different carrier bandwidth.

Wireless communications system 100 may support communication with a UE 115 on multiple cells or carriers, a feature which may be referred to as carrier aggregation or multi-carrier operation. A UE 115 may be configured with multiple downlink component carriers and one or more uplink component carriers according to a carrier aggregation configuration. Carrier aggregation may be used with both FDD and TDD component carriers.

In some cases, wireless communications system 100 may utilize enhanced component carriers (eCCs). An eCC may be characterized by one or more features including wider carrier or frequency channel bandwidth, shorter symbol duration, shorter TTI duration, or modified control channel configuration. In some cases, an eCC may be associated with a carrier aggregation configuration or a dual connectivity configuration (e.g., when multiple serving cells have a suboptimal or non-ideal backhaul link). An eCC may also be configured for use in unlicensed spectrum or shared spectrum (e.g., where more than one operator is allowed to use the spectrum). An eCC characterized by wide carrier bandwidth may include one or more segments that may be utilized by UEs 115 that are not capable of monitoring the whole carrier bandwidth or are otherwise configured to use a limited carrier bandwidth (e.g., to conserve power).

In some cases, an eCC may utilize a different symbol duration than other component carriers, which may include use of a reduced symbol duration as compared with symbol durations of the other component carriers. A shorter symbol duration may be associated with increased spacing between adjacent subcarriers. A device, such as a UE 115 or base station 105, utilizing eCCs may transmit wideband signals (e.g., according to frequency channel or carrier bandwidths of 20, 40, 60, 80 MHz, etc.) at reduced symbol durations (e.g., 16.67 microseconds). A TTI in eCC may consist of one or multiple symbol periods. In some cases, the TTI duration (that is, the number of symbol periods in a TTI) may be variable.

Wireless communications system 100 may be an NR system that may utilize any combination of licensed, shared, and unlicensed spectrum bands, among others. The flexibility of eCC symbol duration and subcarrier spacing may allow for the use of eCC across multiple spectrums. In some examples, NR shared spectrum may increase spectrum utilization and spectral efficiency, specifically through dynamic vertical (e.g., across the frequency domain) and horizontal (e.g., across the time domain) sharing of resources.

Wireless communications system 100 may include one or more wireless repeaters 140. The wireless repeaters 140 may include functionality of base station 105 and/or UE 115 for repeating, extending, and/or redirecting wireless signals. In some cases, a wireless repeater 140 may be used in line of sight (LOS) or non-line of sight (NLOS) scenarios. In a LOS scenario, transmissions, such as mmW transmissions, may be limited by path-loss through air, which may be overcome using beamforming techniques at the wireless repeater. In an NLOS scenario, such as in an urban area or indoors, mmW transmissions may be blocked by signal block or signal interfering physical objects. A mmW wireless repeater 140 may be utilized to receive a signal from a base station 105 and transmit the signal to one or more UEs 115. Additionally, the mmW wireless repeater 140 may be used to receive signals from multiple UEs and transmit an aggregated signal associated with the UE signals to the base station 105. Beamforming and gain control techniques may be utilized to improve signal quality between the base station 105, wireless repeater 140, and the UE 115 by isolating signals (e.g., via beamforming) and improving or maintaining stability within a signal processing chain of the repeater (e.g., via gain control).

The mmW wireless repeater 140 may include an array of antennas for communications with the base station 105 and one or more arrays of antennas for communication with the one or more UEs 115. For instance, the wireless repeater 140 may include an array of antennas for each UE with which the wireless repeater 140 may communicate. Alternatively, the wireless repeater may include a single array of antennas for communication with the one or more UEs 115. The single array of antennas may be coupled with a beamforming network associated with a Butler matrix. The array of antennas for communications with the base station 105 and the single antenna may include a same set of dual-pole antennas, where the dual pole antennas may function in a first polarization as the array of antennas for communications with the base station 105 and the dual pole antennas function in a second polarization may function as the single array of antennas for communication with the one or more UEs 115. In some cases, the antennas may include meta-material antennas or antenna arrays. The wireless repeater 140 may further include a beam control system, which may include a system on a chip (SoC) for controlling transmit and/or receive beams (e.g., controlling to reduce signal interference caused by retransmission).

In some cases, the mmW wireless repeater 140 may be an analog radio frequency (RF) repeater, and the mmW wireless repeater may include a signal process chain connected (e.g., coupled, linked, attached) between the array of antennas for communication with the base stations 105 and the one or more array of antennas for communication with the one or more UEs 115. The signal processing chain may be implemented as a radio frequency integrated circuit (RFIC), and may include RF or microwave components such as one or more phase shifters, LNAs, PAs, PA drivers, gain controllers, power detectors, or other circuitry. The phase shifters may be controlled by one or more beam controllers for beamforming to reduce signal interference.

As described, the mmW wireless repeater 140 may include components (e.g., antenna arrays and signal processing chain circuitry) in the analog/RF domain. Accordingly, the mmW wireless repeater may not include any digital components for various features described herein. In some cases, the mmW wireless repeater may include side channel components for receiving beamforming configurations from a base station 105 or other device. Example side channels may be implemented as Bluetooth, ultra-wide band, wireless local-area network (LAN), etc. protocols, and as such, the repeater may include circuitry and/or processors for receiving and/or processing signals received via those protocols and controlling beamforming at the RF/microwave components based on those signals received at the side channel.

A wireless repeater 140 may receive a unicast transmission and may transmit a corresponding multicast transmission to a set of UEs 115 along a set of beamforming directions. Transmitting the multicast transmission may involve retransmitting the unicast transmission or a signal derived from the unicast transmission in each of the beamforming directions. The multicast transmission may be transmitted over multiple antenna arrays or a single antenna array associated with a Butler matrix. Additionally or alternatively, the wireless repeater 140 may receive transmissions from multiple UEs 115; may form an aggregated signal associated with the received transmissions; and may transmit a unicast transmission associated with the aggregated signal (e.g., to a base station). The multiple UE transmissions may be received over multiple antenna arrays or over a single antenna array associated with a Butler matrix.

In some examples, the wireless repeater 140 may switch between a downlink configuration (e.g., a configuration for receiving a unicast transmission and transmitting a multicast transmission, such as to multiple UEs 115) and an uplink configuration (e.g., a configuration for receiving transmissions from multiple sources, such as multiple UEs 115, and transmitting a unicast transmission). In other examples, the wireless repeater 140 may be configured to assist in downlink and uplink operations simultaneously. For instance, the wireless repeater 140 may be configured to receive unicast transmissions and transmissions from multiple UEs 115 simultaneously or to transmit unicast transmissions and multicast transmissions simultaneously. Alternatively, the wireless repeater 140 may be configured to receive unicast transmissions and to transmit unicast transmissions simultaneously.

Figure 2:
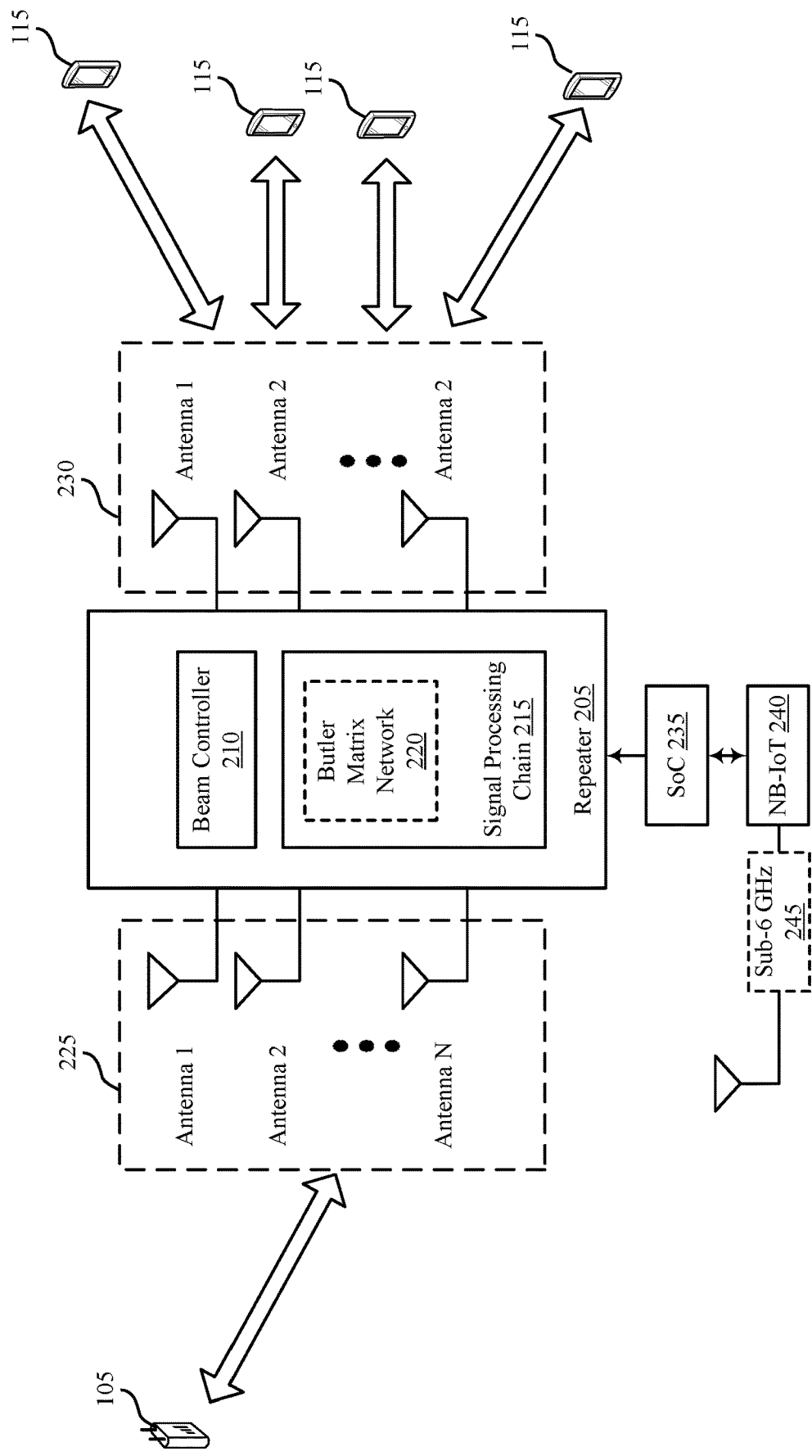
FIG. 2 illustrates an example of a block diagram that supports a beamforming multicast repeater in accordance with aspects of the present disclosure.

FIG. 2 illustrates an example of a block diagram 200 of a wireless repeater 205, which may also be referred to as a wireless repeater 205, in accordance with aspects of the present disclosure. In some examples, the devices of FIG. 2 may implement aspects of wireless communications system 100, and the wireless repeater 205 may be an example of the wireless repeater 140 as described with reference to FIG. 1. The block diagram 200 may include a base station 105 and UEs 115. The wireless repeater 205 may include antenna arrays 225 and 230. Antenna array 225 may perform communications with the base station 105 and antenna array 230 may perform communications with the UEs 115. Antenna arrays 225 and 230 may include meta-material antennas. In some cases, antenna arrays 225 and 230 may be the same set of dual pole antennas functioning first and second polarizations for transmission and reception. In some cases, antenna array 230 may be replaced with a set of antenna arrays for communicating with the UEs 115, where each of the set of antenna arrays may communicate with a different one of the UEs 115. Alternatively, antenna array 225 may be communicating with a UE 115 and/or antenna array 230 may be communicating with one or more base stations 105 without deviating from the scope of the present disclosure.

The wireless repeater 205 may further include a beam controller 210 and a signal processing chain 215, which may include various circuitry including one or more PAs, LNAs, phase shifters, dividers, and/or combiners. The signal processing chain may include various analog/RF domain components and may be implemented as an RFIC (e.g., a monolithic microwave integrated circuit (MMIC)). Beam controller 210 (e.g., a beamformer) may control beam direction and width of the antenna array 225 using the phase shifters of the signal processing chain 215 to improve or maintain isolation between various reception and transmission beams. In some cases, the beam controller 210, using the phase shifters, may control beam direction to ensure target reception and/or that transmission beams are sufficiently spread apart to avoid interference. Further, the beam controller 210 may utilize antenna adjustments to adjust beam width, such as certain amplitude and phase offsets to signals carried via the antenna elements of the antenna array 225. In some cases, the adjustments associated with the antenna elements may be defined by a beamforming weight set associated with antenna array 225.

If each UE 115 is performing communications with separate antenna arrays 230 of the wireless repeater 205 (e.g., a first UE 115 is in contact with a first antenna array of the wireless repeater 205 and a second UE 115 is in contact with a second antenna array of the wireless repeater 205), the beam controller 210 may control beam direction and width of each antenna array 230 as described above. However, if a single antenna array 230 is communicating with multiple UEs 115, the beam controller 210 may determine a set of beam directions by selecting a set of signal paths corresponding to each of the set of beamforming directions and feeding signals carried by each signal path into a beamforming network.

In some cases, the beam configurations (e.g., width and direction) as well as gain adjustments may be controlled by the base station 105 via a side control channel. For example, the beam controller 210 may be controlled by a base station 105 via a side channel implemented as a Bluetooth channel, ultra-wide band channel, wireless LAN channel, etc. Transmissions of the side channel may be received by an RF component 245 (e.g., a sub-6 GHz RF component). The RF component 245 may use narrow band internet of things (NB-IoT) 240 to communicate with an SoC 235 of the wireless repeater 205. The SoC 235 may provide the beam configurations to the wireless repeater 205. Accordingly, the wireless repeater 205 may include circuitry for receiving and/or processing side channel communications to control the beam controller 210. The base station 105 may transmit beamforming control configurations based on operating environment, position of the UEs 115, and/or configuration of the UE 115.

In some cases, the wireless repeater 205 may receive a unicast transmission from the base station 105 at antenna array 225. Upon receiving the unicast transmission, the wireless repeater 205 may map the unicast transmission to a set of beamforming directions (e.g., via the signal processing chain 215). For instance, the wireless repeater 205 may select the set of beamforming directions and may route the unicast transmission or a signal derived from the unicast transmission along a corresponding set of signal paths. Each signal path may be associated with one of the set of beamforming directions. Upon performing the mapping, the wireless repeater 205 may transmit a multicast transmission along the set of beamforming directions. Transmitting the multicast transmission may involve retransmitting the unicast transmission or the unicast-derived signal in each of the set of beamforming directions. In one example, the unicast-derived signal along the first signal path and the unicast-derived signal along the second signal path may be transmitted at the antenna array 230. In such an example, the first signal path and the second signal path may feed into a Butler matrix network 220 whose output is coupled with the antenna array 230. In another example, each signal path may correspond to an antenna array along which the unicast transmission or a unicast-derived signal may be transmitted. For instance, a unicast-derived signal along a first signal path may be transmitted at a second antenna array of the wireless repeater 205 and the unicast-derived signal along a second signal path may be transmitted at a third antenna array of the wireless repeater 205.

Additionally or alternatively, the wireless repeater 205 may receive multiple transmissions from the set of UEs 115. For instance, the wireless repeater 205 may receive a transmission from a first UE 115 at a first beamforming direction and may receive a transmission from a second UE 115 at a second beamforming direction. In one case, both transmissions may be received by the antenna array 230. Each antenna element of the antenna array 230 may feed into the Butler matrix network 220 whose outputs may be coupled with a signal aggregator (e.g., a Wilkinson combiner). The outputs may be signal paths and may each contain signals derived from the transmissions from the first and second UEs 115. For instance, a first signal path may contain an approximation of the transmission from the first UE and a second signal path may contain an approximation of the transmission from the second UE. The approximations may be combined via the signal aggregator to form an aggregated signal. In another case, each transmission may be received by a different array of antennas. For instance, a first array of antennas may receive the transmission from the first UE 115 and a second array of antennas may receive the transmission from the second UE 115. The transmission from the first UE 115 and the transmission from the second UE 115 may be combined via the signal aggregator to form an aggregated signal. In either case, the aggregated signal may be carried to the antenna array 225, which may transmit a unicast transmission derived from the aggregated signal or the aggregated signal itself to the base station 105.

When the wireless repeater 205 is assisting in TDD operations, the wireless repeater 205 may switch between a downlink configuration (e.g., a configuration for receiving a unicast transmission and transmitting a multicast transmission) and an uplink configuration (e.g., a configuration for receiving transmissions from multiple UEs 115 and transmitting a unicast transmission). In some examples, the wireless repeater 205 may perform the switch such that the signals associated with the uplink configuration and signals associated with the downlink configuration pass through a same set of power components (e.g., LNAs, PA drivers, PAs, or a combination thereof). In other examples, the wireless repeater 205 may perform the switch such that signals associated with the first configuration pass through a first set of power components and signals associated with the second configuration pass through a second set of power components.

When the wireless repeater 205 is assisting in FDD operations, the wireless repeater 205 may be configured to perform uplink and downlink operations simultaneously. In one embodiment, the wireless repeater 205 may receive a unicast transmission, transmit a corresponding multicast transmission, or perform otherwise performing downlink processing associated with the unicast transmission and/or multicast transmission at a time at least partially overlapping with receiving transmissions from multiple UEs 115, transmitting a corresponding unicast transmission, or otherwise performing uplink processing associated with the transmissions from the multiple UEs 115 and/or the unicast transmission to be transmitted. In another embodiment (e.g., when the wireless repeater 205 is assisting in SFDD operations), the wireless repeater 205 may receive a unicast transmission from a UE 115 or otherwise performing downlink processing associated with the received unicast transmission at a time at least partially overlapping with transmitting the unicast transmission to the UE 115 or otherwise performing uplink processing associated the unicast transmission to be transmitted.

Figure 3:
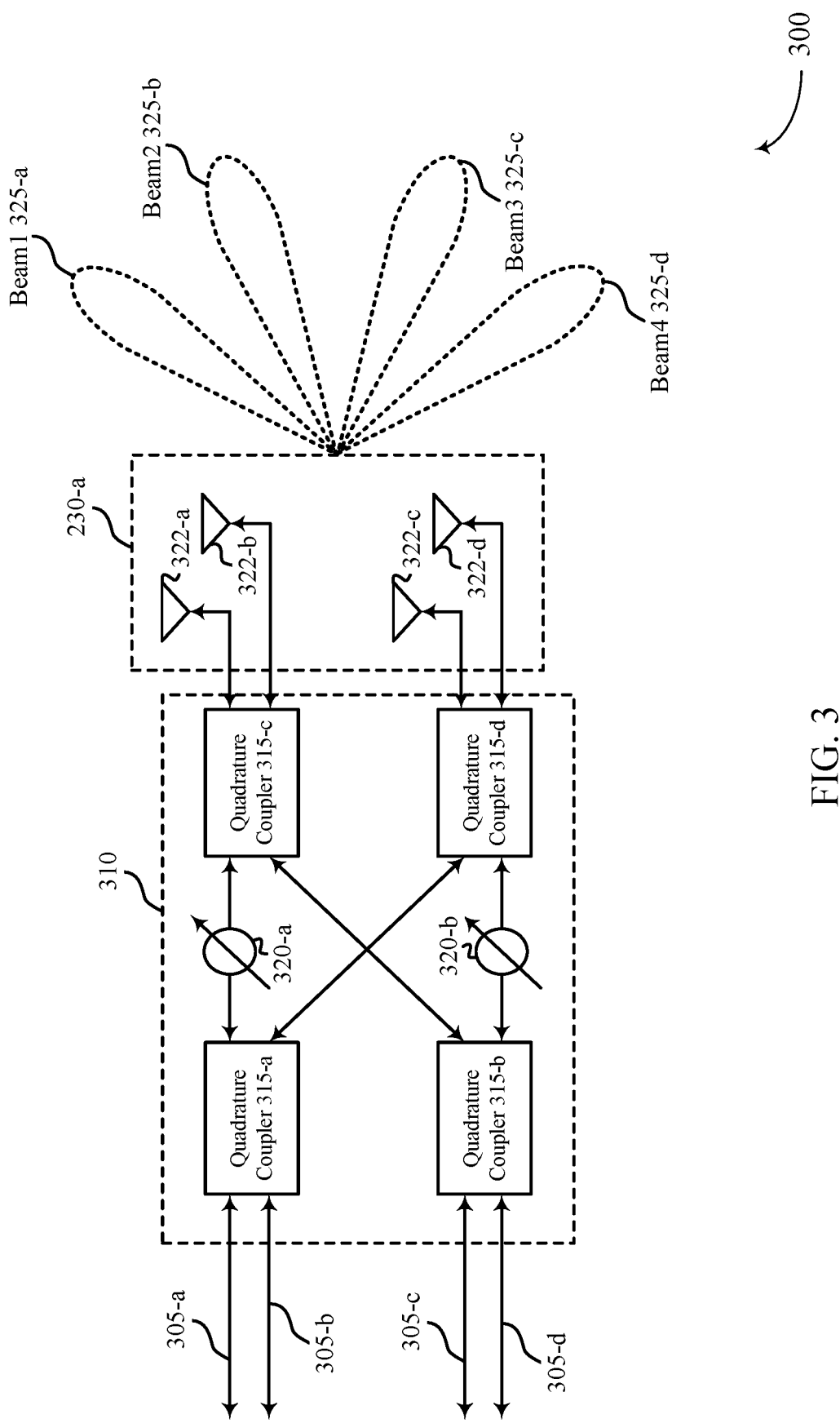
FIG. 3 illustrates an example of a Butler matrix network scheme that supports a beamforming multicast repeater in accordance with aspects of the present disclosure.

FIG. 3 illustrates an example of a Butler matrix network scheme 300 in accordance with aspects of the present disclosure. In some examples, Butler matrix network scheme 300 may implement aspects of FIG. 2. For instance, the Butler matrix network scheme 300 may include a Butler matrix network 310, which may be an example of a Butler matrix network 220 as described with reference to FIG. 3. Additionally, antenna array 230-a may be an example of an antenna array 230 as described with reference to FIG. 3. Signal paths 305-a, 305-b, 305-c, and 305-d may correspond to beams 325-a, 325-b, 325-c, and 325-d, respectively. The Butler matrix network 310 may perform a spatial fast fourier transform (FFT) in one direction (e.g., from left to right) and may perform a spatial inverse FFT (IFFT) in other.

The Butler matrix network 310 may be composed of quadrature couplers 315, which may also be referred to as branch-line couplers, and phase shifters 320. At high frequencies (such as SHF, EHF, and/or mmW wave band and beyond), it is understood that signal paths 305—as well as other signal paths connecting quadrature couplers 315, phase shifters 320, and antenna elements 322—may include transmission lines and/or waveguides. In some cases, a butler matrix network 310 may be divided into a number of stages equal to $\log_2(N)$, where N may be a number of inputs into the Butler matrix network 310. Each stage may have N/2 quadrature couplers 315. Additionally, each stage, except for the last stage, may have N/2 phase shifters 320. As such, each Butler matrix network 310 may have N/2 $\log_2(N)$ quadrature couplers 315 and N/2($\log_2(N)-1$) phase shifters 320. In general, N may equal $2^j$, where j is a positive integer. In the present example, j may equal 2 and N may equal 4. As such, the present example may contain 2 stages. The first stage (i.e., stage 0) may contain 2 quadrature couplers 315 (e.g., quadrature couplers 315-a and 315-b) and 2 phase shifters 320 (e.g., phase shifters 320-a and 320-b), and the second stage (i.e., stage 1) may contain 2 quadrature couplers 315 (e.g., quadrature couplers 315-c and 315-d). Quadrature couplers 315 in each stage may be associated with a level. For instance, quadrature couplers 315-a and 315-c may be associated with a first level and quadrature couplers 315-b and 315-d may be associated with a second level. In general, there may be N/2 levels per stage.

Additionally, each quadrature coupler 315 may have two inputs and two outputs. In some cases, the two inputs may become two outputs and vice-versa based on a direction of signals. For instance, if signals are entering from signal path 305, the two left terminals of a quadrature coupler 315 may be input terminals and the two right terminals may be output terminals of the quadrature coupler 315. If signals are entering from antenna elements 322, however, the right terminals of a quadrature coupler may be input terminals and the two left terminals may be output terminals. In some cases, signals that enter a phase shifter 320 or quadrature coupler 315 from one side may have their phase shifted by an amount opposite to if the signals entered the phase shifter 320 or quadrature coupler 315 at the other side. For instance, if signals are shifted by 45 degrees or 90 degrees when entering from one side, the signals may be shifted by −45 degrees or −90 degrees when entering from the other side.

With the exception of the first stage, one input into the quadrature coupler 315 may come from the same level and the other may come from a different level (e.g., one input of quadrature coupler 315-c may come from quadrature coupler 315-a and the other may come from quadrature coupler 315-b). The input that comes from the same level may have passed through a phase shifter 320. In general, the input from the different level may come from a level that is $2^{i-1}$ levels away where i may equal a stage of the quadrature coupler 315. For instance, quadrature coupler 315-c, which may be in stage 1 when viewed from left to right, may have an input that comes from $2^0=1$ level away (e.g., from quadrature coupler 315-b). Alternatively, quadrature coupler 315-a, which may be in stage 1 when viewed from right to left, may have an input that comes from $2^0=1$ level away (e.g., from quadrature coupler 315-d).

Additionally or alternatively, with the exception of the last stage, one output into the quadrature coupler 315 may go to the same level and one may go to a different level (e.g., one output of quadrature coupler 315-a may go to quadrature coupler 315-b and the other may go to quadrature coupler 315-b. The output that goes to the same level may pass through a phase shifter. In general, the output to the different level may go to a level that is $2^i$ levels away from the quadrature coupler 315. For instance, quadrature coupler 315-a, which may be in stage 0 when viewed from left to right, may have an output that goes $2^0=1$ level away (e.g., to quadrature coupler 315-d). Alternatively, quadrature coupler 315-c, which may be in stage 0 when viewed from right to left, may have an output that goes $2^0=1$ level away (e.g., to quadrature coupler 315-b).

In general, a quadrature coupler 315 may receive two input signals at the two inputs and may output the difference of the input signals at both outputs. In some cases, one of the outputs may be 90 degrees out of phase with the signal formed by the difference of the input signals. For instance, a first output signal at the first output may be directly in phase with a signal formed by the difference of the input signals and a second output signal may be 90 degrees out of phase with a signal formed by the difference of the input signals. The first output may be the coupled with a phase shifter 320 and a quadrature coupler 315 on the same level and the second output may be coupled with a quadrature coupler 315 on a different level. Alternatively, both outputs of each quadrature coupler 315 may be coupled to signal paths 305 (e.g., if the quadrature coupler 315 is in at a most internal stage) or coupled with antenna elements 322 of antenna array 230-a (e.g., if the quadrature coupler 315 is at a most external stage). In one example, a first output of quadrature coupler 315-a may be coupled to signal path 305-a and a second output of quadrature coupler 315-a may be coupled to signal path 305-b. In another example, a first output of quadrature coupler 315-c may be coupled with antenna element 322-a and a second output of quadrature coupler 315-c may be coupled with antenna element 322-b.

In one example, a first signal may enter quadrature coupler 315-a via signal path 305-a, a second signal may enter quadrature coupler 315-a via signal path 305-b, and a third signal may enter quadrature coupler 315-b via signal path 305-c. Quadrature coupler 315-a may output a first output signal that is an in-phase difference of the first and second signals at a first output terminal and may pass the first output signal to a phase shifter 320-a. The phase shifter 320-a may shift the phase of the first output signal by a predetermined amount (e.g., 45 degrees) and may pass the resulting phase-shifted first output signal to quadrature coupler 315-c. Additionally, quadrature coupler 315-a may output a second output signal that is a difference of the first and second signals 90 degrees out of phase and may pass the second output signal to quadrature coupler 315-d. Meanwhile, quadrature coupler 315-b may output a third output signal that is an in-phase version of the third signal and may pass the third output signal to phase shifter 320-b. The phase shifter 320-b may shift the phase of the third output signal by a predetermined amount (e.g., 45 degrees) and may pass the resulting phase-shifted third output signal to quadrature coupler 315-d. Additionally, quadrature coupler 315-a may output a fourth output signal that is a version of the third signal 90 degrees out of phase and may pass the fourth output signal to quadrature coupler 315-c. In some cases, the first output signal may be passed to quadrature coupler 315-d and the second output signal may be passed to phase shifter 320-a. Additionally or alternatively, the third output signal may be passed to quadrature coupler 315-a and the fourth output signal may be passed to phase shifter 320-b.

Quadrature coupler 315-c may output an in-phase difference of the phase-shifted first output signal and the third output signal to antenna element 322-a. Additionally, quadrature coupler 315-c may output a difference of the phase-shifted first output signal and the third output signal that is 90 degrees out of phase to antenna element 322-b. Quadrature coupler 315-d, meanwhile, may output an in-phase difference of the second output signal and the phase-shifted version fourth output signal to antenna element 322-c. Additionally, quadrature coupler 315-d may output a difference of the second output signal and the phase-shifted fourth output signal that is 90 degrees out of phase to antenna element 322-d. As quadrature coupler 315-c and 315-d output their corresponding signals, the first signal may be transmitted along beam 325-a, the second signal may be transmitted along beam 325-b, and the third signal may be transmitted along beam 325-c.

In another example, antenna array 230-a may receive transmissions along beams 325-a, 325-b, and 325-c. Antenna elements 322-a and 322-b may pass first and second signals, respectively, to quadrature coupler 315-c. Antenna elements 322-c and 322-d may pass third and fourth signals, respectively, to quadrature coupler 315-d. Quadrature coupler 315-c may output a first output signal that is an in-phase difference of the first and second signals and may pass the first output signal to phase shifter 320-a. Phase shifter 320-a may shift the phase of the first output signal by a predetermined amount (e.g., 45 degrees) and may pass the phase-shifted first output signal to quadrature coupler 315-a. Additionally, quadrature coupler 315-c may output a second output signal that is difference of the first and second signals out of phase by 90 degrees and may pass the second output signal to quadrature coupler 315-b. Quadrature coupler 315-d may output a third output signal that is an in-phase difference of the third and fourth signals and may pass the third output signal to phase shifter 320-b. Phase shifter 320-b may shift the phase of the third output signal by 45 degrees and may pass the phase-shifted third signal to quadrature coupler 315-b. In some cases, the first output signal may be passed to quadrature coupler 315-b and the second output signal may be passed to phase shifter 320-a. Additionally or alternatively, the third output signal may be passed to quadrature coupler 315-a and the fourth output signal may be passed to phase shifter 320-b.

Quadrature coupler 315-a may output an in-phase difference of the phase-shifted first output signal and the third output signal to signal path 305-a. The outputted signal along signal path 305-a may be an approximation of the signal received from beam 325-a. Additionally, quadrature coupler 315-a may output a difference of the phase-shifted first output signal and the third output signal that is 90 degrees out of phase to signal path 305-b. The outputted signal along signal path 305-b may be an approximation of the signal received from beam 325-b. Quadrature coupler 315-b, meanwhile, may output an in-phase difference of the second output signal and the phase-shifted version fourth output signal to signal path 305-c. The outputted signal along signal path 305-c may be an approximation of the signal received from beam 325-c.

Figure 4:
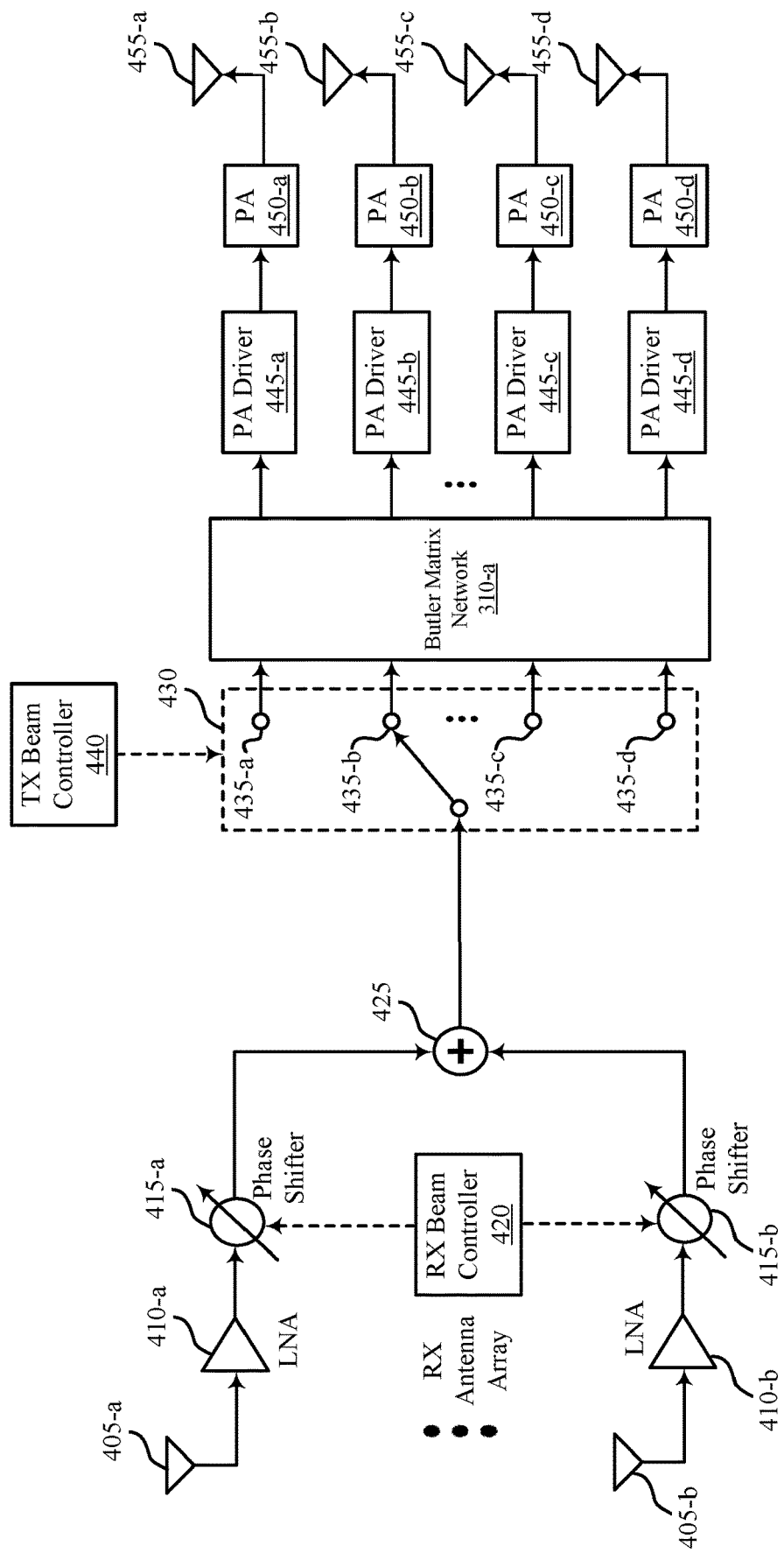
FIG. 4 through 10 illustrate examples of signal processing chains that support a beamforming multicast repeater in accordance with aspects of the present disclosure.

FIG. 4 illustrates an example of a signal processing chain 400 in accordance with aspects of the present disclosure. In some examples, the signal processing chain 400 may implement aspects of FIGS. 2 and 3. For instance, the signal processing chain 400 be an example of a signal processing chain 215 as described with reference to FIG. 2. Additionally, butler matrix network 310-a may be an example of a butler matrix network 310 as described with reference to FIG. 3.

An antenna array including antenna elements 405-a and 405-b may receive a transmission (e.g., a unicast transmission) from a base station 105 or a UE 115. The antenna array may pass signals at each antenna through an LNA 410 and a phase shifter 415. For instance, antenna element 405-a may pass a first signal to LNA 410-a, which may pass the amplified first signal to phase shifter 415-a, and antenna element 405-b may pass a second signal to LNA 410-b, which may pass the amplified second signal to phase shifter 415-b. The amount that the phase shifters 415 shifts the phase of signals that pass through may be controlled by a receive (Rx) beam controller 420 and may correspond to an anticipated direction from which the transmission is received. Upon undergoing phase-shifting, the phase-shifted signals may be aggregated by a signal aggregator 425 (e.g., a Wilkinson combiner).

The aggregated signal may arrive at a single-pole no-throw (SPNT) switch 430. The SPNT switch 430 may choose one signal path terminal 435 from a set of signal path terminals 435. Although four signal path terminals 435 are depicted in the present example, it should be understood that there may be more signal path terminals 435 without deviating from the scope of the present disclosure. the SPNT switch 430 may determine which signal path terminal 435 to choose at the direction of a transmit (Tx) beam controller 440. The Tx beam controller 440 may choose a signal path terminal 435 based on a beam direction associated with the signal path terminal 435. In the present example, Tx beam controller 440 may direct the SPNT switch 430 to choose signal path terminal 435-b.

The aggregated signal may be passed to signal path terminal 435-b and fed into butler matrix network 310-a. The Butler matrix network 310-a may perform operations on the aggregated signal (e.g., via the process described in FIG. 3) and may output a set of output signals which are fed into PA drivers 445. The number of terminals to which the butler matrix network 310-a may output may be equal to a number of signal path terminal 435 (e.g., if there are four signal path terminals 435, there may be four output terminals). In one example, a first, second, third, and fourth output signal may be fed into PA drivers 445-a, 445-b, 445-c, and 445-d respectively. The PA driver may pass the first, second, third, and fourth output signal to PAs 450-a, 450-b, 450-c, and 450-d, respectively. The PA drivers 445 and PAs 450 may apply gains to signals that pass through. In some cases, each PA driver 445 may have the same gain and each PA 450 may have the same gain. The amplified output signals may be passed to antenna elements 455 and the antenna elements 455 may output a unicast transmission. For instance, in the present example, amplified first, second, third, and fourth output signals may be passed to antenna elements 455-*a*, 455-*b*, 455-*c*, and 455-*d*, respectively, and a unicast transmission may be transmitted. The transmission transmitted from the antenna elements 455 may correspond to the beamforming direction associated with the chosen signal path terminal 435. For instance, in the present example, the beam along which the transmission is transmitted may correspond to signal path terminal 435-*b*. The transmission may be received by a UE 115 or a base station 105.

Figure 5:
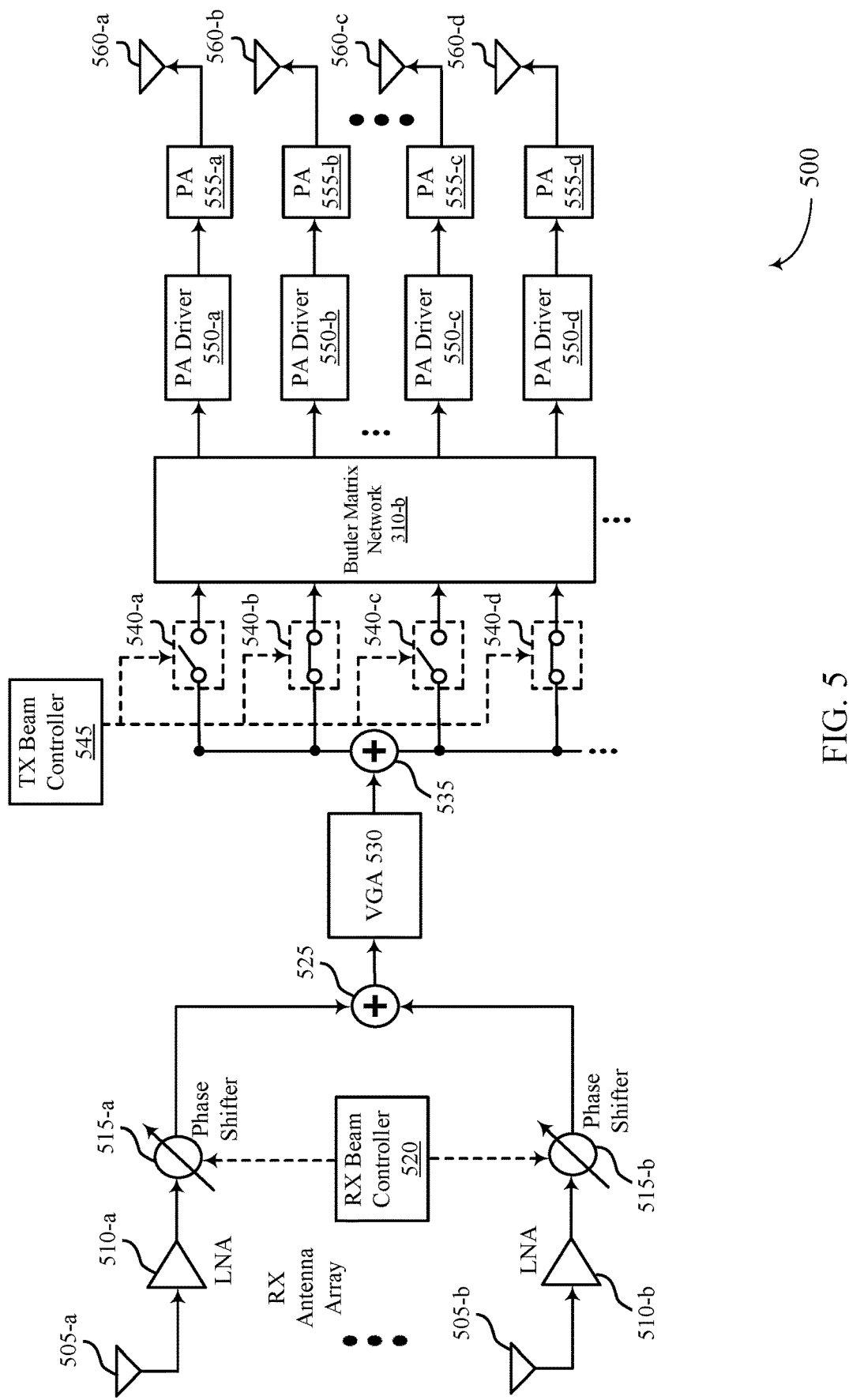

FIG. 5 illustrates an example of a signal processing chain 500 in accordance with aspects of the present disclosure. In some examples, the signal processing chain 500 may implement aspects of FIGS. 2 and 3. For instance, the signal processing chain 500 be an example of a signal processing chain 215 as described with reference to FIG. 2. Additionally, butler matrix network 310-*b* may be an example of a butler matrix network 310 as described with reference to FIG. 3.

An antenna array including antenna elements 505-*a* and 505-*b* may receive a transmission (e.g., a unicast transmission) from a base station 105 or a UE 115. The antenna array may pass signals at each antenna through an LNA 510 and a phase shifter 515. For instance, antenna element 505-*a* may pass a first signal to LNA 510-*a*, which may pass the amplified first signal to phase shifter 515-*a*, and antenna element 505-*b* may pass a second signal to LNA 510-*b*, which may pass the amplified second signal to phase shifter 515-*b*. The amount that the phase shifters 515 shifts the phase of signals that pass through may be controlled by an Rx beam controller 520 and may correspond to an anticipated direction from which the transmission is received. Upon undergoing phase-shifting, the phase-shifted signals may be aggregated by a signal aggregator 525 (e.g., a Wilkinson combiner).

The aggregated signal may be passed through a variable gain amplifier 530, which may be an amplifier whose gain may vary depending on a control signal. The variable gain amplifier 530 may pass the amplified aggregated signal to signal aggregator/divider 535. In the present example, signal aggregator/divider 535 may pass the amplified aggregated signal to signal path switches 540. Each signal path switch 540 may be associated with a different beamforming direction and may be controlled by a Tx beam controller 545. The Tx beam controller 545 may determine which of the signal path switches 540 may be opened and which may be closed. In the present example, signal path switches 540-*a* and 540-*c* may be opened and signal path switches 540-*b* and 540-*d* may be closed. Although four signal path switches 540 may be depicted in the present example, it should be understood that a different number of signal path switches 540 may be used without deviating from the scope of the present disclosure.

Signal path switches 540-*b* and 540-*d* may pass the amplified aggregated signal to Butler matrix network 310-*b*. Butler matrix network 310-*b* may perform operations on the aggregated signal (e.g., via the process described in FIG. 3) and may output a set of output signals which are fed into PA drivers 550. The number of terminals to which the butler matrix network 310-*b* may output may be equal to a number of signal path switches 540 (e.g., if there are four signal path switches 540, there may be four output terminals). In one example, a first, second, third, and fourth output signal may be fed into PA drivers 550-*a*, 550-*b*, 550-*c*, and 550-*d* respectively. Each PA driver 550 may pass the first, second, third, and fourth output signal to PAs 555-*a*, 550-5, 555-*c*, and 555-*d*, respectively. The PA drivers 550 and PA 555 may apply gains to signals that pass through. In some cases, each PA driver 550 may have the same gain and each PA 555 may have the same gain. The amplified output signals may be passed to antenna elements 560 and the antenna elements 560 may output a multicast transmission. For instance, in the present example, amplified first, second, third, and fourth output signals may be passed to antenna elements 560-*a*, 560-*b*, 560-*c*, and 560-*d*, respectively, and a multicast transmission may be transmitted. The transmission transmitted from the antenna elements 560 may correspond to beamforming directions associated with the chosen signal path switches 540. For instance, in the present example, a first beam along which the transmission is transmitted may correspond to signal path switch 540-*b* and a second beam along which the transmission is transmitted may correspond to signal path switch 540-*d*. A first UE 115 or base station 105 may receive the transmission from the first beam and a second UE 115 or base station 105 may receive the transmission from the second beam. In some cases, Tx beam controller 545 may only close a single signal path switch 540 and the resulting transmission may be unicast. In some cases, Butler matrix network 310-*b* may be omitted and each signal path switch 540 may be coupled with an antenna array.

Figure 6:
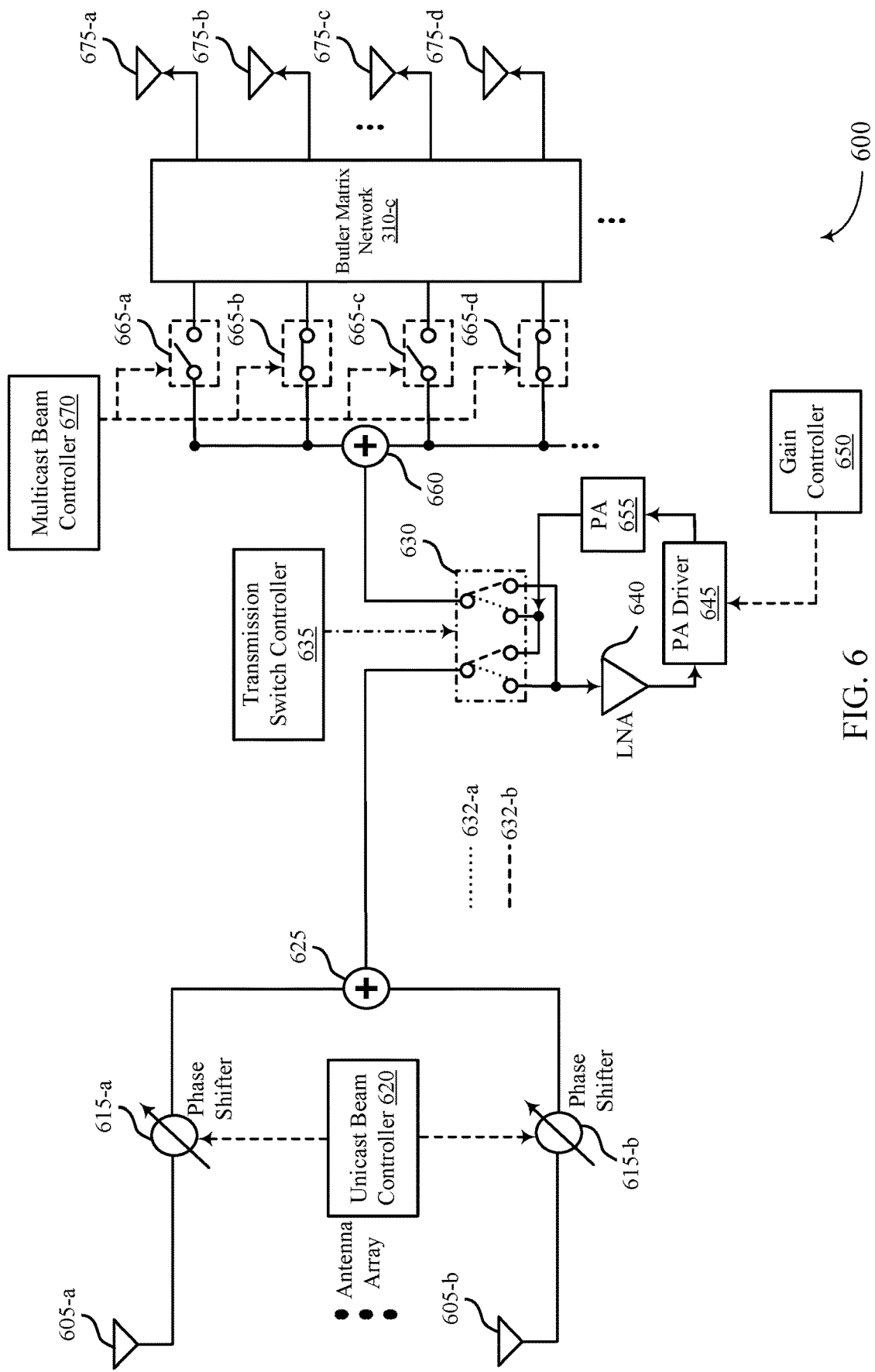

FIG. 6 illustrates an example of a signal processing chain 600 in accordance with aspects of the present disclosure. In some examples, the signal processing chain 600 may implement aspects of FIGS. 2 and 3. For instance, the signal processing chain 600 be an example of a signal processing chain 215 as described with reference to FIG. 2. Additionally, butler matrix network 310-*c* may be an example of a butler matrix network 310 as described with reference to FIG. 3.

Signal processing chain 600 may alternate between processing transmissions received by antenna elements 605 (e.g., downlink transmissions) and transmissions received by antenna elements 675. When signal processing chain 600 alternates from receiving and retransmitting transmissions received at a first antenna array (e.g., the array including antenna elements 605) to receiving and retransmitting transmissions at a second antenna array (e.g., antenna elements 675) or set of antenna arrays (e.g., in the case where each signal path switch 665 is connected to an antenna array instead of a Butler matrix network 310-*c*), signal processing chain 600 may toggle a double pole double throw (DPDT) switch 630. For instance, when receiving and retransmitting transmissions at antenna elements 605, signal processing chain 600 may toggle DPDT switch 630 to configuration 632-*a* and when receiving and retransmitting transmissions from antenna elements 675 or a set of antenna arrays as described herein, signal processing chain 600 may toggle DPDT switch 630 to configuration 632-*b*. Which configuration 632 that DPDT switch 630 is in may be controlled by a transmission switch controller 635. As such, signal processing chain 600 may be used for TDD operations.

In one example, an antenna array including antenna elements 605-*a* and 605-*b* may receive a transmission (e.g., a unicast transmission) from a base station 105 or UE 115. The antenna array may pass signals at each antenna to a phase shifter 615. For instance, antenna element 605-*a* may pass a first signal to phase shifter 615-*a*, and antenna element 605-*b* may pass a second signal to phase shifter 615-*b*. The amount that the phase shifters 615 shifts the phase of signals that pass through may be controlled by an unicast beam controller 620 and may correspond to an anticipated direction from which the transmission is received. Upon undergoing phase-shifting, the phase-shifted signals may be aggregated by a signal aggregator/divider 625 (e.g., a Wilkinson combiner/divider).

The aggregated signal may pass through DPDT switch 630 in configuration 632-a and may be fed into LNA 640, PA driver 645 (e.g., whose gain may be controlled by controller 650), and PA 655. The amplified aggregated signal may pass through DPDT switch 630 in configuration 632-a to signal aggregator/divider 660 (e.g., a Wilkinson divider). Signal aggregator/divider 660 may pass the amplified aggregated signal to signal path switches 665. Each signal path switch 665 may be associated with a different beamforming direction and may be controlled by a multicast beam controller 670. The multicast beam controller 670 may determine which of the signal path switches 665 may be opened and which may be closed. In the present example, signal path switches 665-a and 665-c may be opened and signal path switches 665-b and 665-d may be closed. Although four signal path switches 665 may be depicted in the present example, it should be understood that a different number of signal path switches 665 may be used without deviating from the scope of the present disclosure.

Signal path switches 665-b and 665-d may pass the resulting signal to Butler matrix network 310-c. Butler matrix network 310-c may perform operations on the aggregated signal (e.g., via the process described in FIG. 3) and may output a set of output signals which are fed into antenna elements 675. The number of terminals to which the butler matrix network 310-c may output may be equal to a number of signal path switches 665 (e.g., if there are four signal path switches 665, there may be four output terminals). In one example, a first, second, third, and fourth output signal may be fed into antenna elements 675-a, 675-b, 675-c, 675-d, which may output a multicast transmission. The transmission transmitted from the antenna elements 675 may correspond to beamforming directions associated with the chosen signal path switches 665. For instance, in the present example, a first beam along which the transmission is transmitted may correspond to signal path switch 665-b and a second beam along which the transmission is transmitted may correspond to signal path switch 665-d. A first UE 115 or base station 105 may receive the transmission from the first beam and a second UE 115 or base station 105 may receive the transmission from the second beam. In some cases, multicast beam controller 670 only closes a single signal path switch 665 and the resulting transmission may be unicast. In some cases, butler matrix network 310-c may be omitted and each signal path switch.

In another example, an antenna array including antenna elements 675 (e.g., antenna elements 675-a, 675-b, 675-c, and 675-d) may receive a first transmission from a first UE 115 or base station 105 in a beamforming direction associated with signal path switch 665-b and may receive a second transmission from a second UE 115 or base station 105 in a beamforming direction associated with signal path switch 665-d. The antenna array may pass signals from each antenna element to butler matrix network 310-c. Butler matrix network 310-c may output signals to signal path switches 665. In the present example, a first signal that approximates the first transmission may be output to signal path switch 665-b and a second signal that approximates the second transmission may be output to signal path switch 665-d. Alternatively, Butler matrix network 310-c may be omitted and each signal path switch 665 may be coupled with an antenna array. In such a case, an antenna array associated with signal path switch 665-b may receive the first transmission and an antenna array associated with signal path switch 665-d may receive the second transmission. In the present example, signal path switches 665-b and 665-d may be closed. In other examples, signal path switches 665-b or 665-d may be open (e.g., at the command of multicast beam controller 670) and transmissions received along the corresponding beam directions may not be received. The signals that pass through signal path switches 665 may be aggregated by signal aggregator/divider 660.

The aggregated signal may pass through DPDT switch 630 in configuration 632-b and may be fed into LNA 640, PA driver 645 (e.g., whose gain may be controlled by controller 650), and PA 655. The amplified aggregated signal may pass through DPDT switch 630 in configuration 632-a to signal aggregator/divider 625 (e.g., a Wilkinson divider). The signal aggregator/divider 625 may divide the amplified aggregated signal and may pass the divided portions of the signal to phase shifters 615. Phase shifters 615 may pass the signal to 605-a and an aggregated unicast transmission may be sent to a base station 105 or a UE 115.

Figure 7:
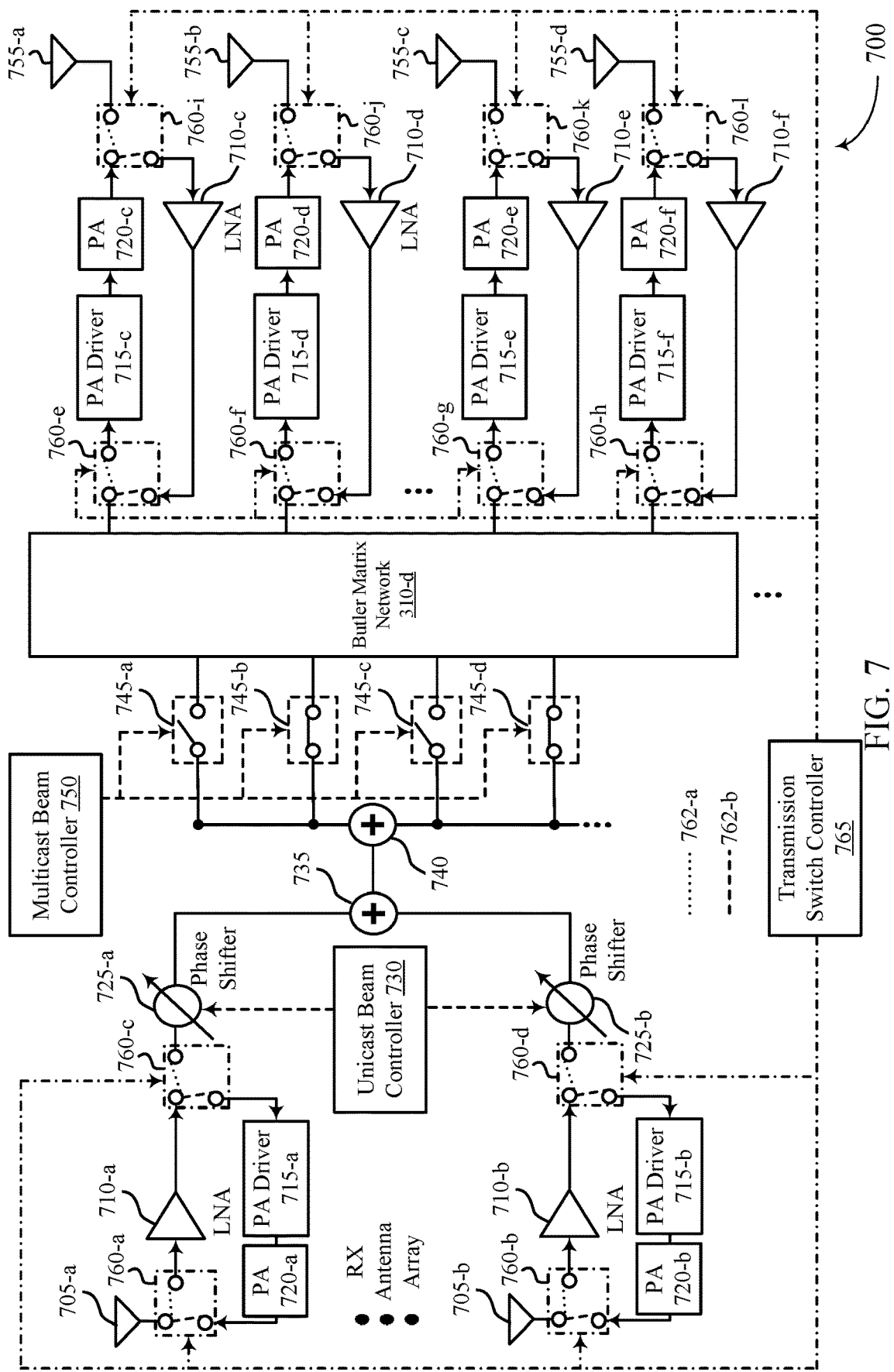

FIG. 7 illustrates an example of a signal processing chain 700 in accordance with aspects of the present disclosure. In some examples, the signal processing chain 700 may implement aspects of FIGS. 2 and 3. For instance, the signal processing chain 700 be an example of a signal processing chain 215 as described with reference to FIG. 2. Additionally, butler matrix network 310-d may be an example of a butler matrix network 310 as described with reference to FIG. 3.

Signal processing chain 700 may alternate between processing transmissions received by antenna elements 705 (e.g., downlink transmissions) and transmissions received by antenna elements 755. When signal processing chain 700 alternates from receiving and retransmitting transmissions received at a first antenna array (e.g., the array including antenna elements 705) to receiving and retransmitting transmissions at a second antenna array (e.g., antenna elements 775) or set of antenna arrays (e.g., in the case where each signal path switch 665 is connected to an antenna array instead of a Butler matrix network 310-d), signal processing chain 700 may toggle every double pole double throw (DPDT) switch 760. For instance, when receiving and retransmitting transmissions at antenna elements 705, signal processing chain 700 may toggle each DPDT switch 760 to configuration 762-a and when receiving and retransmitting transmissions from antenna elements 755 or a set of antenna arrays as described herein, signal processing chain 700 may toggle DPDT switch 760 to configuration 762-b. Which configuration 762 that DPDT switch 760 is in may be controlled by a transmission switch controller 765. As such, signal processing chain 700 may be used for TDD operations.

In one example, each DPDT switches 760 may be in configuration 762-a. An antenna array including antenna elements 705-a and 705-b may receive a transmission (e.g., a unicast transmission) from a base station 105 or a UE 115. The antenna array may pass signals at each antenna through a DPDT switch 760 to an LNA 710, which may pass the signal through another DPDT switch 760 to a phase shifter 725. For instance, antenna element 505-a may pass a first signal through DPDT switch 760-a to LNA 710-a, which may pass the amplified first signal through DPDT switch 760-c to phase shifter 725-a. Additionally, antenna element 705-b may pass a second signal through DPDT switch 760-b to LNA 710-b, which may pass the amplified second signal through DPDT switch 760-*d* to phase shifter 725-*b*. The amount that the phase shifters 515 shifts the phase of signals that pass through may be controlled by a unicast beam controller 730 and may correspond to an anticipated direction from which the transmission is received. Upon undergoing phase-shifting, the phase-shifted signals may be aggregated by a signal aggregator/divider 735 (e.g., a Wilkinson combiner).

The aggregated signal may be passed to signal aggregator/divider 740. In some cases, the aggregated signal may first be passed through a variable gain amplifier (VGA). The signal aggregator/divider 535 may pass the aggregated signal to signal path switches 745. Each signal path switch 745 may be associated with a different beamforming direction and may be controlled by a multicast beam controller 750. The multicast beam controller 750 may determine which of the signal path switches 745 may be opened and which may be closed. In the present example, signal path switches 745-*a* and 745-*c* may be opened and signal path switches 745-*b* and 745-*d* may be closed. Although four signal path switches 745 may be depicted in the present example, it should be understood that a different number of signal path switches 745 may be used without deviating from the scope of the present disclosure.

Signal path switches 745-*b* and 745-*d* may pass the aggregated signal to Butler matrix network 310-*d*. Butler matrix network 310-*d* may perform operations on the aggregated signal (e.g., via the process described in FIG. 3) and may output a set of output signals which are fed through DPDT switches 760 into PA drivers 715. The number of terminals to which the butler matrix network 310-*d* outputs may be equal to a number of signal path switches 745 (e.g., if there are four signal path switches 745, there may be four output terminals). In one example, a first, second, third, and fourth output signal may be fed into PA drivers 715-*c*, 715-*d*, 715-*e*, and 715-*f* through DPDT switches 760-*e*, 760-*f*, 760-*g*, and 760-*h*, respectively. Each PA driver 715 may pass the first, second, third, and fourth output signal to PAs 720-*a*, 720-*b*, 720-*c*, and 720-*d*, respectively. The PA drivers 715 and PAs 720 may apply gains to signals that pass through. In some cases, each PA driver 715 may have the same gain and each PA 720 may have the same gain. The amplified output signals may be passed through DPDT switches 760 to antenna elements 755 and the antenna elements 755 may output a multicast transmission. For instance, in the present example, amplified first, second, third, and fourth output signals may be passed to antenna elements 755-*a*, 755-*b*, 755-*c*, and 755-*d* through DPDT switches 760-*i*, 760-*j*, 760-*k*, and 760-1, respectively, and a multicast transmission may be transmitted. The transmission transmitted from the antenna elements 755 may correspond to beamforming directions associated with the chosen signal path switches 745. For instance, in the present example, a first beam along which the transmission is transmitted may correspond to signal path switch 745-*b* and a second beam along which the transmission is transmitted may correspond to signal path switch 745-*d*. A first UE 115 or base station 105 may receive the transmission from the first beam and a second UE 115 or base station 105 may receive the transmission from the second beam. In some cases, multicast beam controller 750 may only close a single signal path switch 745 and the resulting transmission may be unicast. In some cases, Butler matrix network 310-*d* may be omitted and each signal path switch 745 may be coupled with an antenna array.

In another example, each DPDT switch 760 may be in configuration 762-*b*. An antenna array including antenna elements 755 (e.g., antenna elements 755-*a*, 755-*b*, 755-*c*, and 755-*d*) may receive a first transmission from a first UE 115 or base station 105 in a beamforming direction associated with signal path switch 745-*b* and may receive a second transmission from a second UE 115 or base station 105 in a beamforming direction associated with signal path switch 745-*d*. The antenna array may pass signals from each antenna element through DPDT switches 760 to an LNA 710. For instance, antenna elements 755-*a*, 755-*b*, 755-*c*, and 755-*d* may pass corresponding signals through DPDT switches 760-*i*, 760-*j*, 760-*k*, and 760-1 to LNAs 710-*c*, 710-*d*, 710-*e*, and 710-*f*, respectively. The LNAs 710 may pass the resulting signals through DPDT switches 760 to Butler matrix network 310-*d*. For instance, LNAs 710-*c*, 710-*d*, 710-*e*, and 710-*f* may pass their respective output signals through DPDT switches 760-*e*, 760-*f*, 760-*g*, and 760-*h*, respectively, to Butler matrix network 310-*d*.

Butler matrix network 310-*d* may output signals to signal path switches 745. In the present example, a first signal that approximates the first transmission may be output to signal path switch 745-*b* and a second signal that approximates the second transmission may be output to signal path switch 745-*d*. Alternatively, Butler matrix network 310-*d* may be omitted and each signal path switch 745 may be coupled with an antenna array. In such a case, an antenna array associated with signal path switch 745-*b* may receive the first transmission and an antenna array associated with signal path switch 745-*d* may receive the second transmission. In the present example, signal path switches 745-*b* and 745-*d* may be closed. In other examples, signal path switches 745-*b* or 745-*d* may be open (e.g., at the command of multicast beam controller 750) and transmissions received along the corresponding beam directions may not be received. The first and second signals may be fed into a signal aggregator/divider 740.

The aggregated signal may be passed to signal aggregator/divider 735. In some cases, the aggregated signal may first pass through a VGA. The signal aggregator/divider 735 may divide the aggregated signal and may pass the divided portions of the signal to phase shifters 725 (e.g., to phase shifters 725-*a* and 725-*b*), which may be controlled by unicast beam controller 730. Each phase shifter 725 may output a phase-shifted signal through a DPDT switch 760 to a PA driver 715. For instance, phase shifter 725-*a* may output a phase-shifted signal through DPDT switch 760-*c* to PA driver 715-*a* and phase shifter 725-*b* may output a phase-shifted signal through DPDT switch 760-*d* to PA driver 715-*b*. Each PA driver 715 and PA 720 may amplify the phase-shifted signal and may pass the amplified phase-shifted signal through a DPDT switch 760 to an antenna element 705. For instance, in the present example, PA 720-*a* may pass a corresponding amplified phase-shifted signal through DPDT switch 760-*a* to antenna element 705-*a*, and PA 720-*b* may pass a corresponding amplified phase-shifted signal through DPDT switch 760-*b* to antenna element 705-*b*.

Figure 8:
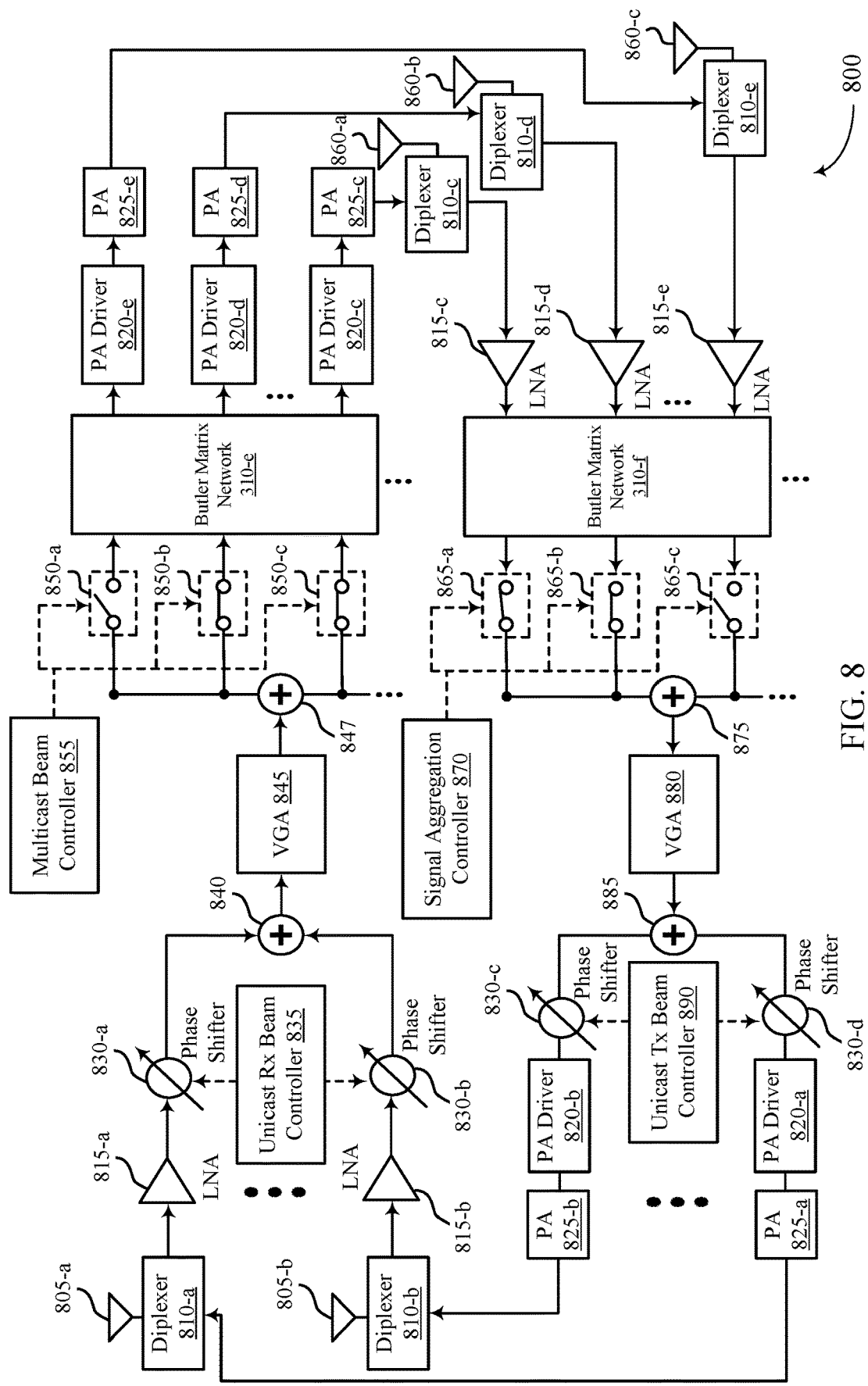

FIG. 8 illustrates an example of a signal processing chain 800 in accordance with aspects of the present disclosure. In some examples, the signal processing chain 800 may implement aspects of FIGS. 2 and 3. For instance, the signal processing chain 800 be an example of a signal processing chain 215 as described with reference to FIG. 2. Additionally, butler matrix networks 310-*e* and 310-*f* may be examples of butler matrix networks 310 as described with reference to FIG. 3. Signal processing chain 800 may be capable of processing and retransmitting transmissions received at a first antenna array (e.g., the array including antenna elements 805) simultaneously with processing and retransmitting transmissions received at a second antenna array (e.g., antenna elements 860) or set of antenna arrays (e.g., in the case where each signal path switch 850 and 865 is coupled to an antenna array instead of a Butler matrix network 310-d). As such, signal processing chain 800 may be used for FDD operations.

In one example, an antenna array including antenna elements 805-a and 805-b may receive a transmission (e.g., a unicast transmission) from a base station 105 or a UE 115. The antenna array may pass signals at each antenna through a diplexer 810 to an LNA 815, which may pass the signal to a phase shifter 830. For instance, antenna element 805-a may pass a first signal through diplexer 810-a to LNA 815-a, which may pass the amplified first signal to phase shifter 830-a. Additionally, antenna element 805-b may pass a second signal through diplexer 810-b to LNA 815-b, which may pass the amplified second signal to phase shifter 830-b. The amount that the phase shifters 830 shifts the phase of signals that pass through may be controlled by a unicast Rx beam controller 835 and may correspond to an anticipated direction from which the transmission is received. Upon undergoing phase-shifting, the phase-shifted signals may be aggregated by a signal aggregator/divider 840 (e.g., a Wilkinson combiner).

The aggregated signal may be passed to a VGA 845, which may amplify the aggregated signal. The amplified aggregated signal may be passed to signal aggregator/divider 847. Signal aggregator/divider 847 may divide the aggregated signal and may pass the divided aggregated signal to signal path switches 850. Each signal path switch 850 may be associated with a different beamforming direction and may be controlled by a multicast beam controller 855. The multicast beam controller 855 may determine which of the signal path switches 850 may be opened and which may be closed. In the present example, signal path switch 850-a may be opened and signal path switches 850-b and 850-c may be closed. Although three signal path switches 850 may be depicted in the present example, it should be understood that a different number of signal path switches 850 may be used (e.g., $2^j$ switches where j=0, 1, 2, 3 . . . without deviating from the scope of the present disclosure.

Signal path switches 850-b and 850-c may pass the aggregated signal to Butler matrix network 310-e. Butler matrix network 310-e may perform operations on the aggregated signal (e.g., via the process described in FIG. 3) and may output a set of output signals which are fed to PA drivers 820. The number of terminals to which the butler matrix network 310-e outputs may be equal to a number of signal path switches 850 (e.g., if there are four signal path switches 850, there may be four output terminals). In one example, a first, second, and third output signal may be fed into PA drivers 820-c, 820-d, and 820-e, respectively. Each PA driver 820 may pass the first, second, and third output signal to PAs 825-a, 825-b, and 825-c respectively. The PA drivers 820 and PAs 825 may apply gains to signals that pass through. In some cases, each PA driver 820 may have the same gain and each PA 825 may have the same gain. The amplified output signals may be passed through diplexers 810 to antenna elements 860 and the antenna elements 860 may output a multicast transmission. For instance, in the present example, amplified first, second, and third output signals may be passed to antenna elements 860-a, 860-b, and 860-c through diplexers 810-c, 810-d, 810-e, respectively, and a multicast transmission may be transmitted. The transmission transmitted from the antenna elements 860 may correspond to beamforming directions associated with the chosen signal path switches 850. For instance, in the present example, a first beam along which the transmission is transmitted may correspond to signal path switch 850-b and a second beam along which the transmission is transmitted may correspond to signal path switch 850-c. A first UE 115 or base station 105 may receive the transmission from the first beam and a second UE 115 or base station 105 may receive the transmission from the second beam. In some cases, multicast beam controller 855 may only close a single signal path switch 850 and the resulting transmission may be unicast. In some cases, Butler matrix network 310-e may be omitted and each signal path switch 850 may be coupled with an antenna array (e.g., signal path switch may be coupled with a phase shifter 830 and a diplexer 810).

Additionally or alternatively, an antenna array including antenna elements 860 (e.g., antenna elements 860-a, 860-b, and 860-c) may receive a first transmission from a first UE 115 or base station 105 in a beamforming direction associated with signal path switch 865-a and may receive a second transmission from a second UE 115 or base station 105 in a beamforming direction associated with signal path switch 865-b. The antenna array may pass signals from each antenna element 860 through a diplexer 810 to an LNA 815. For instance, antenna elements 860-a, 860-b, and 860-c may pass corresponding signals through diplexers 810-c, 810-d, and 810-e to LNAs 815-c, 815-d, and 815-e, respectively. The LNAs 815 may pass the resulting signals to Butler matrix network 310-f. For instance, LNAs 815-c, 815-d, and 815-e may pass their respective output signals to Butler matrix network 310-f.

Butler matrix network 310-f may output signals to signal path switches 865. In the present example, a first signal that approximates the first transmission may be output to signal path switch 865-a and a second signal that approximates the second transmission may be output to signal path switch 865-b. Alternatively, Butler matrix network 310-c may be omitted and each signal path switch 865 may be coupled with an antenna array (e.g., each signal path switch 865 may be coupled with a phase shifter 830, an LNA 815, and a diplexer 810). In such a case, an antenna array associated with signal path switch 865-a may receive the first transmission and an antenna array associated with signal path switch 865-b may receive the second transmission. In the present example, signal path switches 865-a and 865-b may be closed. In other examples, signal path switches 865-a or 865-b may be open (e.g., at the command of signal aggregation controller 870) and transmissions received along the corresponding beam directions may not be received. The first and second signals may be fed into a signal aggregator/divider 875.

The aggregated signal may be passed through a VGA 880, which may pass an amplified aggregated signal to the signal aggregator/divider 885. The signal aggregator/divider 885 may divide the aggregated signal and may pass the divided portions of the signal to phase shifters 830 (e.g., to phase shifters 830-c and 830-d), which may be controlled by unicast Tx beam controller 890. Each phase shifter 830 may output a phase-shifted signal to a PA driver 820. For instance, phase shifter 830-c may output a phase-shifted signal to PA driver 820-b and phase shifter 830-d may output a phase-shifted signal to PA driver 820-a. Each PA driver 820 and PA 825 may amplify the phase-shifted signal and may pass the amplified phase-shifted signal through a diplexer 810 to an antenna element 805. For instance, in the present example, PA 825-a may pass a corresponding amplified phase-shifted signal through diplexer 810-a to antenna element 805-*a*, and PA 825-*b* may pass a corresponding amplified phase-shifted signal through diplexer 810-*b* to antenna element 805-*b*.

Figure 9:
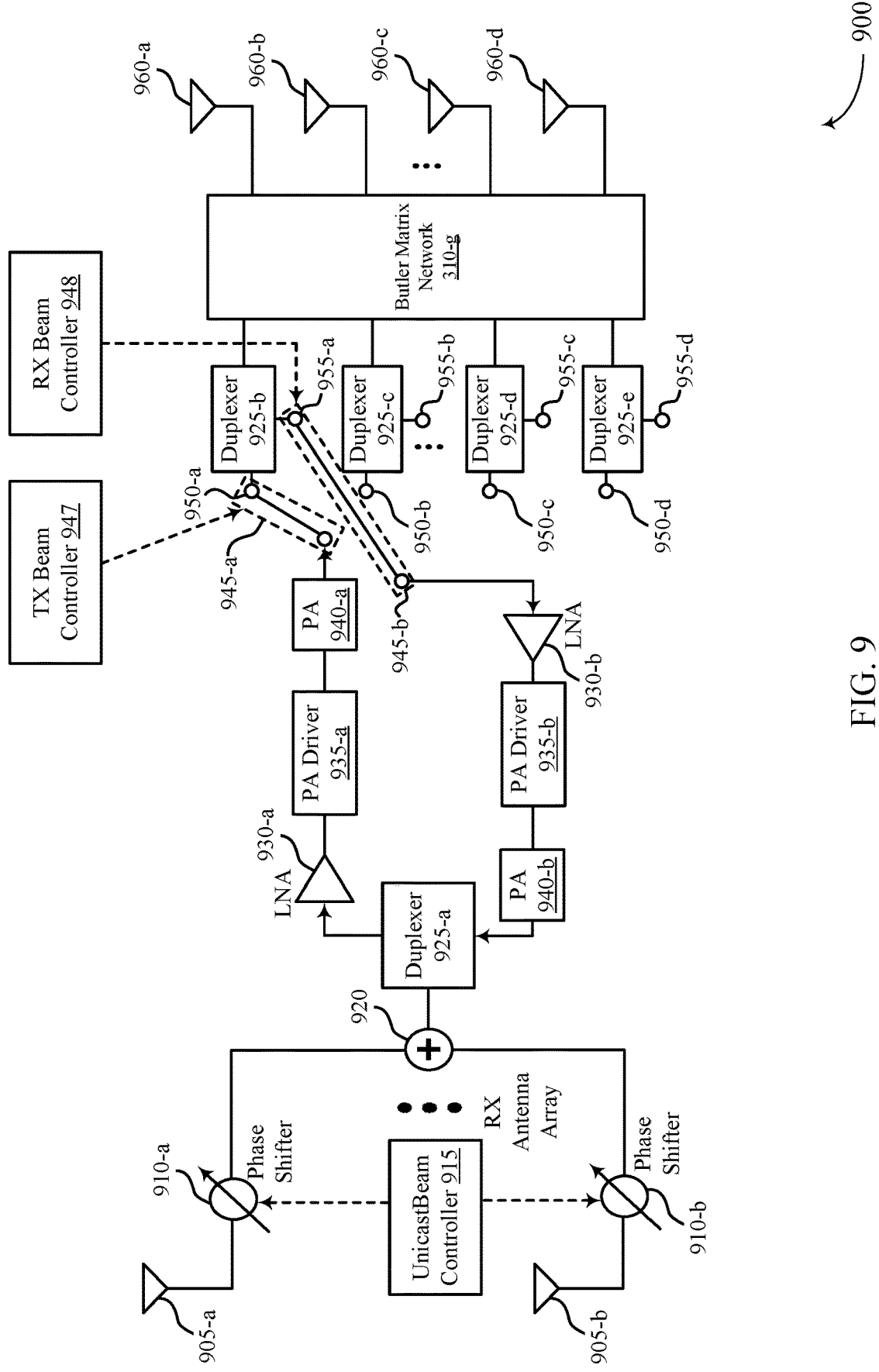

FIG. 9 illustrates an example of a signal processing chain 900 in accordance with aspects of the present disclosure. In some examples, the signal processing chain 900 may implement aspects of FIGS. 2 and 3. For instance, the signal processing chain 900 be an example of a signal processing chain 215 as described with reference to FIG. 2. Additionally, butler matrix network 310-*g* may be an example of a butler matrix network 310 as described with reference to FIG. 3. Signal processing chain 900 may be capable of processing and retransmitting transmissions received at a first antenna array (e.g., the array including antenna elements 905) simultaneously with processing and retransmitting transmissions received at a second antenna array (e.g., antenna elements 960) or set of antenna arrays (e.g., in the case where each duplexers 925 are coupled to an antenna array instead of a Butler matrix network 310-*g*). In some cases, a single duplexer path may be chosen at a time. As such, signal processing chain 800 may be used for SFDD operations.

Signal processing chain 900 may include a Tx beam switch 945-*a* and an Rx beam switch 945-*b*. Both the Tx beam switch 945-*a* and the Rx beam switch 945-*b* may be SPNT switches. Tx beam switch 945-*a* may be coupled with one of a set of signal path terminals 950 (e.g., signal paths 950-*a*, 950-*b*, 950-*c*, and 950-*d*) and Rx beam switch 945-*b* may be coupled with one of a set of signal path terminals 955 (e.g., signal path terminals 955-*a*, 955-*b*, 955-*c*, and 955-*d*). Tx beam switch 945-*a* and Rx beam switch 945-*b* may be controlled by a Tx beam controller 947 and Rx beam controller 948, respectively. Alternatively, both Tx beam switch 945-*a* and Rx beam switch 945-*b* may be controlled by a same beam controller. In some cases, Tx beam switch 945-*a* and Rx beam switch 945-*b* may select signal path terminals 950 and 955 such that Tx beam switch 945-*a* and Rx beam switch 945-*b* are coupled with a same duplexer 925-*b*. For instance, in the present example, Tx beam switch 945-*a* may choose signal path terminal 950-*a*, which may be coupled with duplexer 925-*b*, and Rx beam switch 945-*b* may choose signal path terminal 955-*a*, which may also be coupled with duplexer 925-*b*. There may also be cases where Tx beam switch 945-*a* and Rx beam switch 945-*b* select signal path terminals 950 and 955 associated with separate duplexers 925.

In one example, an antenna array including antenna elements 905-*a* and 905-*b* may receive a transmission (e.g., a unicast transmission) from a base station 105 or UE 115. The antenna array may pass signals at each antenna to a phase shifter 910. For instance, antenna element 905-*a* may pass a first signal to phase shifter 910-*a*, and antenna element 905-*b* may pass a second signal to phase shifter 910-*b*. The amount that the phase shifters 910 shifts the phase of signals that pass through may be controlled by a unicast beam controller 915 and may correspond to an anticipated direction from which the transmission is received. Upon undergoing phase-shifting, the phase-shifted signals may be aggregated by a signal aggregator/divider 920 (e.g., a Wilkinson combiner/divider).

The aggregated signal may pass through a duplexer 925-*a* to LNA 930-*a*. The LNA 930-*a* may pass the aggregated signal to PA driver 935-*a*, which may pass the aggregated signal to PA 940-*a*. LNA 930-*a*, PA driver 935-*a*, and PA 940-*a* may amplify the aggregated signal. The amplified aggregated signal may pass through Tx beam switch 945-*a* to duplexer 925-*b*, which may pass the amplified aggregated signal to Butler matrix network 310-*g*.

Butler matrix network 310-*g* may perform operations on the amplified aggregated signal (e.g., via the process described in FIG. 3) and may output a set of output signals which are fed into antenna elements 960. The number of terminals to which the butler matrix network 310-*g* may output may be equal to a number of signal path terminals 950 or 955 (e.g., if there are four signal path terminals 950 and/or four signal path terminals 955, there may be four output terminals). In one example, a first, second, third, and fourth output signal may be fed into antenna elements 960-*a*, 960-*b*, 960-*c*, and 960-*d*, respectively, which may output a unicast transmission. The transmission transmitted from the antenna elements 960 may correspond to beamforming directions associated with the chosen signal path terminal 950. For instance, in the present example, a beam along which the transmission is transmitted may correspond to signal path terminal 950-*a*. A first UE 115 or base station 105 may receive the transmission from the beam. In some cases, butler matrix network 310-*g* may be omitted and the duplexer 925 associated with each signal path terminal 950 may be coupled with an antenna array.

Additionally or alternatively, the first UE 115 or base station 105 may transmit a transmission along the same beam. An antenna array including antenna elements 960 (e.g., antenna elements 960-*a*, 960-*b*, 960-*c*, and 960-*d*) may receive the transmission. The antenna array may pass signals from each antenna element 960 to butler matrix network 310-*g*. Butler matrix network 310-*g* may output signals to duplexers 925 associated with signal path terminals 955. In the present example, a signal that approximates the transmission may be output to duplexer 925-*b*. Alternatively, Butler matrix network 310-*g* may be omitted and each duplexer 925 associated with a signal path terminal 955 may be coupled with an antenna array. In such a case, an antenna array associated with duplexer 925-*b* may receive the transmission and may pass the transmission to the duplexer 925-*b*. In the present example, signal path terminal 955-*b* may not be connected with Rx beam switch 945-*b*. As such, transmissions that are from a beam direction associated with duplexer 925-*c* may not be received. The signal that passes through duplexer 925-*b* may be passed to LNA 930-*b*. LNA 930-*b* may pass the signal to PA driver 935-*b*, which may pass the signal to PA 940-*b*. LNA 930-*b*, PA driver 935-*b*, and PA 940-*b* may amplify the signal. The amplified signal may pass through duplexer 925-*a* to signal aggregator/divider 920.

Signal aggregator/divider 920 may divide the amplified signal and may pass the divided portions to phase shifters 910. Each phase shifter 910 may output a phase-shifted signal to antenna elements 905. For instance, phase shifter 910-*a* may output a phase-shifted signal to antenna element 905-*a* and phase shifter 910-*b* may output a phase-shifted signal to antenna element 905-*b*.

Figure 10:
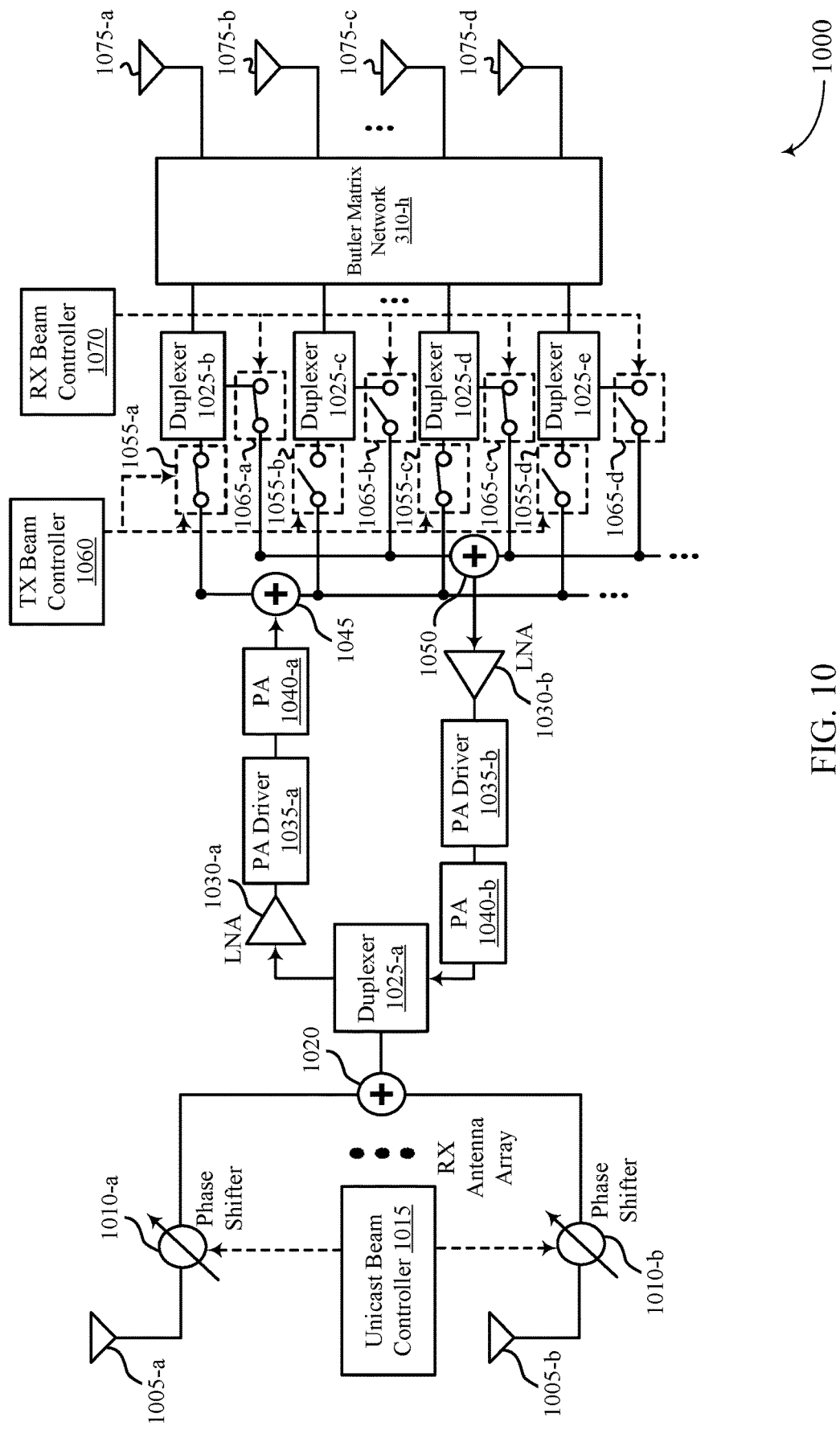

FIG. 10 illustrates an example of a signal processing chain 1000 in accordance with aspects of the present disclosure. In some examples, the signal processing chain 1000 may implement aspects of FIGS. 2 and 3. For instance, the signal processing chain 1000 be an example of a signal processing chain 215 as described with reference to FIG. 2. Additionally, butler matrix network 310-*h* may be an example of a butler matrix network 310 as described with reference to FIG. 3. Signal processing chain 1000 may be capable of processing and retransmitting transmissions received at a first antenna array (e.g., the array including antenna elements 1005) simultaneously with processing and retransmitting transmissions received at a second antenna array (e.g., antenna elements 1075) or set of antenna arrays (e.g., in the case where each duplexers 1025 are coupled to an antenna array instead of a Butler matrix network 310-*h*). In some cases, a single or multiple duplexer path may be chosen at a time. As such, signal processing chain 800 may be used for SFDD or FDD operations.

Signal processing chain 1000 may include a Tx beam switches 1055 and Rx beam switches 1065. Tx beam switches 1055 and Rx beam switches 1065 may be coupled with one or more duplexers 1025 (e.g., duplexers 1025-*b*, 1025-*c*, 1025-*d*, and 1025-*e*). Tx beam switches 1055 and Rx beam switches 1065 may be controlled by a Tx beam controller 1060 and Rx beam controller 1070, respectively. Alternatively, both Tx beam switches 1055 and Rx beam switches 1065 may be controlled by a same beam controller. In some cases, Tx beam controller 1060 and Rx beam controller 1070 and Rx beam switch 945-*b* may selectively close and open Tx beam switches 1055 and Rx beam switches 1065 such that a same duplexer may be coupled with signal aggregator/divider 1045 and signal aggregator/divider 1050. For instance, in the present example, Tx beam switch 1055-*a* and Rx beam switch 1065-*a*, along with Tx beam switch 1055-*c* and 1065-*c*, may be closed. There may also be cases where a Tx beam switch 1055 associated with a duplexer 925 is closed and an Rx beam switch 1065 associated with the duplexer 925 is opened and vice-versa.

In one example, an antenna array including antenna elements 1005-*a* and 1005-*b* may receive a transmission (e.g., a unicast transmission) from a base station 105 or UE 115. The antenna array may pass signals at each antenna to a phase shifter 1010. For instance, antenna element 1005-*a* may pass a first signal to phase shifter 1010-*a*, and antenna element 1005-*b* may pass a second signal to phase shifter 1010-*b*. The amount that the phase shifters 1010 shifts the phase of signals that pass through may be controlled by a unicast beam controller 1015 and may correspond to an anticipated direction from which the transmission is received. Upon undergoing phase-shifting, the phase-shifted signals may be aggregated by a signal aggregator/divider 1020 (e.g., a Wilkinson combiner/divider).

The aggregated signal may pass through a duplexer 1025-*a* to LNA 1030-*a*. The LNA 1030-*a* may pass the aggregated signal to PA driver 1035-*a*, which may pass the aggregated signal to PA 1040-*a*. LNA 1030-*a*, PA driver 1035-*a*, and PA 1040-*a* may amplify the aggregated signal. The amplified aggregated signal may be fed to signal aggregator/divider 1045, which may divide the signal and pass the signal to one or more Tx beam switches 1055. In the present example, the divided signal may pass through Tx beam switches 1055-*a* and 1055-*c* and be fed into Butler matrix network 310-*h*.

Butler matrix network 310-*h* may perform operations on the amplified aggregated signal (e.g., via the process described in FIG. 3) and may output a set of output signals which are fed into antenna elements 1075. The number of terminals to which the butler matrix network 310-*h* may output may be equal to a number of Tx beam switches 1055 and/or a number of Rx beam switches 1065 (e.g., if there are four Tx beam switches 1055 and/or four Rx beam switches 1065, there may be four output terminals). In one example, a first, second, third, and fourth output signal may be fed into antenna elements 1075-*a*, 1075-*b*, 1075-*c*, and 1075-*d*, respectively, which may output a unicast transmission. The transmission transmitted from the antenna elements 1075 may correspond to beamforming directions associated with the chosen Tx beam switches 1055. For instance, in the present example, a first beam along which the transmission is transmitted may correspond to Tx beam switch 1055-*a* and a second beam along which the transmission is transmitted may correspond to Tx beam switch 1055-*c*. A first UE 115 or base station 105 may receive the transmission from the first beam and a second UE 115 or base station 105 may receive the transmission from the second beam. In some cases, butler matrix network 310-*h* may be omitted and the duplexer 1025 associated with each Tx beam switch 1055 may be coupled with an antenna array.

Additionally or alternatively, the first UE 115 or base station 105 and the second UE 115 or base station 105 may transmit a transmission along the first and second beam directions. An antenna array including antenna elements 1075 (e.g., antenna elements 1075-*a*, 1075-*b*, 1075-*c*, and 1075-*d*) may receive the transmission. The antenna array may pass signals from each antenna element 1075 to Butler matrix network 310-*h*. Butler matrix network 310-H may output signals to duplexers 1025 associated with Rx beam switches 1065. In the present example, a signal that approximates the transmission from the first UE 115 or base station 105 may be output to duplexer 1025-*b* and a signal that approximates the transmission from the second UE 115 or base station 105 may be output to duplexer 1025-*d*. Alternatively, Butler matrix network 310-*h* may be omitted and each duplexer 1025 associated with an Rx beam switch 1065 may be coupled with an antenna array. In such a case, an antenna array associated with duplexer 1025-*b* may receive the transmission from the first UE 115 or base station 105 and may pass the transmission to duplexer 1025-*b* and an antenna array associated with duplexer 1025-*d* may receive the transmission from the second UE 115 or base station 105 and may pass the transmission to duplexer 1025-*d*. In the present example, Rx beam switch 1065-*b* may be open. As such, transmissions that are from a beam direction associated with duplexer 1025-*c* may not be received. The signal that passes through duplexer 1025-*b* and the signal that passes through duplexer 1025-*d* may be passed to signal aggregator/divider 1050.

The signal aggregator/divider 1050 may output an aggregated signal and may output the aggregated signal to LNA 1030-*b*. LNA 1030-*b* may pass the aggregated signal to PA driver 1035-*b*, which may pass the aggregated signal to PA 1040-*b*. LNA 1030-*b*, PA driver 1035-*b*, and PA 1040-*b* may amplify the aggregated signal. The aggregated amplified signal may pass through duplexer 1025-*a* to signal aggregator/divider 1020.

Signal aggregator/divider 1020 may divide the aggregated amplified signal and may pass the divided portions to phase shifters 1010. Each phase shifter 1010 may output a phase-shifted signal to antenna elements 1005. For instance, phase shifter 1010-*a* may output a phase-shifted signal to antenna element 1005-*a* and phase shifter 1010-*b* may output a phase-shifted signal to antenna element 1005-*b*.

Figure 11:
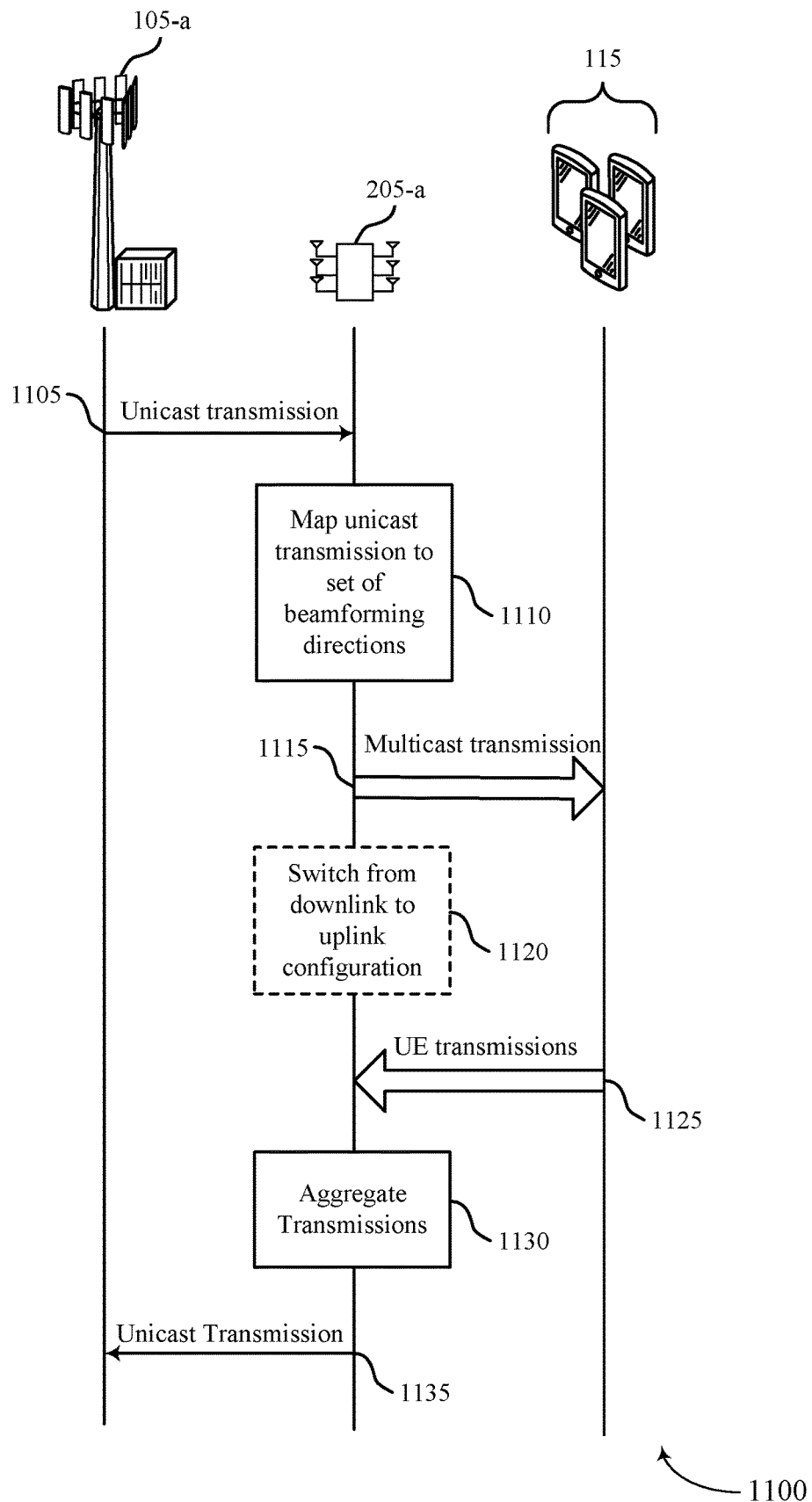
FIG. 11 illustrates an example of a process flow that supports a beamforming multicast repeater in accordance with aspects of the present disclosure.

FIG. 11 illustrates an example of a process flow 1100 in accordance with aspects of the present disclosure. In some examples, process flow 1100 may implement aspects of FIGS. 1 and 2. For instance, process flow 1100 may include a base station 105-*a*, which may be an example of base station 105 as described with reference to FIG. 1, and may include a wireless repeater, which may be an example of a wireless repeater 205 as described with reference to FIG. 2. It should be noted that base station 105-*a* may be replaced with a UE 115 and/or the set of UEs 115 may be replaced with base stations 105 without deviating from the scope of the present disclosure.

At 1105, base station 105-*a* may transmit a unicast transmission. Wireless repeater 205-*a* may receive the unicast transmission at a first antenna array.

At 1110, wireless repeater 205-*a* may map the unicast transmission to a set of beamforming directions. For instance, wireless repeater 205-*a* may route a signal received via the unicast transmission to at least two signal paths within wireless repeater 205-*a*. The first signal path may be associated with a first beamforming direction of the set of beamforming directions of beamforming directions and the second signal path may be associated with a second signal path of the set of beamforming directions. Additionally, wireless repeater 205-*a*, may feed the signal into a beamforming network that is based on a Butler matrix and is coupled with the at least two signal paths. The signal from the first signal path may be routed to a first quadrature coupler and the signal from the second path may be routed to the second or a first quadrature coupler.

At 1115, wireless repeater 205-*a* may transmit, using at least a second antenna array, a multicast transmission to the set of UEs 115. The multicast transmission may be based on the unicast transmit and the multiple beamforming directions. For instance, transmitting the multicast transmission may involve retransmitting a signal received via the unicast transmission in each of the set of beamforming directions. Each UE 115 of the set of UEs 115 may receive the multicast transmission. The multicast transmission may be transmitted, for instance, by separate antenna arrays (e.g., a first antenna array corresponding to the first signal path and a second antenna array corresponding to the second signal path). Alternatively, the multicast transmission may be transmitted by a single antenna array coupled with a Butler matrix network.

At 1120, wireless repeater 205-*a* may switch from a downlink to an uplink configuration. For instance, wireless repeater 205-*a* may switch a signal path within wireless repeater 205-*a* from a downlink configuration to an uplink configuration.

At 1125, at least a subset of the set of UEs 115 may transmit transmissions. For instance, a first UE 115 of the set of UEs 115 may transmit a first transmission along a first beam direction and a second UE 115 of the set of UEs 115 may transmit a second transmission along a second beam direction. Wireless repeater 205-*a* may receive the transmissions from the set of UEs 115.

At 1130, wireless repeater 205-*a* may aggregate a first signal received via the first transmission and a second signal received via the second transmission to form an aggregated signal. The first signal may be received from a second antenna array of wireless repeater 205-*a* and the second signal may be received from the third antenna array of wireless repeater 205-*a*. Alternatively, the first and second signal may be received by routing signals from a single antenna array into a Butler matrix network. The outputs of the Butler matrix network may include the first and second signals.

At 1135, wireless repeater 205-*a* may transmit a unicast transmission based on the aggregated signal using the first antenna array of wireless repeater 205-*a*. The unicast transmission may be received by base station 105-*a*. In some implementations, any combination of transmissions 1105, 1115, 1125, and 1135 may be any of SHF, EHF, and/or mmW transmissions.

Figure 12:
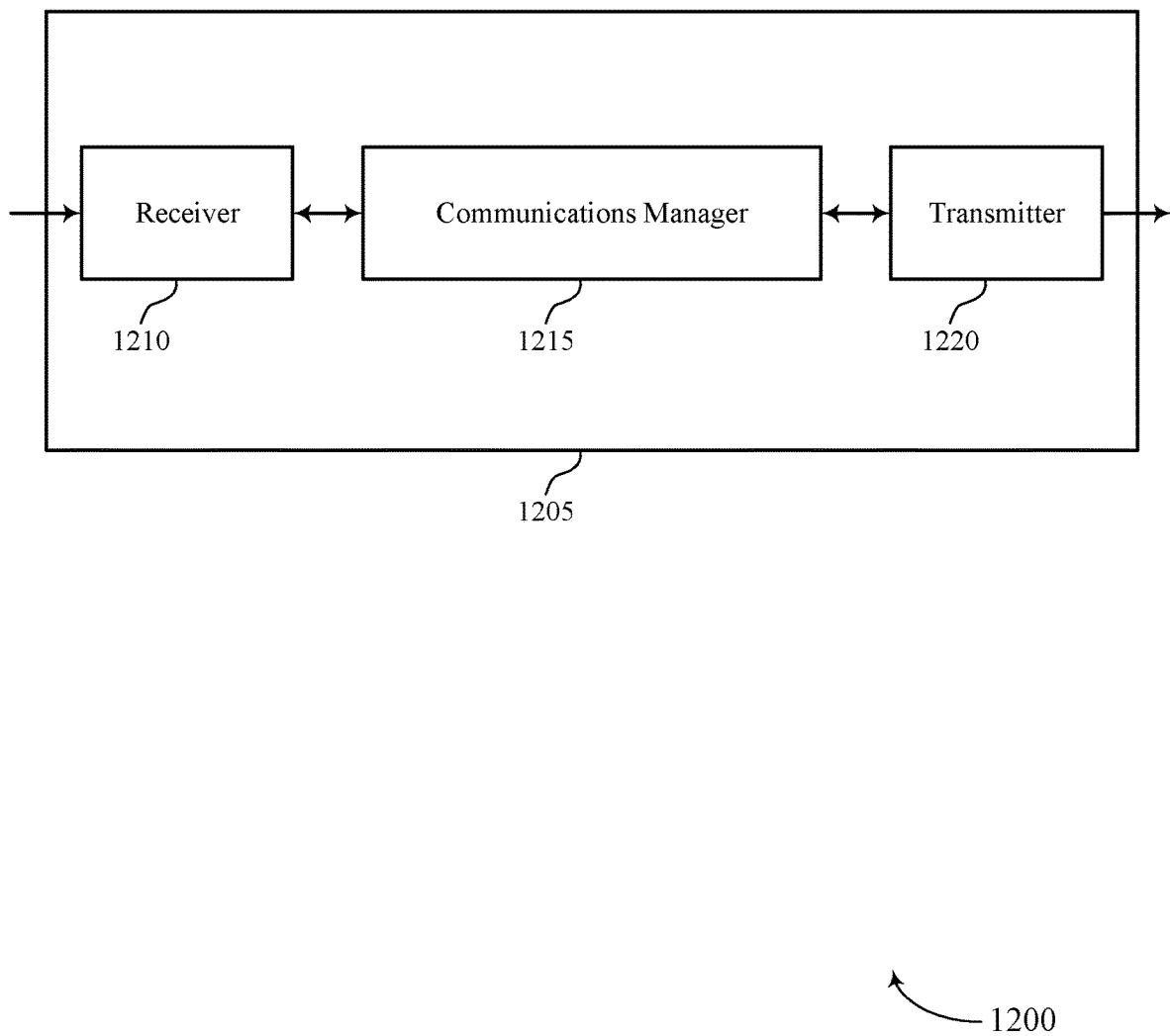
FIGS. 12 and 13 show block diagrams of devices that support a beamforming multicast repeater in accordance with aspects of the present disclosure.

FIG. 12 shows a block diagram 1200 of a device 1205 that supports a beamforming multicast repeater in accordance with aspects of the present disclosure. The device 1205 may be an example of aspects of a UE 115 as described herein. The device 1205 may include a receiver 1210, a communications manager 1215, and a transmitter 1220. The device 1205 may also include a processor. Each of these components may be in communication with one another (e.g., via one or more buses).

The receiver 1210 may receive information such as packets, user data, or control information associated with various information channels (e.g., control channels, data channels, and information related to a beamforming multicast repeater, etc.). Information may be passed on to other components of the device 1205. The receiver 1210 may utilize a single antenna or a set of antennas.

The communications manager 1215 may receive, at a first antenna array of a wireless repeater, a unicast transmission via directional beamforming, map the unicast transmission to a set of beamforming directions for transmission by the wireless repeater, and transmit, using at least a second antenna array of the wireless repeater, a multicast transmission to a set of UEs in the set of beamforming directions, the multicast transmission based on the unicast transmission. The communications manager 1215 may also receive, using at least a second antenna array of a wireless repeater, a first transmission from a first UE along a first beamforming direction and a second transmission from a second UE along a second beamforming direction, aggregate a first signal received via the first transmission and a second signal received via the second transmission to form an aggregated signal, and transmit, using a first antenna array of the wireless repeater, a unicast transmission based on the aggregated signal.

The communications manager 1215, or its sub-components, may be implemented in hardware, code (e.g., software or firmware) executed by a processor, or any combination thereof. If implemented in code executed by a processor, the functions of the communications manager 1215, or its sub-components may be executed by a general-purpose processor, a digital signal processor (DSP), an application-specific integrated circuit (ASIC), a field-programmable gate array (FPGA) or other programmable logic device, discrete gate or transistor logic, discrete hardware components, or any combination thereof designed to perform the functions described in the present disclosure.

The communications manager 1215, or its sub-components, may be physically located at various positions, including being distributed such that portions of functions are implemented at different physical locations by one or more physical components. In some examples, the communications manager 1215, or its sub-components, may be a separate and distinct component in accordance with various aspects of the present disclosure. In some examples, the communications manager 1215, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 1220 may transmit signals generated by other components of the device 1205. In some examples, the transmitter 1220 may be collocated with a receiver 1210 in a transceiver module. The transmitter 1220 may utilize a single antenna or a set of antennas.

Figure 13:
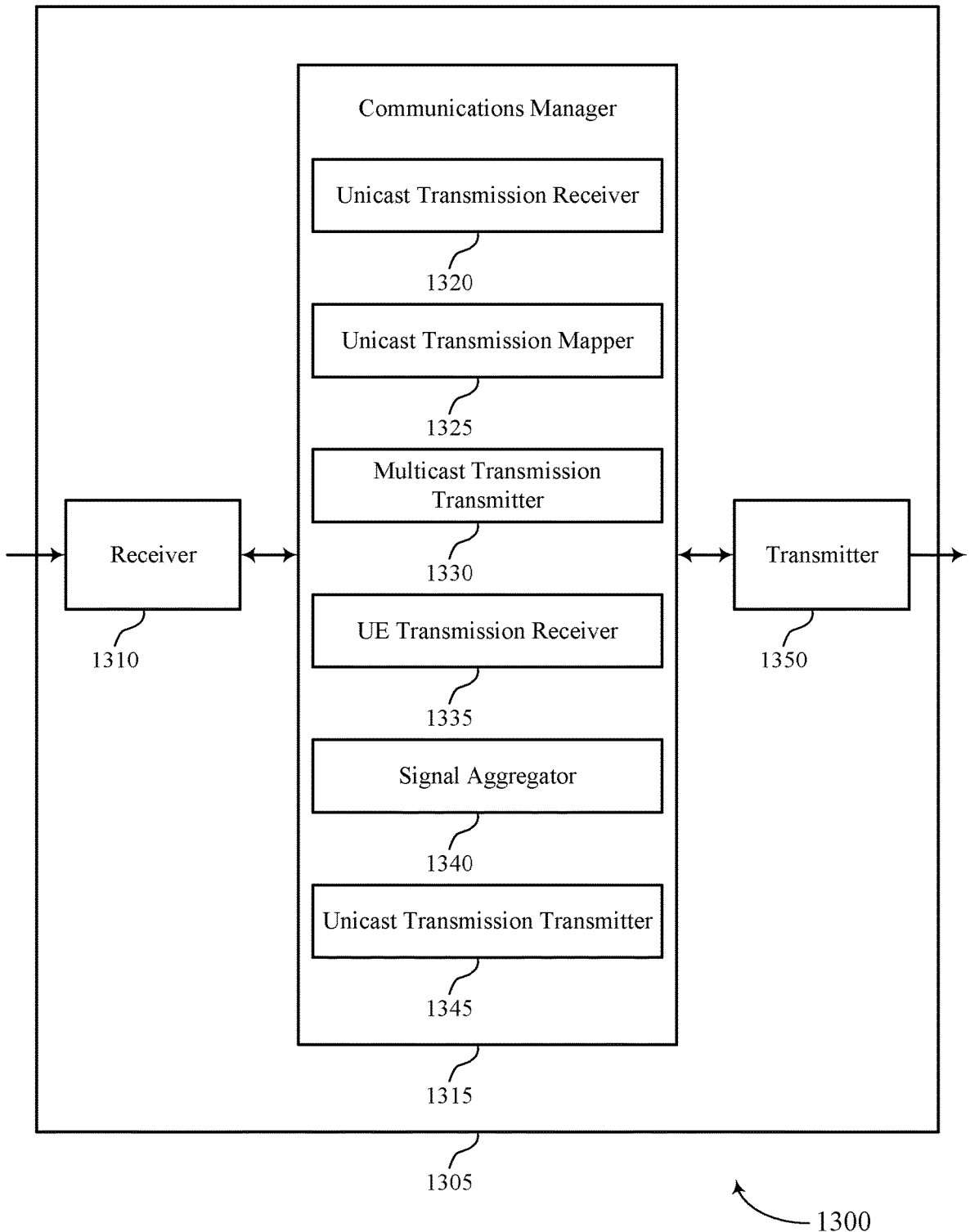

FIG. 13 shows a block diagram 1300 of a device 1305 that supports a beamforming multicast repeater in accordance with aspects of the present disclosure. The device 1305 may be an example of aspects of a device 1205, or a UE 115 as described herein. The device 1305 may include a receiver 1310, a communications manager 1315, and a transmitter 1350. The device 1305 may also include a processor. Each of these components may be in communication with one another (e.g., via one or more buses).

The receiver 1310 may receive information such as packets, user data, or control information associated with various information channels (e.g., control channels, data channels, and information related to a beamforming multicast repeater, etc.). Information may be passed on to other components of the device 1305. The receiver 1310 may utilize a single antenna or a set of antennas.

The communications manager 1315 may be an example of aspects of the communications manager 1215 as described herein. The communications manager 1315 may include an unicast transmission receiver 1320, an unicast transmission mapper 1325, a multicast transmission transmitter 1330, an UE transmission receiver 1335, a signal aggregator 1340, and an unicast transmission transmitter 1345.

The unicast transmission receiver 1320 may receive, at a first antenna array of a wireless repeater, a unicast transmission via directional beamforming.

The unicast transmission mapper 1325 may map the unicast transmission to a set of beamforming directions for transmission by the wireless repeater.

The multicast transmission transmitter 1330 may transmit, using at least a second antenna array of the wireless repeater, a multicast transmission to a set of UEs in the set of beamforming directions, the multicast transmission based on the unicast transmission.

The UE transmission receiver 1335 may receive, using at least a second antenna array of a wireless repeater, a first transmission from a first UE along a first beamforming direction and a second transmission from a second UE along a second beamforming direction.

The signal aggregator 1340 may aggregate a first signal received via the first transmission and a second signal received via the second transmission to form an aggregated signal.

The unicast transmission transmitter 1345 may transmit, using a first antenna array of the wireless repeater, a unicast transmission based on the aggregated signal.

The transmitter 1350 may transmit signals generated by other components of the device 1305. In some examples, the transmitter 1350 may be collocated with a receiver 1310 in a transceiver module. The transmitter 1350 may utilize a single antenna or a set of antennas.

Figure 14:
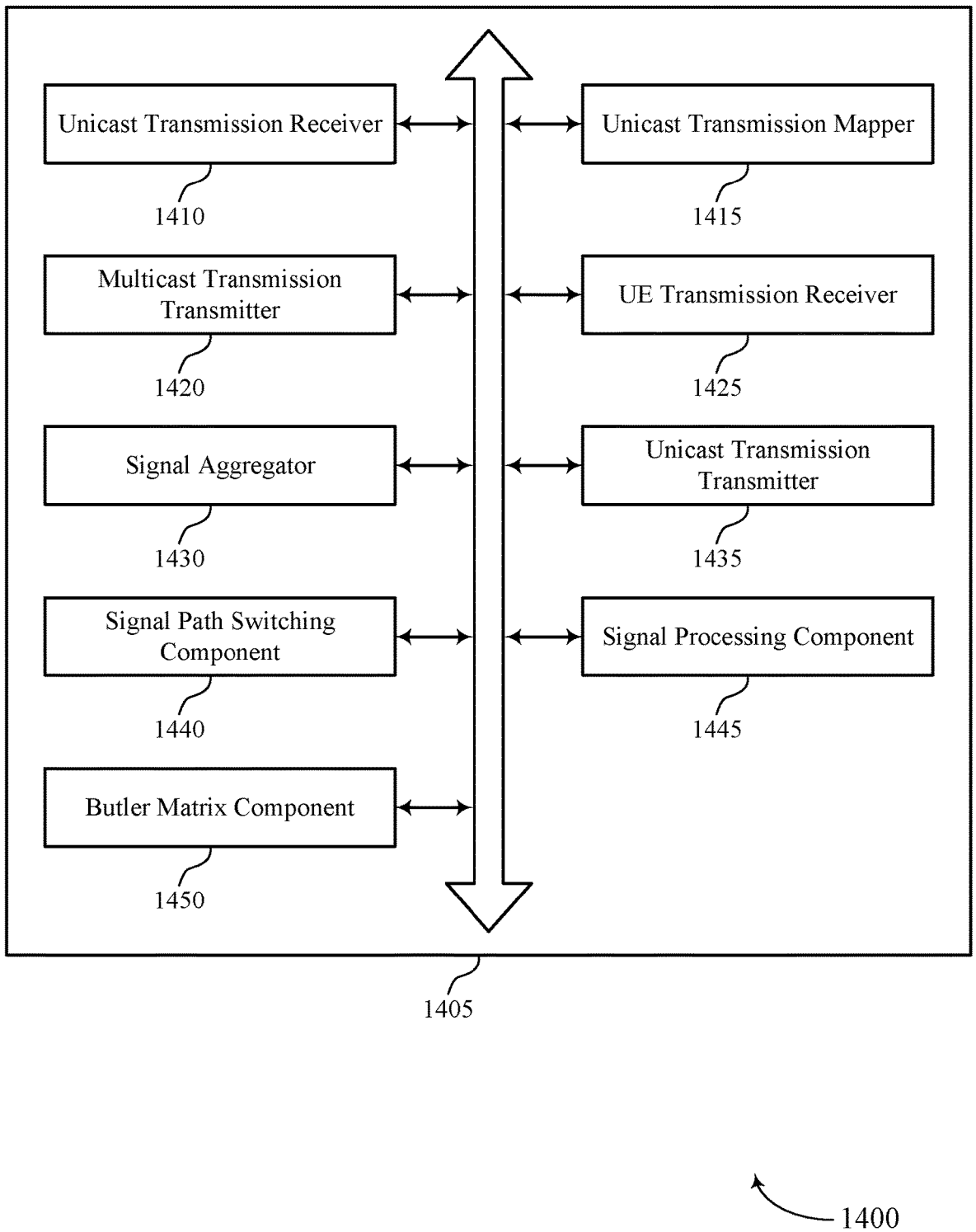
FIG. 14 shows a block diagram of a communications manager that supports a beamforming multicast repeater in accordance with aspects of the present disclosure.

FIG. 14 shows a block diagram 1400 of a communications manager 1405 that supports a beamforming multicast repeater in accordance with aspects of the present disclosure. The communications manager 1405 may be an example of aspects of a communications manager 1215 or a communications manager 1315. The communications manager 1405 may include an unicast transmission receiver 1410, an unicast transmission mapper 1415, a multicast transmission transmitter 1420, an UE transmission receiver 1425, a signal aggregator 1430, an unicast transmission transmitter 1435, a signal path switching component 1440, a signal processing component 1445, and a butler matrix component 1450. Each of these modules may communicate, directly or indirectly, with one another (e.g., via one or more buses).

The unicast transmission receiver 1410 may receive, at a first antenna array of a wireless repeater, a unicast transmission via directional beamforming. In some examples, the unicast transmission receiver 1410 may receive, at the wireless repeater, an additional unicast transmission including control information and at a frequency lower than the unicast transmission. In some examples, the unicast transmission receiver 1410 may receive, at the first antenna array of the wireless repeater, a second unicast transmission via directional beamforming.

The unicast transmission mapper 1415 may map the unicast transmission to a set of beamforming directions for transmission by the wireless repeater. In some examples, the unicast transmission mapper 1415 may route a signal received via the unicast transmission to at least two signal paths within the wireless repeater, where. In some examples, the unicast transmission mapper 1415 may feed the signal into a beamforming network that is based on a Butler matrix and is coupled with the at least two signal paths. In some examples, the unicast transmission mapper 1415 may route the signal from the first signal path to a first quadrature coupler. In some examples, the unicast transmission mapper 1415 may route the signal from the second signal path to the first quadrature coupler. In some examples, the unicast transmission mapper 1415 may route the signal from the second signal path to a second quadrature coupler. In some examples, the unicast transmission mapper 1415 may route a signal received via the unicast transmission through a first beamforming network within the wireless repeater. In some examples, the unicast transmission mapper 1415 may route the first signal and the second signal through a second beamforming network within the wireless repeater, where both the a first beamforming network and the second beamforming network are based on a Butler matrix. In some examples, the unicast transmission mapper 1415 may route the first signal through a first duplexer within the wireless repeater. In some examples, the unicast transmission mapper 1415 may route the second signal through a second duplexer within the wireless repeater. In some examples, the unicast transmission mapper 1415 may map the second unicast transmission to a set of beamforming directions for transmission by the wireless repeater including the first beamforming direction and the second beamforming direction.

The multicast transmission transmitter 1420 may transmit, using at least a second antenna array of the wireless repeater, a multicast transmission to a set of UEs in the set of beamforming directions, the multicast transmission based on the unicast transmission. In some examples, the multicast transmission transmitter 1420 may retransmit a signal received via the unicast transmission in each of the set of beamforming directions. In some examples, the multicast transmission transmitter 1420 may transmit the multicast transmission in the set of beamforming directions based on an output of the first quadrature coupler. In some examples, the multicast transmission transmitter 1420 may transmit the multicast transmission in the set of beamforming directions based on routing the signal from the second signal path to the first quadrature coupler. In some examples, the multicast transmission transmitter 1420 may transmit the multicast transmission in the set of beamforming directions based on a second output of the first quadrature coupler. In some examples, the multicast transmission transmitter 1420 may transmit the multicast transmission in the set of beamforming directions based on an output of the second quadrature coupler. In some examples, the multicast transmission transmitter 1420 may transmit the multicast transmission in the set of beamforming directions based on a second output of the first quadrature coupler and a second output of the second quadrature coupler. In some examples, the multicast transmission transmitter 1420 may transmit, using the second antenna array of the wireless repeater, a first portion of the multicast transmission in a first beamforming direction of the set of beamforming directions. In some examples, the multicast transmission transmitter 1420 may transmit, using a third antenna array of the wireless repeater, a second portion of the multicast transmission in a second beamforming direction of the set of beamforming directions. In some examples, the multicast transmission transmitter 1420 may transmit the multicast transmission based on the control information. In some examples, the multicast transmission transmitter 1420 may transmit, using at least the second antenna array of the wireless repeater, a multicast transmission to a set of UEs including the first UE and the second UE, the multicast transmission based on the second unicast transmission and in the set of beamforming directions. In some cases, a first time period between receiving the unicast transmission and transmitting the multicast transmission at least partially overlaps with a second time period between receiving the first transmission and transmitting the second unicast transmission. In some cases, the second antenna array has a same number of antennas as the first antenna array and outputs the multicast transmission in each of the set of beamforming directions.

The UE transmission receiver 1425 may receive, using at least a second antenna array of a wireless repeater, a first transmission from a first UE along a first beamforming direction and a second transmission from a second UE along a second beamforming direction. In some examples, the UE transmission receiver 1425 may receive, at the second antenna array of the wireless repeater from a first UE of the set of UEs, a first transmission along a first beamforming direction of the set. In some examples, the UE transmission receiver 1425 may receive, at the second antenna array of the wireless repeater from a second UE of the set of UEs, a second transmission along a second beamforming direction of the set. In some cases, the first transmission from the first UE and the first transmission from the second UE are received at the second antenna array of the wireless repeater. In some cases, the transmission from the first UE is received at the second antenna array of the wireless repeater and the transmission from the second UE is received at a third antenna array of the wireless repeater.

The signal aggregator 1430 may aggregate a first signal received via the first transmission and a second signal received via the second transmission to form an aggregated signal. In some examples, the signal aggregator 1430 may aggregate a first signal received via the first transmission and a second signal received via the second transmission to form an aggregated signal. In some examples, the signal aggregator 1430 may aggregate the first signal and the second signal based on routing the first signal to the first signal path and routing the second signal to the second signal path.

The unicast transmission transmitter 1435 may transmit, using a first antenna array of the wireless repeater, a unicast transmission based on the aggregated signal. In some examples, the unicast transmission transmitter 1435 may transmit, using the first antenna array of the wireless repeater, a second unicast transmission based on the aggregated signal. In some examples, the unicast transmission transmitter 1435 may transmit the unicast transmission in a single beamforming direction.

The signal path switching component 1440 may switch a signal path within the wireless repeater from a downlink configuration to an uplink configuration, where switching the signal path occurs after transmitting the multicast transmission and before receiving the transmission from the first UE and the transmission from the second UE.

The signal processing component 1445 may process the aggregated signal and a signal received via the unicast transmission using at least one of a same LNA, a same PA, or a same PA driver. In some examples, the signal processing component 1445 may process a signal received via the unicast transmission based on a first set of LNAs, PAs, and PA drivers. In some examples, the signal processing component 1445 may process the aggregated signal based on a second set of LNAs, PAs, and PA drivers.

The Butler matrix component 1450 may generate the first signal and the second signal using a beamforming network that is based on a Butler matrix and coupled with the second antenna array. In some examples, the Butler matrix component 1450 may route a signal from a first antenna of the second antenna array to a first quadrature coupler. In some examples, the Butler matrix component 1450 may obtain the first signal associated with the first UE based on an output of the first quadrature coupler. In some examples, the Butler matrix component 1450 may route a signal from a second antenna of the second antenna array to the first quadrature coupler. In some examples, the Butler matrix component 1450 may obtain the first signal associated with the first UE based on routing the signal from the second antenna to the first quadrature coupler. In some examples, the Butler matrix component 1450 may obtain the second signal associated with the second UE based on a second output from the first quadrature coupler. In some examples, the Butler matrix component 1450 may route a signal from a second antenna of the second antenna array to a second quadrature coupler. In some examples, the Butler matrix component 1450 may obtain the second signal associated with the second UE based on an output of the second quadrature coupler. In some examples, the Butler matrix component 1450 may obtain the first signal associated with the first UE based on the output from the second quadrature coupler. In some examples, the Butler matrix component 1450 may route the first signal associated with the first UE to a first signal path within the wireless repeater. In some examples, the Butler matrix component 1450 may route the second signal associated with the second UE to a second signal path within the wireless repeater.

Figure 15:
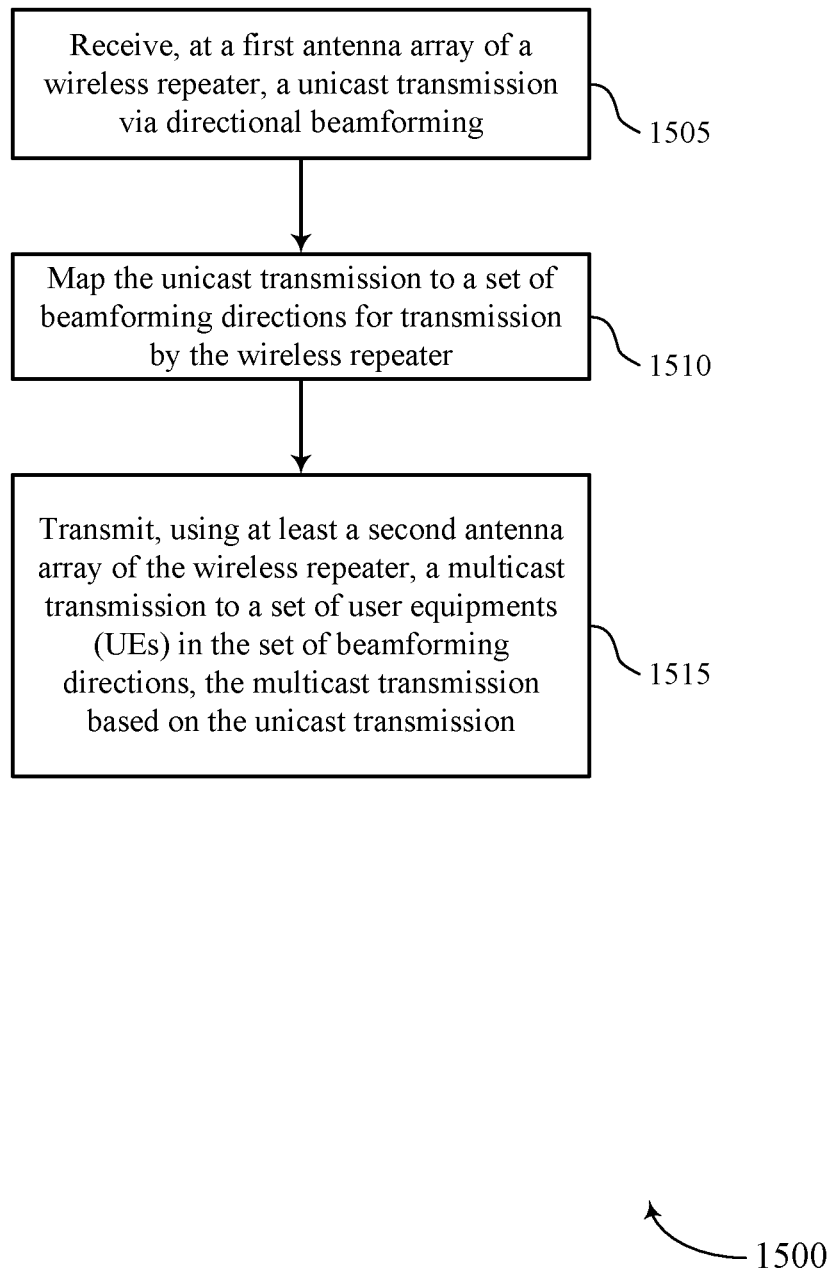
FIGS. 15 through 21 show flowcharts illustrating methods that support a beamforming multicast repeater in accordance with aspects of the present disclosure.

FIG. 15 shows a flowchart illustrating a method 1500 that supports a beamforming multicast repeater in accordance with aspects of the present disclosure. The operations of method 1500 may be implemented by a wireless repeater 205 or its components as described herein. For example, the operations of method 1500 may be performed by a beam controller 210, a signal processing chain 215, an antenna array 225, an antenna array 230, or a combination thereof as described with reference to FIG. 2. Additionally or alternatively, the operations of method 1500 may be performed by a communications manager as described with reference to FIGS. 12 through 14. In some examples, a wireless repeater 205 may execute a set of instructions to control the functional elements of the wireless repeater 205 to perform the functions described below. Additionally or alternatively, a wireless repeater 205 may perform aspects of the functions described below using special-purpose hardware.

At 1505, the wireless repeater 205 may receive, at a first antenna array of a wireless repeater, a unicast transmission via directional beamforming. The operations of 1505 may be performed according to the methods described herein. In some examples, aspects of the operations of 1505 may be performed by an unicast transmission receiver as described with reference to FIGS. 12 through 14 or by an antenna array 225 as described with reference to FIG. 2. Additionally or alternatively, means for performing 1505 may include, for example, receiver 1210, communication manager 1215, transmitter 1220, receiver 1310, communication manager 1315, transmitter 1350, or a combination thereof.

At 1510, the wireless repeater 205 may map the unicast transmission to a set of beamforming directions for transmission by the wireless repeater. The operations of 1510 may be performed according to the methods described herein. In some examples, aspects of the operations of 1510 may be performed by an unicast transmission mapper as described with reference to FIGS. 12 through 14 or by a beam controller 210 and/or a signal processing chain 215 as described with reference to FIG. 2. Additionally or alternatively, means for performing 1510 may include, for example, receiver 1210, communication manager 1215, transmitter 1220, receiver 1310, communication manager 1315, transmitter 1350, or a combination thereof.

At 1515, the wireless repeater 205 may transmit, using at least a second antenna array of the wireless repeater, a multicast transmission to a set of UEs in the set of beamforming directions, the multicast transmission based on the unicast transmission. The operations of 1515 may be performed according to the methods described herein. In some examples, aspects of the operations of 1515 may be performed by a multicast transmission transmitter as described with reference to FIGS. 12 through 14 or by an antenna array 230 as described with reference to FIG. 2. Additionally or alternatively, means for performing 1515 may include, for example, receiver 1210, communication manager 1215, transmitter 1220, receiver 1310, communication manager 1315, transmitter 1350, or a combination thereof.

Figure 16:
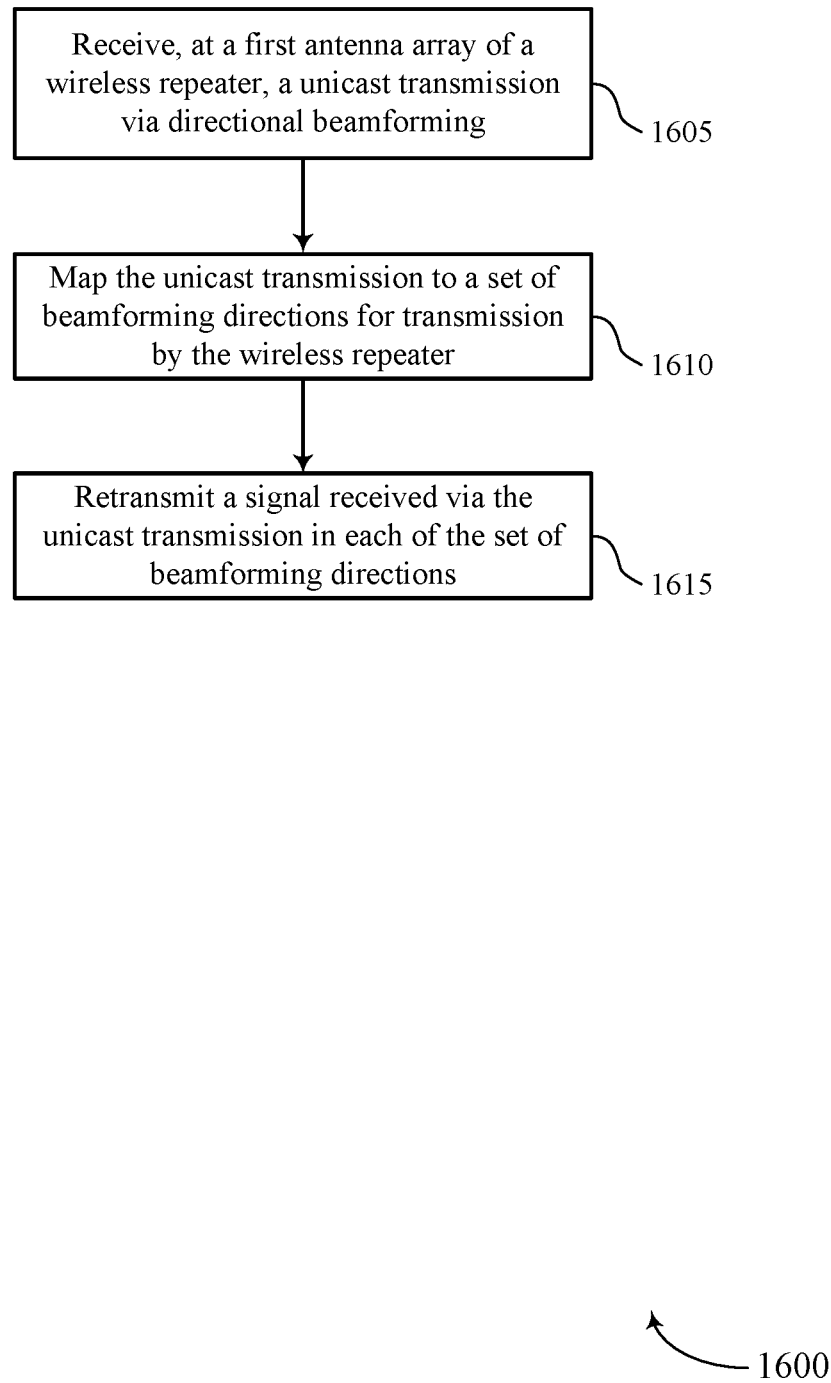

FIG. 16 shows a flowchart illustrating a method 1600 that supports a beamforming multicast repeater in accordance with aspects of the present disclosure. The operations of method 1600 may be implemented by a wireless repeater 205 or its components as described herein. For example, the operations of method 1600 may be performed by a beam controller 210, a signal processing chain 215, an antenna array 225, an antenna array 230, or a combination thereof as described with reference to FIG. 2. Additionally or alternatively, the operations of method 1600 may be performed by a communications manager as described with reference to FIGS. 12 through 14. In some examples, a wireless repeater 205 may execute a set of instructions to control the functional elements of the wireless repeater 205 to perform the functions described below. Additionally or alternatively, a wireless repeater 205 may perform aspects of the functions described below using special-purpose hardware.

At 1605, the wireless repeater 205 may receive, at a first antenna array of a wireless repeater, a unicast transmission via directional beamforming. The operations of 1605 may be performed according to the methods described herein. In some examples, aspects of the operations of 1605 may be performed by an unicast transmission receiver as described with reference to FIGS. 12 through 14 or by an antenna array 225 as described with reference to FIG. 2. Additionally or alternatively, means for performing 1605 may include, for example, receiver 1210, communication manager 1215, transmitter 1220, receiver 1310, communication manager 1315, transmitter 1350, or a combination thereof.

At 1610, the wireless repeater 205 may map the unicast transmission to a set of beamforming directions for transmission by the wireless repeater. The operations of 1610 may be performed according to the methods described herein. In some examples, aspects of the operations of 1610 may be performed by an unicast transmission mapper as described with reference to FIGS. 12 through 14 or by a beam controller 210 and/or a signal processing chain 215 as described with reference to FIG. 2. Additionally or alternatively, means for performing 1610 may include, for example, receiver 1210, communication manager 1215, transmitter 1220, receiver 1310, communication manager 1315, transmitter 1350, or a combination thereof.

At 1615, the wireless repeater 205 may retransmit a signal received via the unicast transmission in each of the set of beamforming directions. The operations of 1615 may be performed according to the methods described herein. In some examples, aspects of the operations of 1615 may be performed by a multicast transmission transmitter as described with reference to FIGS. 12 through 14 or by an antenna array 230 as described with reference to FIG. 2. Additionally or alternatively, means for performing 1615 may include, for example, receiver 1210, communication manager 1215, transmitter 1220, receiver 1310, communication manager 1315, transmitter 1350, or a combination thereof.

Figure 17:
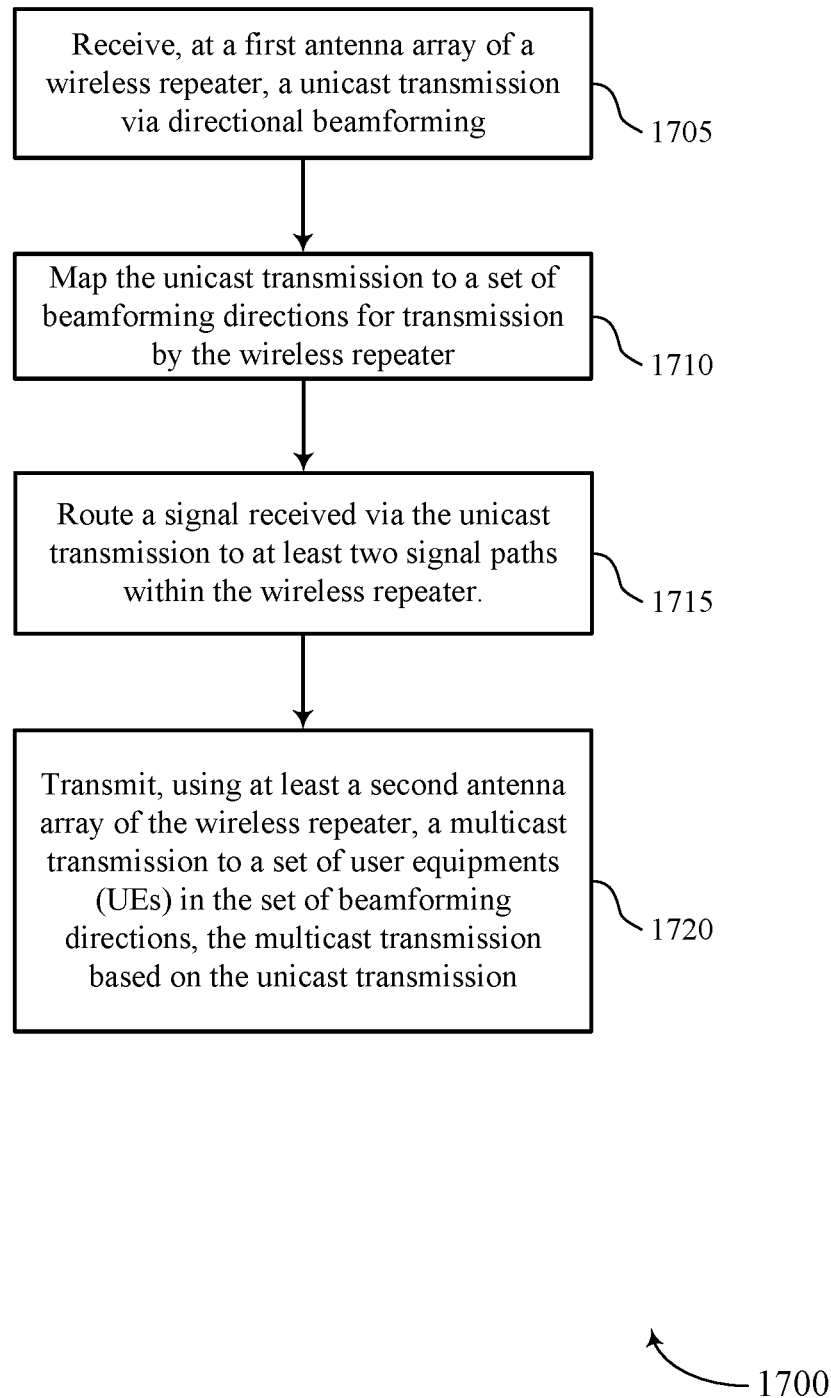

FIG. 17 shows a flowchart illustrating a method 1700 that supports a beamforming multicast repeater in accordance with aspects of the present disclosure. The operations of method 1700 may be implemented by a wireless repeater 205 or its components as described herein. For example, the operations of method 1700 may be performed by a beam controller 210, a signal processing chain 215, an antenna array 225, an antenna array 230, or a combination thereof as described with reference to FIG. 2. Additionally or alternatively, the operations of method 1700 may be performed by a communications manager as described with reference to FIGS. 12 through 14. In some examples, a wireless repeater 205 may execute a set of instructions to control the functional elements of the wireless repeater 205 to perform the functions described below. Additionally or alternatively, a wireless repeater 205 may perform aspects of the functions described below using special-purpose hardware.

At 1705, the wireless repeater 205 may receive, at a first antenna array of a wireless repeater, a unicast transmission via directional beamforming. The operations of 1705 may be performed according to the methods described herein. In some examples, aspects of the operations of 1705 may be performed by an unicast transmission receiver as described with reference to FIGS. 12 through 14 or by an antenna array 225 as described with reference to FIG. 2. Additionally or alternatively, means for performing 1705 may include, for example, receiver 1210, communication manager 1215, transmitter 1220, receiver 1310, communication manager 1315, transmitter 1350, or a combination thereof.

At 1710, the wireless repeater 205 may map the unicast transmission to a set of beamforming directions for transmission by the wireless repeater. The operations of 1710 may be performed according to the methods described herein. In some examples, aspects of the operations of 1710 may be performed by an unicast transmission mapper as described with reference to FIGS. 12 through 14 or by a beam controller 210 and/or a signal processing chain 215 as described with reference to FIG. 2. Additionally or alternatively, means for performing 1710 may include, for example, receiver 1210, communication manager 1215, transmitter 1220, receiver 1310, communication manager 1315, transmitter 1350, or a combination thereof.

At 1715, the wireless repeater 205 may route a signal received via the unicast transmission to at least two signal paths within the wireless repeater. A first signal path of the at least two signal paths may be associated with a first beamforming direction of the plurality of beamforming directions and a second signal of the at least two signal paths may be associated with a second beamforming direction of the plurality of beamforming directions. The operations of 1715 may be performed according to the methods described herein. In some examples, aspects of the operations of 1715 may be performed by an unicast transmission mapper as described with reference to FIGS. 12 through 14 or by a signal processing chain 215 and/or a beam controller 210 as described with reference to FIG. 2. Additionally or alternatively, means for performing 1715 may include, for example, receiver 1210, communication manager 1215, transmitter 1220, receiver 1310, communication manager 1315, transmitter 1350, or a combination thereof.

At 1720, the wireless repeater 205 may transmit, using at least a second antenna array of the wireless repeater, a multicast transmission to a set of UEs in the set of beamforming directions, the multicast transmission based on the unicast transmission. The operations of 1720 may be performed according to the methods described herein. In some examples, aspects of the operations of 1720 may be performed by a multicast transmission transmitter as described with reference to FIGS. 12 through 14 or by an antenna array 230 as described with reference to FIG. 2. Additionally or alternatively, means for performing 1720 may include, for example, receiver 1210, communication manager 1215, transmitter 1220, receiver 1310, communication manager 1315, transmitter 1350, or a combination thereof.

Figure 18:
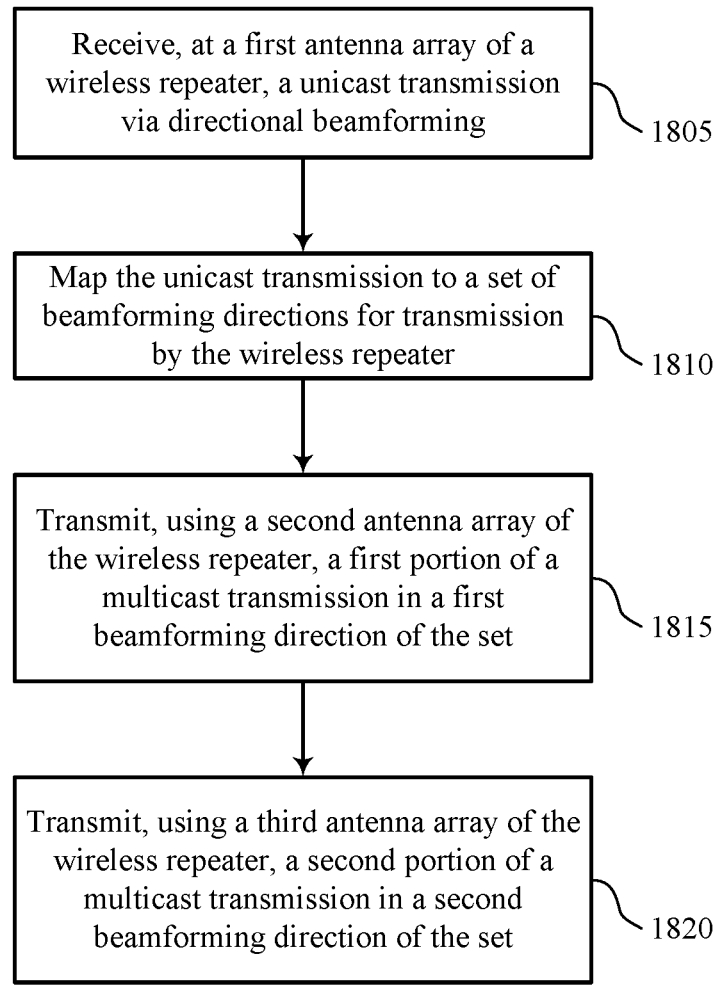

FIG. 18 shows a flowchart illustrating a method 1800 that supports a beamforming multicast repeater in accordance with aspects of the present disclosure. The operations of method 1800 may be implemented by a wireless repeater 205 or its components as described herein. For example, the operations of method 1800 may be performed by a beam controller 210, a signal processing chain 215, an antenna array 225, an antenna array 230, or a combination thereof as described with reference to FIG. 2. Additionally or alternatively, the operations of method 1800 may be performed by a communications manager as described with reference to FIGS. 12 through 14. In some examples, a wireless repeater 205 may execute a set of instructions to control the functional elements of the wireless repeater 205 to perform the functions described below. Additionally or alternatively, a wireless repeater 205 may perform aspects of the functions described below using special-purpose hardware.

At 1805, the wireless repeater 205 may receive, at a first antenna array of a wireless repeater, a unicast transmission via directional beamforming. The operations of 1805 may be performed according to the methods described herein. In some examples, aspects of the operations of 1805 may be performed by an unicast transmission receiver as described with reference to FIGS. 12 through 14 or by an antenna array 225 as described with reference to FIG. 2. Additionally or alternatively, means for performing 1805 may include, for example, receiver 1210, communication manager 1215, transmitter 1220, receiver 1310, communication manager 1315, transmitter 1350, or a combination thereof.

At 1810, the wireless repeater 205 may map the unicast transmission to a set of beamforming directions for transmission by the wireless repeater. The operations of 1810 may be performed according to the methods described herein. In some examples, aspects of the operations of 1810 may be performed by an unicast transmission mapper as described with reference to FIGS. 12 through 14 or by a beam controller 210 and/or a signal processing chain 215 as described with reference to FIG. 2. Additionally or alternatively, means for performing 1810 may include, for example, receiver 1210, communication manager 1215, transmitter 1220, receiver 1310, communication manager 1315, transmitter 1350, or a combination thereof.

At 1815, the wireless repeater 205 may transmit, using a second antenna array of the wireless repeater 205, a first portion of a multicast transmission in a first beamforming direction of the set of beamforming directions. The operations of 1815 may be performed according to the methods described herein. In some examples, aspects of the operations of 1815 may be performed by a multicast transmission transmitter as described with reference to FIGS. 12 through 14 or by an antenna array associated with a first signal path as described with reference to FIG. 2. Additionally or alternatively, means for performing 1815 may include, for example, receiver 1210, communication manager 1215, transmitter 1220, receiver 1310, communication manager 1315, transmitter 1350, or a combination thereof.

At 1820, the wireless repeater 205 may transmit, using a third antenna array of the wireless repeater, a second portion of a multicast transmission in a second beamforming direction of the set of beamforming directions. The operations of 1820 may be performed according to the methods described herein. In some examples, aspects of the operations of 1820 may be performed by a multicast transmission transmitter as described with reference to FIGS. 12 through 14 or by an antenna array associated with a second signal path as described with reference to FIG. 2. Additionally or alternatively, means for performing 1820 may include, for example, receiver 1210, communication manager 1215, transmitter 1220, receiver 1310, communication manager 1315, transmitter 1350, or a combination thereof.

Figure 19:
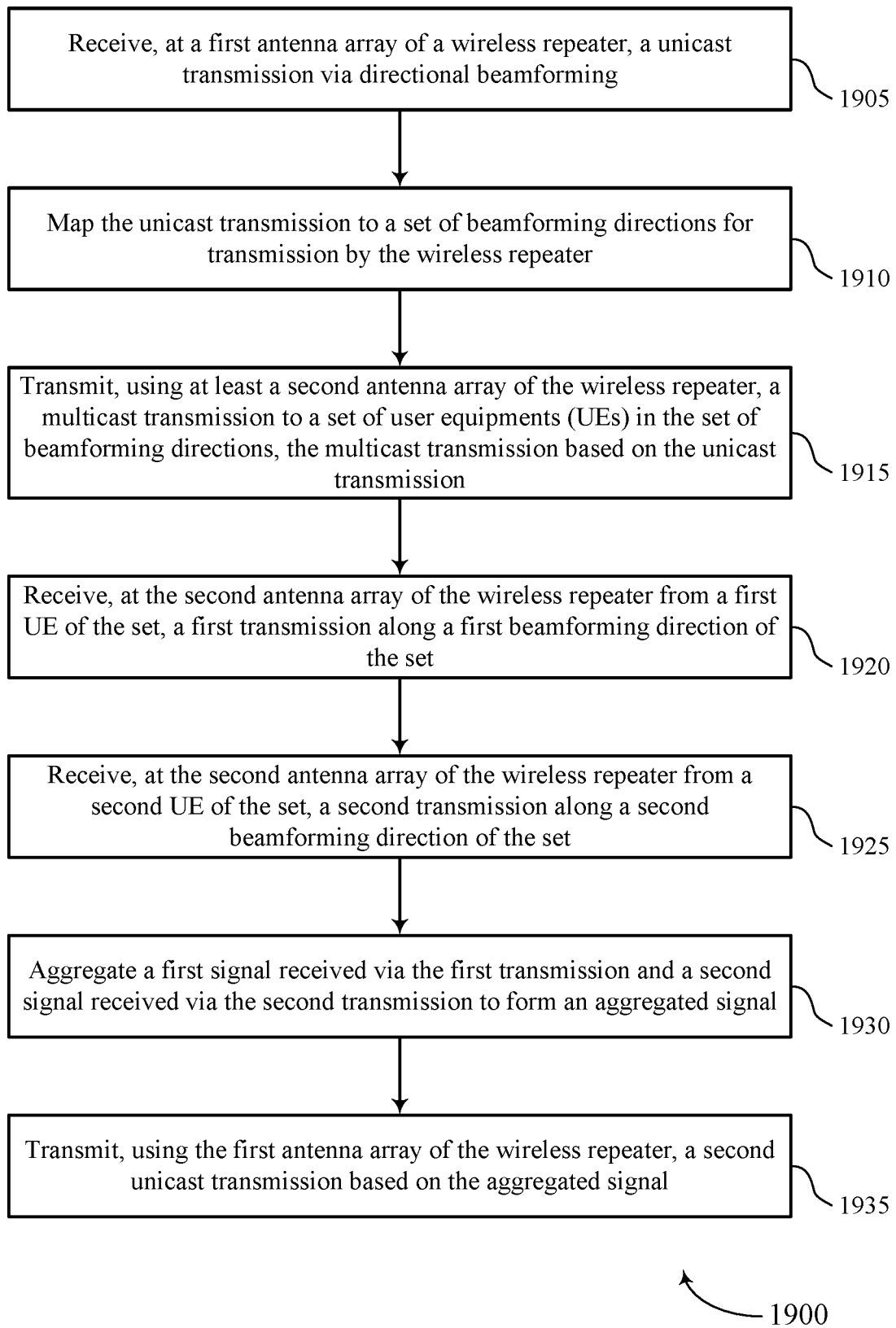

FIG. 19 shows a flowchart illustrating a method 1900 that supports a beamforming multicast repeater in accordance with aspects of the present disclosure. The operations of method 1900 may be implemented by a wireless repeater 205 or its components as described herein. For example, the operations of method 1900 may be performed by a beam controller 210, a signal processing chain 215, an antenna array 225, an antenna array 230, or a combination thereof as described with reference to FIG. 2. Additionally or alternatively, the operations of method 1900 may be performed by a communications manager as described with reference to FIGS. 12 through 14. In some examples, a wireless repeater 205 may execute a set of instructions to control the functional elements of the wireless repeater 205 to perform the functions described below. Additionally or alternatively, a wireless repeater 205 may perform aspects of the functions described below using special-purpose hardware.

At 1905, the wireless repeater 205 may receive, at a first antenna array of a wireless repeater, a unicast transmission via directional beamforming. The operations of 1905 may be performed according to the methods described herein. In some examples, aspects of the operations of 1905 may be performed by an unicast transmission receiver as described with reference to FIGS. 12 through 14 or an antenna array 225 as described with reference to FIG. 2. Additionally or alternatively, means for performing 1905 may include, for example, receiver 1210, communication manager 1215, transmitter 1220, receiver 1310, communication manager 1315, transmitter 1350, or a combination thereof.

At 1910, the wireless repeater 205 may map the unicast transmission to a set of beamforming directions for transmission by the wireless repeater. The operations of 1910 may be performed according to the methods described herein. In some examples, aspects of the operations of 1910 may be performed by an unicast transmission mapper as described with reference to FIGS. 12 through 14 or by a beam controller 210 and/or a signal processing chain 215 as described with reference to FIG. 2. Additionally or alternatively, means for performing 1910 may include, for example, receiver 1210, communication manager 1215, transmitter 1220, receiver 1310, communication manager 1315, transmitter 1350, or a combination thereof.

At 1915, the wireless repeater 205 may transmit, using at least a second antenna array of the wireless repeater, a multicast transmission to a set of UEs in the set of beamforming directions, the multicast transmission based on the unicast transmission. The operations of 1915 may be performed according to the methods described herein. In some examples, aspects of the operations of 1915 may be performed by a multicast transmission transmitter as described with reference to FIGS. 12 through 14 or by an antenna array 230 as described with reference to FIG. 2. Additionally or alternatively, means for performing 1915 may include, for example, receiver 1210, communication manager 1215, transmitter 1220, receiver 1310, communication manager 1315, transmitter 1350, or a combination thereof.

At 1920, the wireless repeater 205 may receive, at the second antenna array of the wireless repeater from a first UE of the set of UEs, a first transmission along a first beamforming direction of the set. The operations of 1920 may be performed according to the methods described herein. In some examples, aspects of the operations of 1920 may be performed by an UE transmission receiver as described with reference to FIGS. 12 through 14 or by an antenna array 230 as described with reference to FIG. 2. Additionally or alternatively, means for performing 1920 may include, for example, receiver 1210, communication manager 1215, transmitter 1220, receiver 1310, communication manager 1315, transmitter 1350, or a combination thereof.

At 1925, the wireless repeater 205 may receive, at the second antenna array of the wireless repeater from a second UE of the set of UEs, a second transmission along a second beamforming direction of the set. The operations of 1925 may be performed according to the methods described herein. In some examples, aspects of the operations of 1925 may be performed by an UE transmission receiver as described with reference to FIGS. 12 through 14 or by an antenna array 230 as described with reference to FIG. 2. Additionally or alternatively, means for performing 1925 may include, for example, receiver 1210, communication manager 1215, transmitter 1220, receiver 1310, communication manager 1315, transmitter 1350, or a combination thereof.

At 1930, the wireless repeater 205 may aggregate a first signal received via the first transmission and a second signal received via the second transmission to form an aggregated signal. The operations of 1930 may be performed according to the methods described herein. In some examples, aspects of the operations of 1930 may be performed by a signal aggregator as described with reference to FIGS. 12 through 14 or by a signal processing chain 215 and/or a beam controller 210 as described with reference to FIG. 2. Additionally or alternatively, means for performing 1930 may include, for example, receiver 1210, communication manager 1215, transmitter 1220, receiver 1310, communication manager 1315, transmitter 1350, or a combination thereof.

At 1935, the wireless repeater 205 may transmit, using the first antenna array of the wireless repeater, a second unicast transmission based on the aggregated signal. The operations of 1935 may be performed according to the methods described herein. In some examples, aspects of the operations of 1935 may be performed by an unicast transmission transmitter as described with reference to FIGS. 12 through 14 or by an antenna array 225 as described with regards to FIG. 2. Additionally or alternatively, means for performing 1935 may include, for example, receiver 1210, communication manager 1215, transmitter 1220, receiver 1310, communication manager 1315, transmitter 1350, or a combination thereof.

Figure 20:
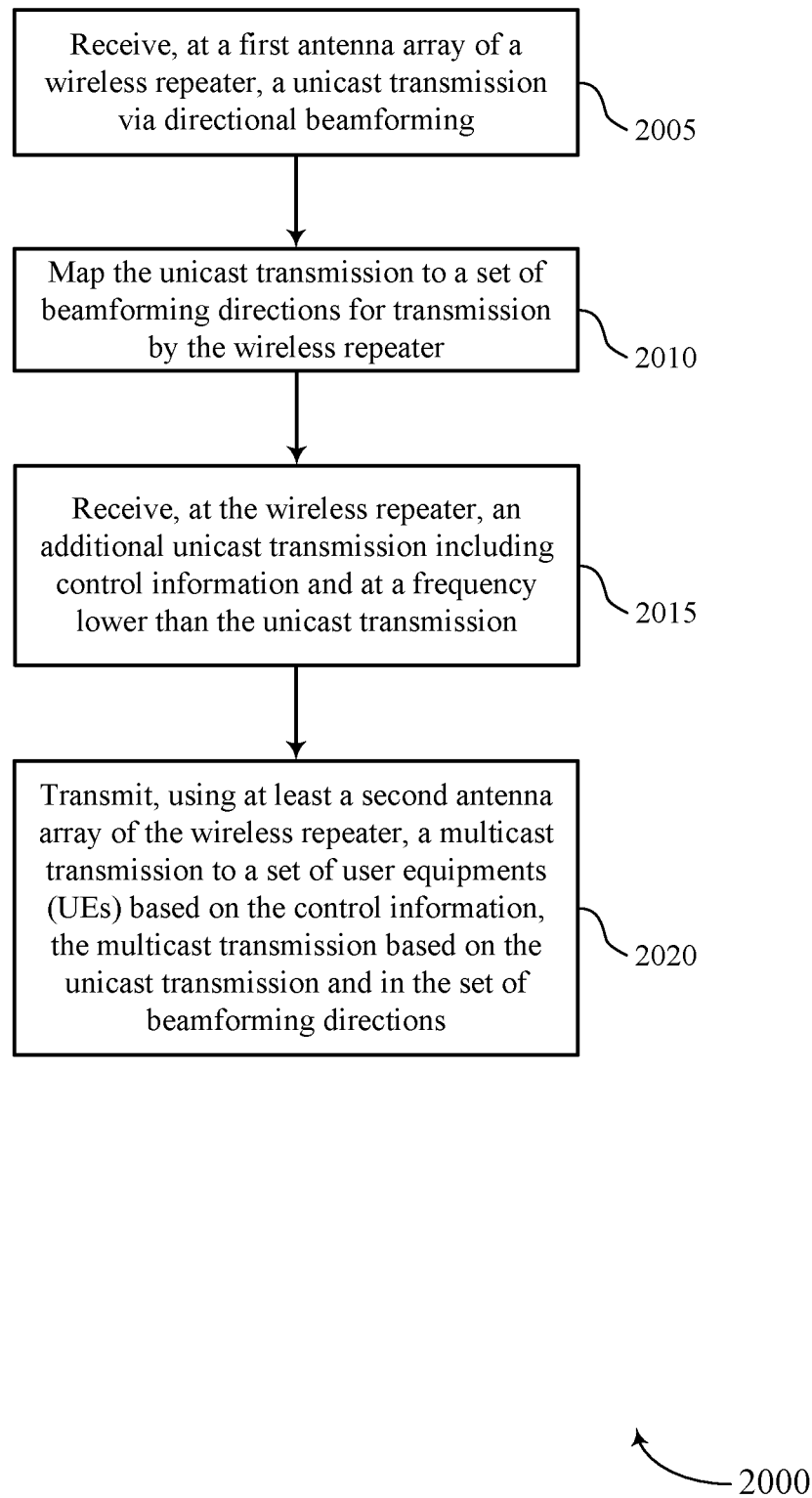

FIG. 20 shows a flowchart illustrating a method 2000 that supports a beamforming multicast repeater in accordance with aspects of the present disclosure. The operations of method 2000 may be implemented by a wireless repeater 205 or its components as described herein. For example, the operations of method 2000 may be performed by a beam controller 210, a signal processing chain 215, an antenna array 225, an antenna array 230, or a combination thereof as described with reference to FIG. 2. Additionally or alternatively, the operations of method 2000 may be performed by a communications manager as described with reference to FIGS. 12 through 14. In some examples, a wireless repeater 205 may execute a set of instructions to control the functional elements of the wireless repeater 205 to perform the functions described below. Additionally or alternatively, a wireless repeater 205 may perform aspects of the functions described below using special-purpose hardware.

At 2005, the wireless repeater 205 may receive, at a first antenna array of a wireless repeater, a unicast transmission via directional beamforming. The operations of 2005 may be performed according to the methods described herein. In some examples, aspects of the operations of 2005 may be performed by an unicast transmission receiver as described with reference to FIGS. 12 through 14 or by an antenna array 225 as described with reference to FIG. 2. Additionally or alternatively, means for performing 2005 may include, for example, receiver 1210, communication manager 1215, transmitter 1220, receiver 1310, communication manager 1315, transmitter 1350, or a combination thereof.

At 2010, the wireless repeater 205 may map the unicast transmission to a set of beamforming directions for transmission by the wireless repeater. The operations of 2010 may be performed according to the methods described herein. In some examples, aspects of the operations of 2010 may be performed by an unicast transmission mapper as described with reference to FIGS. 12 through 14 or by a beam controller 210 and/or a signal processing chain 215 as described with reference to FIG. 2. Additionally or alternatively, means for performing 2010 may include, for example, receiver 1210, communication manager 1215, transmitter 1220, receiver 1310, communication manager 1315, transmitter 1350, or a combination thereof.

At 2015, the wireless repeater 205 may receive, at the wireless repeater, an additional unicast transmission including control information and at a frequency lower than the unicast transmission. The operations of 2015 may be performed according to the methods described herein. In some examples, aspects of the operations of 2015 may be performed by an unicast transmission receiver as described with reference to FIGS. 12 through 14 or by an RF component 245 as described with reference to FIG. 2. Additionally or alternatively, means for performing 2015 may include, for example, receiver 1210, communication manager 1215, transmitter 1220, receiver 1310, communication manager 1315, transmitter 1350, or a combination thereof.

At 2020, the wireless repeater 205 may transmit, using at least a second antenna array of the wireless repeater, a multicast transmission to a set of UEs in the set of beamforming directions, the multicast transmission based on the unicast transmission. The operations of 2020 may be performed according to the methods described herein. In some examples, aspects of the operations of 2020 may be performed by a multicast transmission transmitter as described with reference to FIGS. 12 through 14 or by an antenna array 230 as described with reference to FIG. 2. Additionally or alternatively, means for performing 2025 may include, for example, receiver 1210, communication manager 1215, transmitter 1220, receiver 1310, communication manager 1315, transmitter 1350, or a combination thereof.

Figure 21:
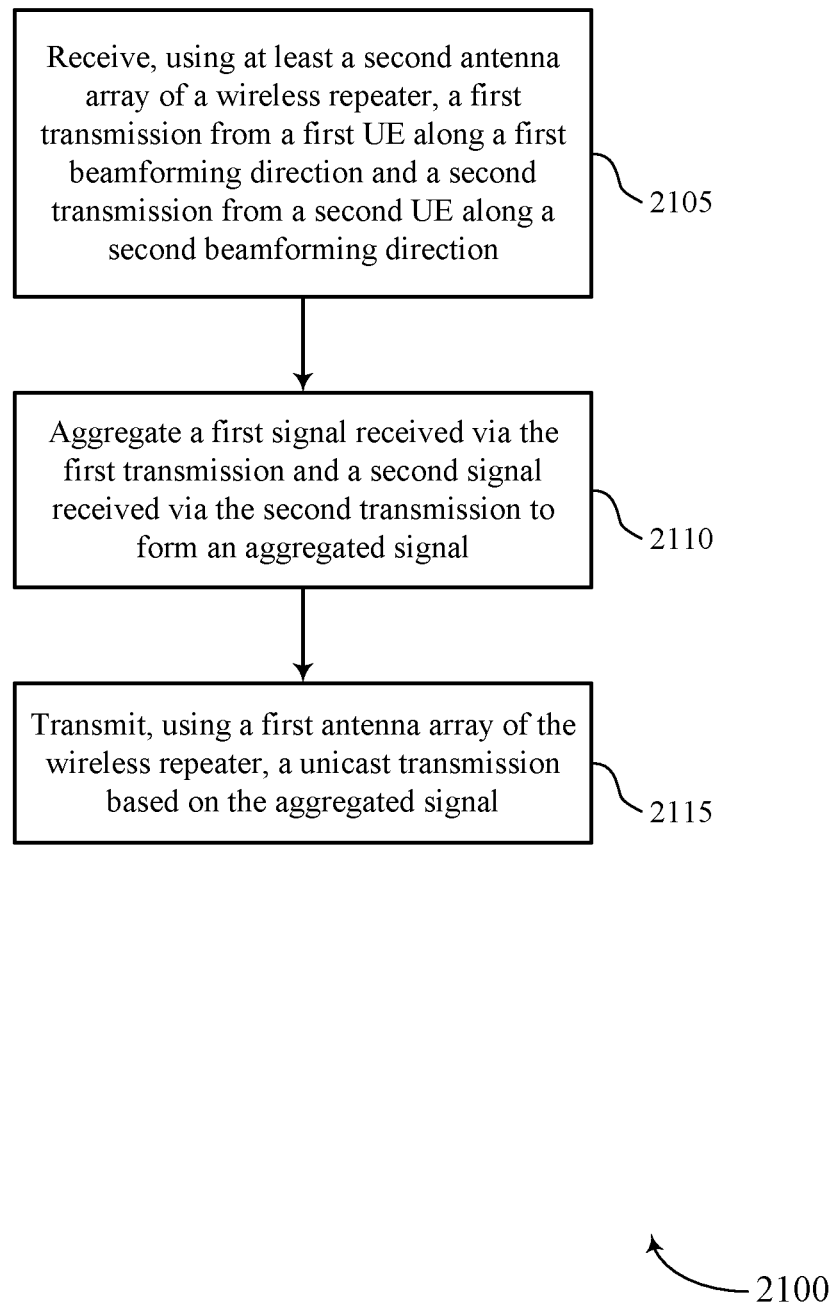

FIG. 21 shows a flowchart illustrating a method 2100 that supports a beamforming multicast repeater in accordance with aspects of the present disclosure. The operations of method 2100 may be implemented by a wireless repeater 205 or its components as described herein. For example, the operations of method 2100 may be performed by a beam controller 210, a signal processing chain 215, an antenna array 225, an antenna array 230, or a combination thereof as described with reference to FIG. 2. Additionally or alternatively, the operations of method 2100 may be performed by a communications manager as described with reference to FIGS. 12 through 14. In some examples, a wireless repeater 205 may execute a set of instructions to control the functional elements of the wireless repeater 205 to perform the functions described below. Additionally or alternatively, a wireless repeater 205 may perform aspects of the functions described below using special-purpose hardware.

At 2105, the wireless repeater 205 may receive, using at least a second antenna array of a wireless repeater, a first transmission from a first UE along a first beamforming direction and a second transmission from a second UE along a second beamforming direction. The operations of 2105 may be performed according to the methods described herein. In some examples, aspects of the operations of 2105 may be performed by an UE transmission receiver as described with reference to FIGS. 12 through 14 or by an antenna array 230 as described with reference to FIG. 2. Additionally or alternatively, means for performing 2105 may include, for example, receiver 1210, communication manager 1215, transmitter 1220, receiver 1310, communication manager 1315, transmitter 1350, or a combination thereof.

At 2110, the wireless repeater 205 may aggregate a first signal received via the first transmission and a second signal received via the second transmission to form an aggregated signal. The operations of 2110 may be performed according to the methods described herein. In some examples, aspects of the operations of 2110 may be performed by a signal aggregator as described with reference to FIGS. 12 through 14 or by a beam controller 210 and/or a signal processing chain 215 as described with reference to FIG. 2. Alternatively, aspects of the operations of 2110 may be performed by a first antenna array associated with the first signal and a second antenna array associated with the second signal. Additionally or alternatively, means for performing 2110 may include, for example, receiver 1210, communication manager 1215, transmitter 1220, receiver 1310, communication manager 1315, transmitter 1350, or a combination thereof.

At 2115, the wireless repeater 205 may transmit, using a first antenna array of the wireless repeater, a unicast transmission based on the aggregated signal. The operations of 2115 may be performed according to the methods described herein. In some examples, aspects of the operations of 2115 may be performed by an unicast transmission transmitter as described with reference to FIGS. 12 through 14 or an antenna array 225 as described with reference to FIG. 2. Additionally or alternatively, means for performing 2115 may include, for example, receiver 1210, communication manager 1215, transmitter 1220, receiver 1310, communication manager 1315, transmitter 1350, or a combination thereof.

It should be noted that the methods described herein describe possible implementations, and that the operations and the steps may be rearranged or otherwise modified and that other implementations are possible. For example, some or all of the operations and steps described herein (including but not limited to in relation to FIGS. 11 and 15 through 21) may in some cases be performed in varying orders or at least partially concurrently (e.g., in parallel or otherwise during at least partially overlapping time periods). Further, aspects from two or more of the methods may be combined.

As used herein, a meta-material may refer to any material with a tunable (configurable, adjustable) electric permittivity or magnetic permeability. For example, a meta-material may be man-made (not occurring in nature), possibly using nano-fabrication or like fabrication techniques. In some cases, meta-materials may alternatively be referred to as left-handed materials, epsilon negative (ENG) materials, double-negative materials, negative refractive index materials, or chiral materials. In some cases, one or more of the components described herein may be formed using (e.g., may include) one or more meta-materials, including but not limited to antennas, waveguides/transmission lines, switches, phase shifters, couplers, or duplexers (circulators), among other components. In some examples, one or more components of the Butler matrix with reference to FIG. 3 can include devices fabricated using meta-materials, for example, waveguides/transmission lines, couplers (including quadrature couplers), phase shifters, and/or antenna elements. In one particular example, at very high frequencies, for example at or above 50 GHz, some components of the Butler matrix and/or other components of the wireless repeater (for example, wireless repeater 205 with reference to FIG. 2) may be fabricated using meta-materials due to superior high-frequency performance of these materials.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE, LTE-A, and LTE-A Pro are releases of UMTS that use E-UTRA. UTRA, E-UTRA, UMTS, LTE, LTE-A, LTE-A Pro, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned herein as well as other systems and radio technologies. While aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR applications.

A macro cell generally covers a relatively large geographic area (e.g., several kilometers in radius) and may allow unrestricted access by UEs with service subscriptions with the network provider. A small cell may be associated with a lower-powered base station, as compared with a macro cell, and a small cell may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs with service subscriptions with the network provider. A femto cell may also cover a small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells, and may also support communications using one or multiple component carriers.

The wireless communications systems described herein may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA, or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

Where appropriate, the functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein can be implemented using software executed by a processor, hardware, firmware, hardwiring, or combinations of any of these. Features implementing functions may also be physically located at various positions, including being distributed such that portions of functions are implemented at different physical locations. It is understood, however, that some aspects such as analog and/or RF blocks (components or sets of components) may not be implemented by software and may instead be implemented by hardware.

Computer-readable media includes both non-transitory computer storage media and communication media including any medium that facilitates transfer of a computer program from one place to another. A non-transitory storage medium may be any available medium that can be accessed by a general purpose or special-purpose computer. By way of example, and not limitation, non-transitory computer-readable media may include random-access memory (RAM), read-only memory (ROM), electrically erasable programmable ROM (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication, comprising:
receiving, at a first antenna array of a wireless repeater, a unicast transmission via directional beamforming;
mapping the unicast transmission to a plurality of beamforming directions for transmission by the wireless repeater by routing a signal received via the unicast transmission to at least two signal paths within the wireless repeater;
feeding the signal into a beamforming network that is based at least in part on a Butler matrix and is coupled with the at least two signal paths; and
transmitting, using at least a second antenna array of the wireless repeater, a multicast transmission to a plurality of user equipments (UEs) in the plurality of beamforming directions, the multicast transmission based at least in part on the unicast transmission.

2. The method of claim 1, wherein the transmitting the multicast transmission comprises:
retransmitting the signal received via the unicast transmission in each of the plurality of beamforming directions.

3. The method of claim 1, wherein
a first signal path of the at least two signal paths is associated with a first beamforming direction of the plurality of beamforming directions; and
a second signal path of the at least two signal paths is associated with a second beamforming direction of the plurality of beamforming directions.

4. The method of claim 3, further comprising:
routing the signal from the first signal path to a first quadrature coupler of the beamforming network; and
transmitting the multicast transmission in the plurality of beamforming directions based at least in part on an output of the first quadrature coupler of the beamforming network.

5. The method of claim 4, further comprising:
routing the signal from the second signal path to the first quadrature coupler of the beamforming network; and
transmitting the multicast transmission in the plurality of beamforming directions based at least in part on routing the signal from the second signal path to the first quadrature coupler of the beamforming network.

6. The method of claim 5, further comprising:
transmitting the multicast transmission in the plurality of beamforming directions based at least in part on a second output of the first quadrature coupler of the beamforming network.

7. The method of claim 4, further comprising:
routing the signal from the second signal path to a second quadrature coupler of the beamforming network; and
transmitting the multicast transmission in the plurality of beamforming directions based at least in part on an output of the second quadrature coupler of the beamforming network.

8. The method of claim 7, further comprising:
transmitting the multicast transmission in the plurality of beamforming directions based at least in part on a second output of the first quadrature coupler of the beamforming network and a second output of the second quadrature coupler of the beamforming network.

9. The method of claim 1, further comprising:
transmitting, using the second antenna array of the wireless repeater, a first portion of the multicast transmission in a first beamforming direction of the plurality of beamforming directions; and
transmitting, using a third antenna array of the wireless repeater, a second portion of the multicast transmission in a second beamforming direction of the plurality of beamforming directions.

10. The method of claim 1, further comprising:
receiving, at the second antenna array of the wireless repeater from a first UE of the plurality of UEs, a first transmission along a first beamforming direction of the plurality of beamforming directions;
receiving, at the second antenna array of the wireless repeater from a second UE of the plurality of UEs, a second transmission along a second beamforming direction of the plurality of beamforming directions;
aggregating a first signal received via the first transmission and a second signal received via the second transmission to form an aggregated signal; and
transmitting, using the first antenna array of the wireless repeater, a second unicast transmission based at least in part on the aggregated signal.

11. The method of claim 10, further comprising:
switching a signal path within the wireless repeater from a downlink configuration to an uplink configuration, wherein the switching the signal path occurs after transmitting the multicast transmission and before receiving the transmission from the first UE and the transmission from the second UE.

12. The method of claim 11, further comprising:
processing the aggregated signal and a signal received via the unicast transmission using at least one of a same low noise amplifier (LNA), a same power amplifier (PA), or a same PA driver.

13. The method of claim 11, further comprising:
processing a signal received via the unicast transmission based at least in part on a first set of low noise amplifiers (LNAs), power amplifiers (PAs), and PA drivers; and
processing the aggregated signal based at least in part on a second set of LNAs, PAs, and PA drivers.

14. The method of claim 10, wherein a first time period between receiving the unicast transmission and transmitting the multicast transmission at least partially overlaps with a second time period between receiving the first transmission and transmitting the second unicast transmission.

15. The method of claim 14, further comprising:
routing the first signal and the second signal through a second beamforming network that is based at least in part on the Butler matrix.

16. The method of claim 14, further comprising:
routing the first signal through a first duplexer within the wireless repeater; and
routing the second signal through a second duplexer within the wireless repeater.

17. A method for wireless communication, comprising:
receiving, using at least a second antenna array of a wireless repeater, a first transmission from a first user equipment (UE) along a first beamforming direction and a second transmission from a second UE along a second beamforming direction;

obtaining a first signal that approximates the received first transmission and a second signal that approximates the received second transmission using a beamforming network that is based at least in part on a Butler matrix and coupled with the second antenna array;

aggregating the first signal and the second signal to form an aggregated signal; and transmitting, using a first antenna array of the wireless repeater, a unicast transmission based at least in part on the aggregated signal.

18. The method of claim 17, further comprising:

routing a signal from a first antenna of the second antenna array to a first quadrature coupler of the beamforming network; and obtaining the first signal based at least in part on an output of the first quadrature coupler of the beamforming network.

19. The method of claim 18, further comprising:

routing a signal from a second antenna of the second antenna array to the first quadrature coupler of the beamforming network; and obtaining the first signal based at least in part on routing the signal from the second antenna to the first quadrature coupler of the beamforming network.

20. The method of claim 19, further comprising:

obtaining the second signal based at least in part on a second output from the first quadrature coupler of the beamforming network.

21. The method of claim 18, further comprising:

routing a signal from a second antenna of the second antenna array to a second quadrature coupler of the beamforming network; and obtaining the second signal based at least in part on an output of the second quadrature coupler of the beamforming network.

22. The method of claim 21, further comprising:

obtaining the first signal based at least in part on the output from the second quadrature coupler of the beamforming network.

23. The method of claim 17, wherein the first transmission from the first UE is received at the second antenna array of the wireless repeater and the second transmission from the second UE is received at a third antenna array of the wireless repeater.

24. The method of claim 17, further comprising:

receiving, at the first antenna array of the wireless repeater, a second unicast transmission via directional beamforming;

mapping the second unicast transmission to a plurality of beamforming directions comprising the first beamforming direction and the second beamforming direction; and transmitting, using at least the second antenna array of the wireless repeater, a multicast transmission to a plurality of UEs comprising the first UE and the second UE, the multicast transmission based at least in part on the second unicast transmission and in the plurality of beamforming directions.

25. The method of claim 17, further comprising:

routing the first signal to a first signal path within the wireless repeater; and routing the second signal to a second signal path within the wireless repeater, wherein the aggregating the first signal and the second signal comprises aggregating the first signal and the second signal based at least in part on routing the first signal to the first signal path and routing the second signal to the second signal path.

26. An apparatus for wireless communication, comprising:

a processor of a wireless repeater;

memory in electronic communication with the processor; and instructions stored in the memory and executable by the processor to cause the apparatus to:

receive, at a first antenna array of the wireless repeater, a unicast transmission via directional beamforming;

map the unicast transmission to a plurality of beamforming directions for transmission by the wireless repeater by routing a signal received via the unicast transmission to at least two signal paths within the wireless repeater;

feed the signal into a beamforming network that is based at least in part on a Butler matrix and is coupled with the at least two signal paths; and transmit, using at least a second antenna array of the wireless repeater, a multicast transmission to a plurality of user equipments (UEs) in the plurality of beamforming directions, the multicast transmission based at least in part on the unicast transmission.

27. An apparatus for wireless communication, comprising:

a processor of a wireless repeater;

memory in electronic communication with the processor; and instructions stored in the memory and executable by the processor to cause the apparatus to:

receive, using at least a second antenna array of the wireless repeater, a first transmission from a first user equipment (UE) along a first beamforming direction and a second transmission from a second UE along a second beamforming direction;

obtain a first signal that approximates the received first transmission and a second signal that approximates the received second transmission using a beamforming network that is based at least in part on a Butler matrix and coupled with the second antenna array;

aggregate the first signal and the second signal to form an aggregated signal; and transmit, using a first antenna array of the wireless repeater, a unicast transmission based at least in part on the aggregated signal.

\* \* \* \* \*